United States Patent
Shimomura

(10) Patent No.: US 8,213,866 B2
(45) Date of Patent: Jul. 3, 2012

(54) INFORMATION PROCESSING SYSTEM, INFORMATION PROCESSING APPARATUS, AND INFORMATION PROCESSING PROGRAM

(75) Inventor: Masaru Shimomura, Kyoto (JP)

(73) Assignee: Nintendo Co., Ltd., Kyoto-shi (JP)

( * ) Notice: Subject to any disclaimer, the term of this patent is extended or adjusted under 35 U.S.C. 154(b) by 478 days.

(21) Appl. No.: 12/420,414

(22) Filed: Apr. 8, 2009

(65) Prior Publication Data

US 2010/0184379 A1 Jul. 22, 2010

(30) Foreign Application Priority Data

Jan. 16, 2009 (JP) ................................. 2009-008182

(51) Int. Cl.
 *H04B 7/00* (2006.01)
(52) U.S. Cl. ..................................... 455/41.3; 455/3.06
(58) Field of Classification Search .................. 455/3.06, 455/41.2, 41.3
See application file for complete search history.

(56) References Cited

U.S. PATENT DOCUMENTS

| | | | |
|---|---|---|---|
| 7,099,295 B1* | 8/2006 | Doyle et al. | 370/338 |
| 7,474,667 B2* | 1/2009 | Kreiner et al. | 370/401 |
| 7,849,150 B2* | 12/2010 | Loeebbert et al. | 709/208 |
| 2001/0010689 A1* | 8/2001 | Awater et al. | 370/344 |
| 2004/0203590 A1* | 10/2004 | Shteyn | 455/410 |
| 2004/0208247 A1* | 10/2004 | Barrau et al. | 375/240.27 |
| 2005/0135286 A1* | 6/2005 | Nurminen et al. | 370/310 |
| 2008/0192770 A1* | 8/2008 | Burrows et al. | 370/466 |
| 2008/0261693 A1* | 10/2008 | Zalewski | 463/31 |
| 2009/0055383 A1* | 2/2009 | Zalewski | 707/5 |
| 2009/0093307 A1* | 4/2009 | Miyaki | 463/37 |
| 2009/0123899 A1* | 5/2009 | Bates | 434/307 R |
| 2009/0131071 A1* | 5/2009 | Sako et al. | 455/456.1 |
| 2009/0158220 A1* | 6/2009 | Zalewski et al. | 715/863 |
| 2009/0298590 A1* | 12/2009 | Marks et al. | 463/37 |
| 2009/0310530 A1* | 12/2009 | Cerra et al. | 370/316 |
| 2010/0015919 A1* | 1/2010 | Tian | 455/41.2 |
| 2010/0029204 A1* | 2/2010 | Gao et al. | 455/41.2 |
| 2010/0105475 A1* | 4/2010 | Mikhailov et al. | 463/33 |
| 2010/0105480 A1* | 4/2010 | Mikhailov et al. | 463/38 |
| 2010/0106811 A1* | 4/2010 | Leib et al. | 709/220 |
| 2010/0144436 A1* | 6/2010 | Marks et al. | 463/36 |
| 2010/0146283 A1* | 6/2010 | Poitier et al. | 713/176 |
| 2010/0150404 A1* | 6/2010 | Marks et al. | 382/107 |
| 2011/0001795 A1* | 1/2011 | Uhm | 348/46 |
| 2011/0189984 A1* | 8/2011 | Xin et al. | 455/420 |
| 2011/0273368 A1* | 11/2011 | Hinckley et al. | 345/156 |

FOREIGN PATENT DOCUMENTS

| | | |
|---|---|---|
| JP | 3727600 | 10/2005 |
| JP | 2008-136777 | 6/2008 |

\* cited by examiner

*Primary Examiner* — Thomas J Hiltunen
(74) *Attorney, Agent, or Firm* — Nixon & Vanderhye P.C.

(57) ABSTRACT

A first apparatus includes a first communication section 18 for performing either data transmission or data reception by using a first short-distance wireless communication scheme. A second apparatus includes a second communication section 26 for performing either data transmission or data reception by using a second short-distance wireless communication scheme. A third apparatus includes a third communication section 39 and a fourth communication section 38. The third communication section performs either data transmission or data reception by using the first short-distance wireless communication scheme. The fourth communication section performs either data transmission or data reception by using the second short-distance wireless communication scheme. The third apparatus transmits data, which is received from the first apparatus by using the third communication section, to the second apparatus by using the fourth communication section.

19 Claims, 29 Drawing Sheets

F I G. 1 2
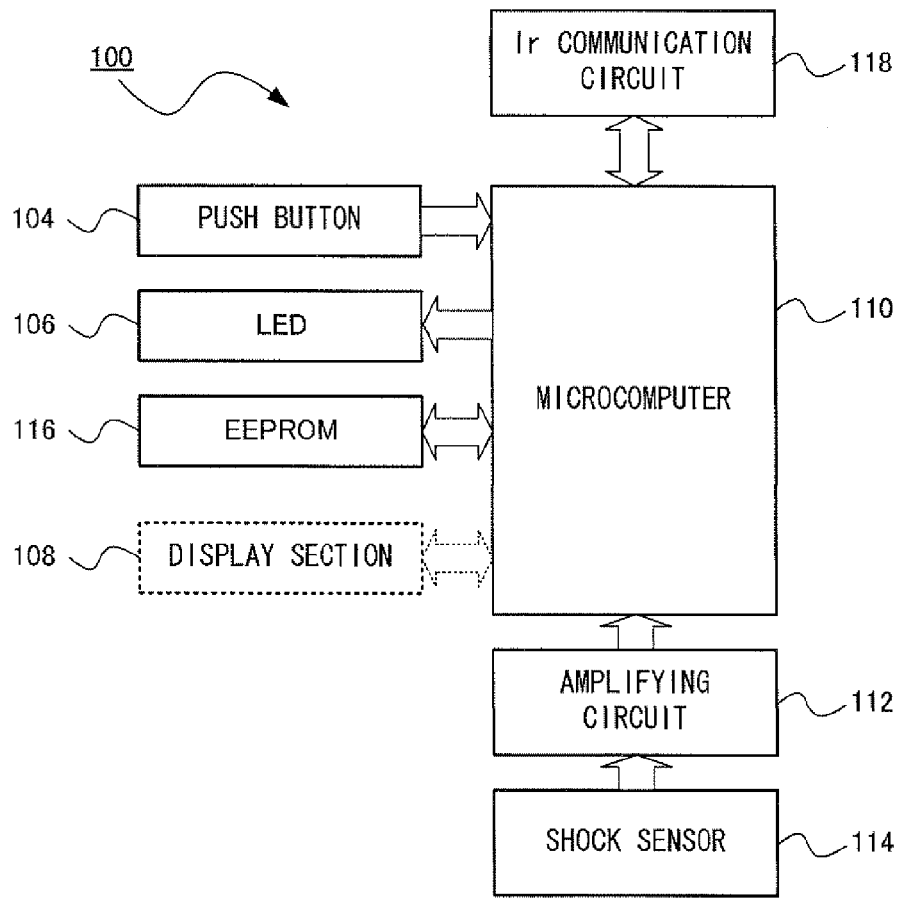
F I G. 1 3
| TIME | 2008/12/15 17:05 | 2008/12/15 17:06 | 2008/12/15 17:07 | 2008/12/15 17:08 | 2008/12/15 17:09 | ...... |
|---|---|---|---|---|---|---|
| STEP COUNT | 60 | 11 | 30 | 0 | 20 | ...... |

INFORMATION PROCESSING SYSTEM, INFORMATION PROCESSING APPARATUS, AND INFORMATION PROCESSING PROGRAM

CROSS REFERENCE TO RELATED APPLICATION

The disclosure of Japanese Patent Application No. 2009-008182, filed Jan. 16, 2009, is incorporated herein by reference.

BACKGROUND OF THE INVENTION

1. Field of the Invention

The present invention relates to an information processing system, an information processing apparatus and an information processing program, all of which enable data communication among a plurality of apparatuses that respectively use different communication schemes from each other.

2. Description of the Background Art

Conventionally, there are systems that enable communication between two apparatuses by providing another apparatus as an intermediary between the two apparatuses. For example, Japanese Laid-Open Patent Publication No. 2008-136777 discloses game apparatuses and a network system, in which communication between a first game apparatus and a second game apparatus is enabled via a third game apparatus.

Also, there are systems in which data is transmitted from a first apparatus to a second apparatus, and further, data is transmitted from the second apparatus to a third apparatus. For example, Japanese Patent No. 3727600 discloses a system in which: data relevant to karaoke music pieces is transmitted from a karaoke user support server to a mobile phone via a public network; the mobile phone selects a music piece based on the received data relevant to the karaoke music pieces, and the mobile phone transmits, to a karaoke machine by using infrared light, a play reservation signal for the selected music piece.

However, the game apparatus disclosed by Japanese Laid-Open Patent Publication No. 2008-136777 is for enabling, in the case where game apparatuses are unable to communicate with each other although both the game apparatuses use a same communication scheme, the game apparatuses to communicate with each other via another game apparatus. Thus, Japanese Laid-Open Patent Publication No. 2008-136777 does not provide a solution for a case where game apparatuses use different communication schemes from each other.

Japanese Patent No. 3727600 also does not provide a solution for a case where a plurality of apparatuses are unable to communicate with each other for the reason that the plurality of apparatuses use different short-distance wireless communication schemes from each other.

SUMMARY OF THE INVENTION

Therefore, a main object of the present invention is to provide an information processing system capable of enabling a plurality of apparatuses, which use different short-distance wireless communication schemes from each other, to share information with each other, thereby providing useful information to a user.

The present invention has the following features to achieve the object mentioned above. Note that reference numerals, supplementary descriptions and the like indicated between parentheses are merely provided to facilitate the understanding of the present invention in relation to the later-described embodiment, rather than limiting the scope of the present invention in any way.

(1) The present invention is an information processing system comprising a first apparatus (a pedometer 1), a second apparatus (a game apparatus 2) and a third apparatus (a handheld terminal 3).

The first apparatus includes first communication means (a first infrared communication section 18, an Ir communication circuit 118). The first communication means performs either data transmission or data reception by using a first short-distance wireless communication scheme (an infrared communication scheme, e.g., a communication scheme of the IrDA Standard).

The second apparatus includes second communication means (a first wireless transmission/reception section 26, a wireless communication module 250). The second communication means performs either data transmission or data reception by using a second short-distance wireless communication scheme (radio communication) that is different from the first short-distance wireless communication scheme.

The third apparatus includes third communication means (a second infrared communication section 39, an Ir communication circuit 70, or an infrared communication section 390) and fourth communication means (a second wireless transmission/reception section 38 or a wireless communication section 380). The third communication means performs either data transmission or data reception by using the first short-distance wireless communication scheme. The fourth communication means performs either data transmission or data reception by using the second short-distance wireless communication scheme.

The third apparatus transmits data (step count data) which is received from the first apparatus by using the third communication means, to the second apparatus by using the fourth communication means, or transmits data (step count data), which is received from the second apparatus by using the fourth communication means, to the first apparatus by using the third communication means.

In the above configuration, the communication means included in the first apparatus and the communication means included in the second apparatus use the first short-distance wireless communication scheme and the second short-distance wireless communication scheme, respectively, which are different from each other. Therefore, these apparatuses are not necessarily able to communicate with each other directly. However, the third apparatus includes both the third communication means for communicating with the first apparatus and the fourth communication means for communicating with the second apparatus. This allows information from the first apparatus to be transmitted, assuredly, to the second apparatus via the third apparatus.

Referred to as a short-distance wireless communication scheme (including the first and second short-distance wireless communication schemes) in the present invention is a short-distance wireless communication, of which the communication distance is up to approximately 10 m and which is used within a relatively close range, e.g., within one of the floors of a building or at home, in order to establish a connection of a personal computer, mobile phone, home electrical appliance or the like. Wireless communication schemes herein include, for example, the WPAN (Wireless Personal Area Network), Bluetooth (registered trademark), ZigBee (registered trademark), Wibree (registered trademark), radio communication, and in-home wireless LAN, all of which enable networking of personal devices.

(2) A speed of data communication performed using the second short-distance wireless communication scheme may be set to be faster than a speed of data communication performed using the first short-distance wireless communication scheme.

The above structure enables the third apparatus to transmit data, which is received from the first apparatus, to the second apparatus with a higher speed than a speed of the data reception.

(3) The first apparatus includes first operation means (a push button 104) The first apparatus may perform either data transmission to or data reception from the third apparatus in accordance with an operation through the first operation means.

In this case, the second apparatus includes second operation means (a remote controller 6). The second apparatus performs either data transmission to or data reception from the third apparatus in accordance with an operation through the second operation means.

In this case, the third apparatus includes third operation means (an input section 32, operation switches 322 (322*a*, 322*b*, 322*c*, 322*d*, 322*e*, 322*f*, 322*g*, 322L and 322R), or a touch panel 324). The third apparatus performs either data transmission to or data reception from the first apparatus or the second apparatus in accordance with an operation through the third operation means (S64).

The information processing system having the above configuration allows the first to third apparatuses to perform data transmission/reception in accordance with operations performed by a user.

(4) The first apparatus may include a first display section (a display section 108) for displaying data transmitted or received by the first communication means.

In this case, the second apparatus includes a second display section (a television 5) for displaying data transmitted or received by the second communication means.

Also, in this case, the third apparatus includes a third display section (an LCD 312, an LCD 314) for displaying data transmitted or received by the third communication means or by the fourth communication means.

The information processing system having the above configuration allows apparatuses to share information, and also allows the apparatuses to display the information.

Note that, in this case, the second display section may display a guide (D22) for an operation (A+B+X+Y) that instructs the third apparatus to start communicating with the second apparatus. In this case, this operation may be a hidden command operation which the third apparatus does not display in a menu when the third apparatus does not communicate with the second apparatus.

(5) The first apparatus further includes jiggling measuring means (a shock sensor 114) for measuring jiggling motion.

The first apparatus may transmit measurement of the jiggling motion to the third apparatus by using the first communication means.

The information processing system having the above configuration enables transmission of step count data to an apparatus that is unable to directly communicate with the pedometer.

(6) The control means (a CPU core 360, a step count data obtaining program 37B) may receive a plurality of pieces of first data (step count data for each unit time) from the first apparatus by using the third communication means. In this case, the third apparatus further includes second-data generation means (a data tallying process program 37C, a data integration process program 371C) for generating second data (a total step count value 37J, integrated data 37*k*) based on the plurality of pieces of first data. In this case, the control means (the CPU core 360, a step count data transmission program 37D) transmits the second data (the integrated data 37*k* or the total step count value 37J), which is generated by the second-data generation means, to the second apparatus by using the fourth communication means (S66 indicates examples of the second data).

According to the information processing system having the above configuration, the amount of data transmission and/or the number of data transmissions from the third apparatus to the second apparatus can be reduced, and also, a processing load on the second apparatus can be reduced.

(7) In the present invention, the second-data generation means may generate the second data (the integrated data 37*k*) by integrating the plurality of pieces of first data (minutely step count data obtained from the pedometer 1).

According to the above configuration, the integrated data is transmitted. This eliminates redundant processing from being performed by each apparatus, and enables sharing of necessary information by each apparatus.

(8) The second-data generation means may generate the second data (the integrated data 37*k*) by performing calculation using values obtained from the plurality of pieces of first data.

The calculation herein includes, for example, tallying up the values for each predetermined unit time.

(9) The present invention further comprises a fourth apparatus (a professional terminal 4).

The second apparatus further includes fifth communication means (a first LAN transmission/reception section 25) for performing either data transmission or data reception by using a third communication scheme (LAN) that is different from the first and second short-distance wireless communication schemes.

The fourth apparatus includes sixth communication means (a second LAN transmission/reception section 41) for performing either data transmission or data reception by using the third communication scheme.

The second apparatus transmits data, which is received from the third apparatus by using the second communication means, to the fourth apparatus by using the fifth communication means, or transmits data, which is received from the fourth apparatus by using the fifth communication means, to the third apparatus by using the second communication means.

The fourth apparatus may perform data transmission to or data reception from the second apparatus by using the sixth communication means.

The information processing system having the above configuration enables data transfer to even more apparatuses.

(10) The second apparatus further includes third-data generation means (a CPU 210 and a data generation program 22E) for generating third data (step count data) in accordance with an operation through the second operation means.

The second apparatus receives the second data from the third apparatus by using the second communication means.

The second apparatus uses the fifth communication means to transmit, to the fourth apparatus, the second data received from the third apparatus and the third data generated by the third-data generation means.

According to the information processing system having the above configuration, the second apparatus can transmit, to the fourth apparatus, data generated by the second apparatus together with data provided from the third apparatus. This enables transmission of various data.

(11) The present invention is an information processing apparatus (the handheld terminal 3) communicating with a first apparatus (the pedometer 1) and a second apparatus (the game apparatus 2). The first apparatus includes first communication means (the first infrared communication section 18, the Ir communication circuit 118) for performing either data transmission or data reception by using a first short-distance wireless communication scheme (infrared communication, e.g., IrDA Standard). Here, the second apparatus includes second communication means (the first wireless transmission/reception section 26, the wireless communication module 250) for performing either data transmission or data reception by using a second short-distance wireless communication scheme that is different from the first short-distance wireless communication scheme.

The present invention may comprise: third communication means (the second infrared communication section 39, the Ir communication circuit 70, or the infrared communication section 390); fourth communication means (the second wireless transmission/reception section 38 or the wireless communication section 380); and control means (a handheld terminal CPU 36 and a data transfer program 379, or the CPU core 360 and the step count data obtaining program 375 and the step count data transmission program 37D).

The third communication means performs either data transmission or data reception by using the first short-distance wireless communication scheme.

The fourth communication means performs either data transmission or data reception by using the second short-distance wireless communication scheme.

The control means transmits data, which is received from the first apparatus by using the third communication means, to the second apparatus by using the fourth communication means, or transmits data, which is received from the second apparatus by using the fourth communication means, to the first apparatus by using the third communication means.

The control means of the information processing apparatus includes both the third communication means for communicating with the first apparatus and the fourth communication means for communicating with the second apparatus. Therefore, information from the first apparatus can be assuredly transmitted to the second apparatus via the third apparatus.

(12) The present invention is a computer-readable storage medium storing an information processing program to be executed by a computer of an information processing apparatus that communicates with a first apparatus and a second apparatus, the first apparatus including first communication means for performing either data transmission or data reception by using a first short-distance wireless communication scheme, and the second apparatus including second communication means for performing either data transmission or data reception by using a second short-distance wireless communication scheme that is different from the first short-distance wireless communication scheme, the information processing program causing the computer of the information processing apparatus to act as: third communication means, fourth communication means and control means.

The third communication means performs either data transmission or data reception by using the first short-distance wireless communication scheme.

The fourth communication means performs either data transmission or data reception by using the second short-distance wireless communication scheme.

The control means transmits data, which is received from the first apparatus by using the third communication means, to the second apparatus by using the fourth communication means, or transmits data, which is received from the second apparatus by using the fourth communication means, to the first apparatus by using the third communication means.

The above configuration provides the same effects as those provided by (1).

According to the present invention, even among a plurality of apparatuses which use different wireless communication schemes from each other and which are unable to communicate with each other, communication can be performed via another apparatus. Accordingly, the information processing system can provide enjoyment of sharing information among the plurality of apparatuses.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a block diagram showing an electrical configuration of the pedometer shown in FIG. 11;

FIG. 13 shows a data format of step count data stored in an EEPROM of the pedometer shown in FIG. 11;

DESCRIPTION OF THE PREFERRED EMBODIMENTS

Figure 1:
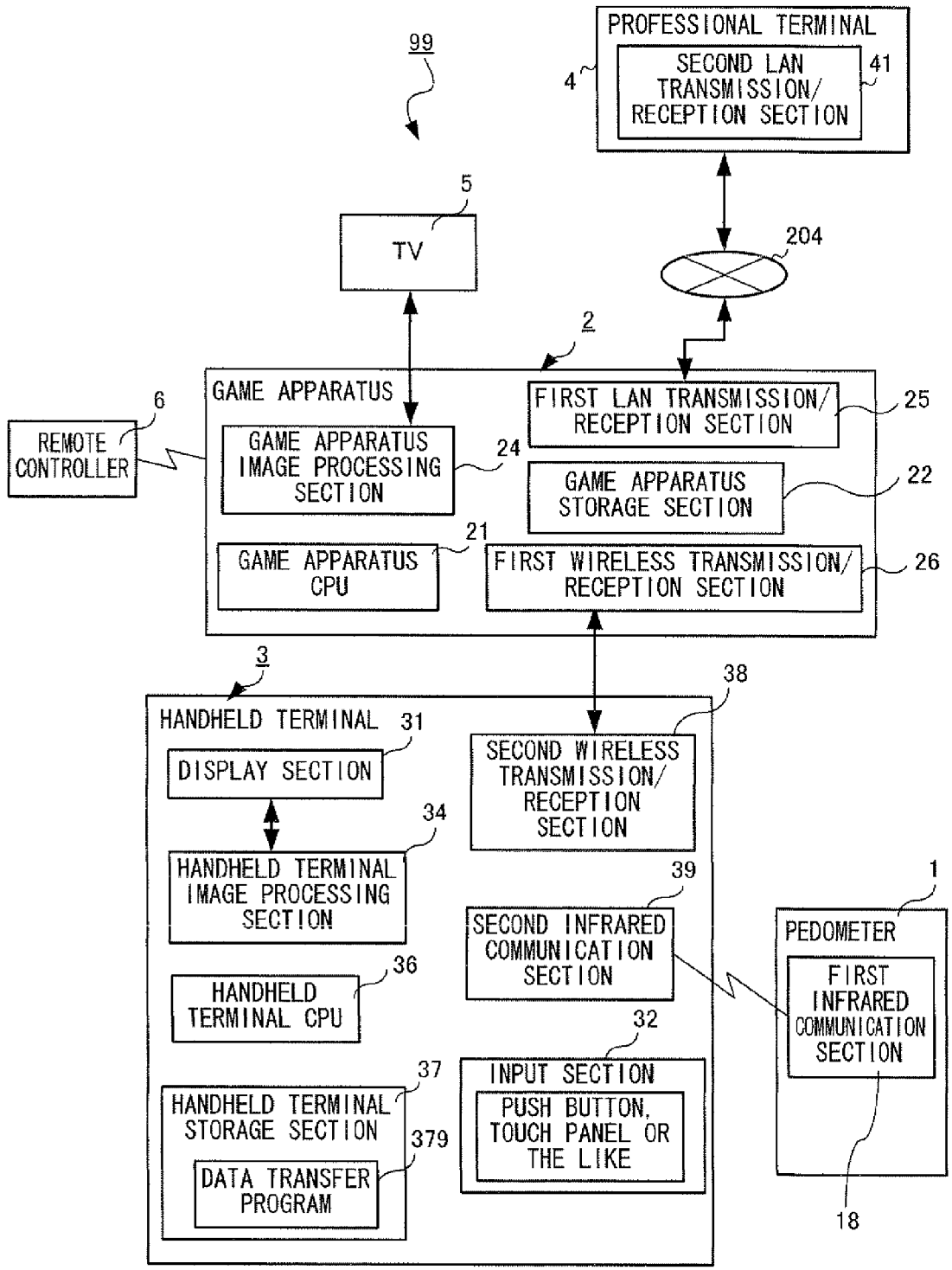
FIG. 1 is a block diagram showing main components of a game system of one embodiment of the present invention.

Hereinafter, one embodiment of an information processing system according to the present invention will be described with reference to the drawings.

(Brief Description or an Information Processing System 99)

An information processing system 99, which is one embodiment of the information processing system of the present invention, will be described With reference to FIG. 1. The information processing system 99 includes a pedometer 1, a game apparatus 2 and a handheld terminal 3. The game apparatus 2 of the information processing system 99 is connected to a professional terminal 4 via a network 204. By having this configuration, the information processing system 99 of the present embodiment is capable of: measuring the number of steps a user takes; displaying a step count result on the game apparatus 2 or on the handheld terminal 3; communicating with the professional terminal 4 to provide the user with professional backup; and the like.

The information processing system 99 also includes a remote controller 6 that allows the user to operate the game apparatus 2. Further, in order to display an image generated by the game apparatus 2, a television (TV) 5 is connected to the information processing system 99.

The pedometer 1 measures the number of steps taken when the user walks, and stores the number as step count data. The pedometer 1 transmits the step count data to the handheld terminal 3 by using infrared communication, for example, by using a communication scheme of the IrDA (Infrared Data Association) Standard.

The game apparatus 2 includes: a game apparatus CPU 21, a game apparatus storage section 22, a game apparatus image processing section 24, a first LAN transmission/reception section 25, and a first wireless transmission/reception section 26. These components are connected to each other via a data bus that is not shown. The game apparatus CPU 21 runs programs stored in the game apparatus storage section 22. The game apparatus storage section 22 is a work area of the game apparatus CPU 21. In accordance with execution of the programs, the game apparatus image processing section 24 generates an image and outputs the image to the television 5. The first wireless transmission/reception section 26 receives the step count data from the handheld terminal 3.

The handheld terminal 3 may be a portable electronic apparatus, for example, a handheld game apparatus, mobile phone, PDA or the like. However, in the embodiment of the present invention, a stationary electronic apparatus may be substituted for the handheld terminal 3 (this substitution applies whenever the handheld terminal 3 is mentioned in the description below). The handheld terminal 3 includes: a display section 31, an input section 32, a handheld terminal image processing section 34, a handheld terminal CPU 36, a handheld terminal storage section 37, a second wireless transmission/reception section 38, and a second infrared communication section 39. These components are connected to each to other via a data bus that is not shown. The input section 32 may be a switch such as a push button, or may be a pointing device such as a touch panel or a mouse wheel. The input section 32 transmits a user instruction to the game apparatus CPU 21. The handheld terminal CPU 36 executes a data transfer program 379 stored in the handheld terminal storage section 37. In accordance with the execution of the program, the handheld terminal image processing section 34 generates and outputs an image to the display section 31. The second infrared communication section 39 receives the step count data from the pedometer 1. Further, in accordance with the execution of the data transfer program 379 by the handheld terminal CPU 36, the second wireless transmission/reception section 38 communicates with the first wireless transmission/ reception section 26 of the game apparatus 2, and transmits, to the game apparatus 2, the step count data received from the pedometer 1.

The professional terminal 4 is a computer to be used by a professional such as a health nurse or a doctor. The professional terminal 4 can be realized by, for example, a general-purpose computer that includes a CPU, RAM, HDD and the like. The professional terminal 4 is communicably connected to a plurality of game apparatuses 2 via the network 204. The network 204 is such a communication network as a wireless LAN, the Internet or the like. The professional terminal 4 receives the step count data from the game apparatus 2.

Note that, although the above-described embodiment handles the step count data, a type of data to be handled in the embodiment of the present invention is not limited to the step count data. In the embodiment of the present invention which uses the pedometer 1, a flow of data is typically from the pedometer 1 to the handheld terminal 3. However, in the embodiment of the present invention, a computer or a terminal may be substituted for the pedometer 1. In such a case, data stored in the game apparatus 2 may be transmitted to the substitute via the handheld terminal 3.

(Example of the Information Processing System 99)

An information processing system 990, which is an example of the information processing system 99 shown in FIG. 1, will hereinafter be described with reference to FIGS. 2A to 30. FIGS. 2A and 2B briefly illustrate the information processing system 990. FIG. 2A briefly shows a configuration example of the information processing system 990. FIG. 2B briefly shows communication performed by the information processing system 990 shown in FIG. 2A. Note that, FIG. 2A does not show the network 204 and the professional terminal 4, which are connected to the information processing system 990.

As shown in FIG. 2A, the information processing system 990 includes: the pedometer 1, the game apparatus 2, the handheld terminal 3, the television 5 and the remote controller 6, which are described above; and a memory card 7 connected to the handheld terminal 3. The game apparatus 2 and the television 5 are connected to each other by an AV cable 232a. The game apparatus 2 outputs an AV signal to the television 5 via the AV cable 232a. A marker section 51 and the game apparatus 2 are connected to each other by a power cable 232b. The game apparatus 2 supplies power to the marker section 51 via the power cable 232b. The marker section 51 is provided in order to allow the remote controller 6 to act as a pointing device. The marker section 51 will be described later in detail.

A user inserts an optical disc 218, which stores a game program or the like, into the game apparatus 2. In this manner, the user is able to input various games or the like into the game apparatus 2. The handheld terminal 3 is, for example, a handheld game apparatus. The memory card 7, which stores a game program, is inserted to the handheld terminal 3. In this manner, the user is able to input various games into the handheld terminal 3. Further, a stylus 326 is attached to the handheld terminal 3. The user uses the stylus 326 to input coordinates on the screen of the handheld terminal 3.

An AV cable connector 258 (see FIG. 4) is provided on a rear surface of a housing 214 of the game apparatus 2. The television 5, a loudspeaker 50a and a loudspeaker 50b are connected to the game apparatus 2 via the AV cable 232a by using the AV cable connector 258. The television 5 and the loudspeakers 50a and 50b typically constitute a color television receiver. The AV cable 232a allows a video signal from the game apparatus 2 to be inputted to a video input terminal of the television 5, and allows an audio signal from the game apparatus 2 to be inputted to an audio input terminal of the television 5. Accordingly, for example, a game image of a three-dimensional (3D) video game is displayed on the screen of the television 5, and stereo game sounds such as game sounds and sound effects are outputted from the left and right loudspeakers 50a and 50b. The marker section 51 that includes two infrared LEDs (markers) 52 and 53 are provided in the vicinity of the television 5 (in this example, on the top of the television 5). The marker section 51 is connected to the game apparatus 2 by the power cable 232b. Accordingly, power is supplied from the game apparatus 2 to the marker section 51. As a result, the LEDs 52 and 53 each become luminous and output an infrared light forward from the television 5. An imaging section provided in the remote controller 6 detects a facing direction of the remote controller 6, by taking an image of the infrared light. Accordingly, the game apparatus 2 displays a pointer such as an arrow on the television 5 (see P of FIG. 16A).

Power is supplied to the game apparatus 2 via a general AC adaptor (not shown). The plug of the AC adaptor is inserted into a normal wall socket at home. The game apparatus 2 converts household power (commercial power) into low DC voltage signals suitable for driving the game apparatus 2. In other examples, a battery may be used as a power source. The game apparatus 2 and the remote controller 6 are connected to each other by wireless communication. The wireless communication of the remote controller 6 is performed in accordance with a short-distance communication scheme such as the Bluetooth (registered trademark) Standard. However, the wireless communication may be performed in accordance with a different communication scheme, for example, infrared communication or wireless LAN. In order to realize the embodiment of the present invention, the television 5 is not necessarily required to include a receiving section for receiving broadcast signals. The television 5, which is only capable of showing an inputted image on a display, will suffice to realize the embodiment of the present invention.

As mentioned above, FIG. 2B briefly shows the communication that is performed by the information processing system 990 shown in FIG. 2A. The pedometer 1 and the handheld terminal 3 communicate with each other by means of short-distance infrared wireless communication. The protocol of the wireless communication between the game apparatus 2 and the handheld terminal 3 is, for example, a short-distance wireless communication protocol which is used for performing communication between game apparatuses and which may be a uniquely modified protocol of the IEEE802.11. This protocol allows data transmission/reception to be performed when a connection is established between a master station and a slave station. Note that, the data communication speed of the wireless communication between the game apparatus 2 and the handheld terminal 3 is selected to be faster than that of infrared wireless communication performed between the pedometer 1 and the handheld terminal 3.

The game apparatus 2 and the professional terminal 4 are connected via the network 204 that is a LAN (Local Area Network) or the Internet. Here, a transmission flow of the step count data is as follows: from the pedometer 1 to the handheld terminal 3; from the handheld terminal 3 to the game apparatus 2; and from the game apparatus 2 to the professional terminal 4.

The handheld terminal 3 includes both a wireless communication section for receiving infrared light from the pedometer 1 (equivalent to the second infrared communication section 39) and a communication section for performing wireless communication (equivalent to the second wireless transmission/reception section 38). As a result, even if communication schemes used by the pedometer 1 and the game apparatus 2 are different from each other, the information processing system 990 is able to transmit the step count data between the pedometer 1 and the game apparatus 2 via the handheld terminal 3. The game apparatus 2 includes both a communication section for performing wireless communication (equivalent to the first wireless transmission/reception section 26) and a communication section for performing LAN communication (equivalent to the first LAN transmission/reception section 25). Consequently, even if communication schemes used by the handheld terminal 3 and the professional terminal 4 are different from each other, the information processing system 99 is able to transmit the step count data to the professional terminal 4 via the game apparatus 2.

(Descriptions of Configurations of the Game Apparatus 2, the Handheld Terminal 3 and the Pedometer 1)

Next, with reference to FIGS. 3 to 13, configurations of the game apparatus 2, the handheld terminal 3 and the pedometer 1 will be described in further detail. In the description below, the game apparatus 2, the handheld terminal 3 and the pedometer 1 are described in said order.

(Game Apparatus 2)

Figure 2A:
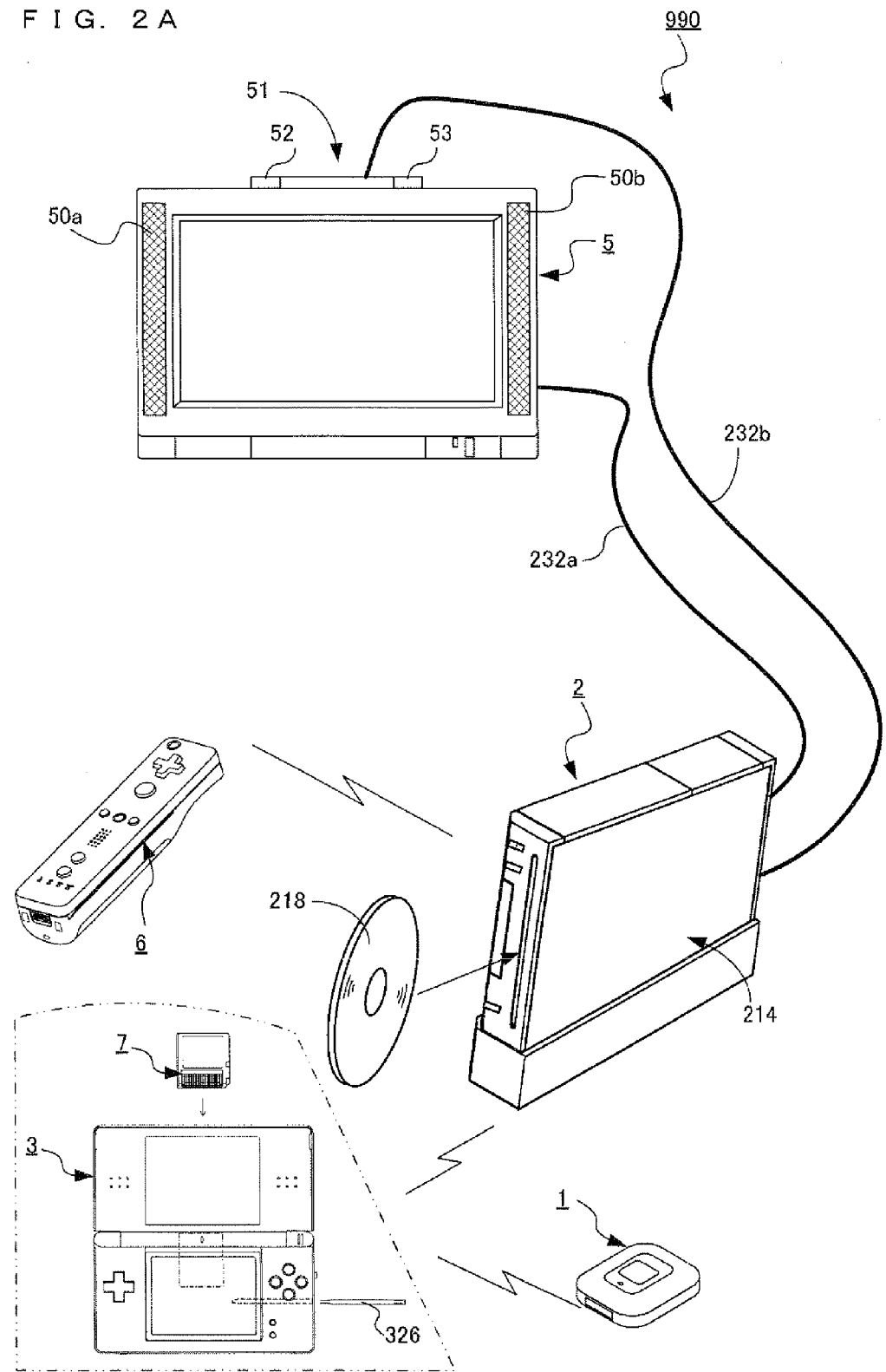
FIG. 2A shows an external view of an example of the game system shown in FIG. 1.
Figure 2B:
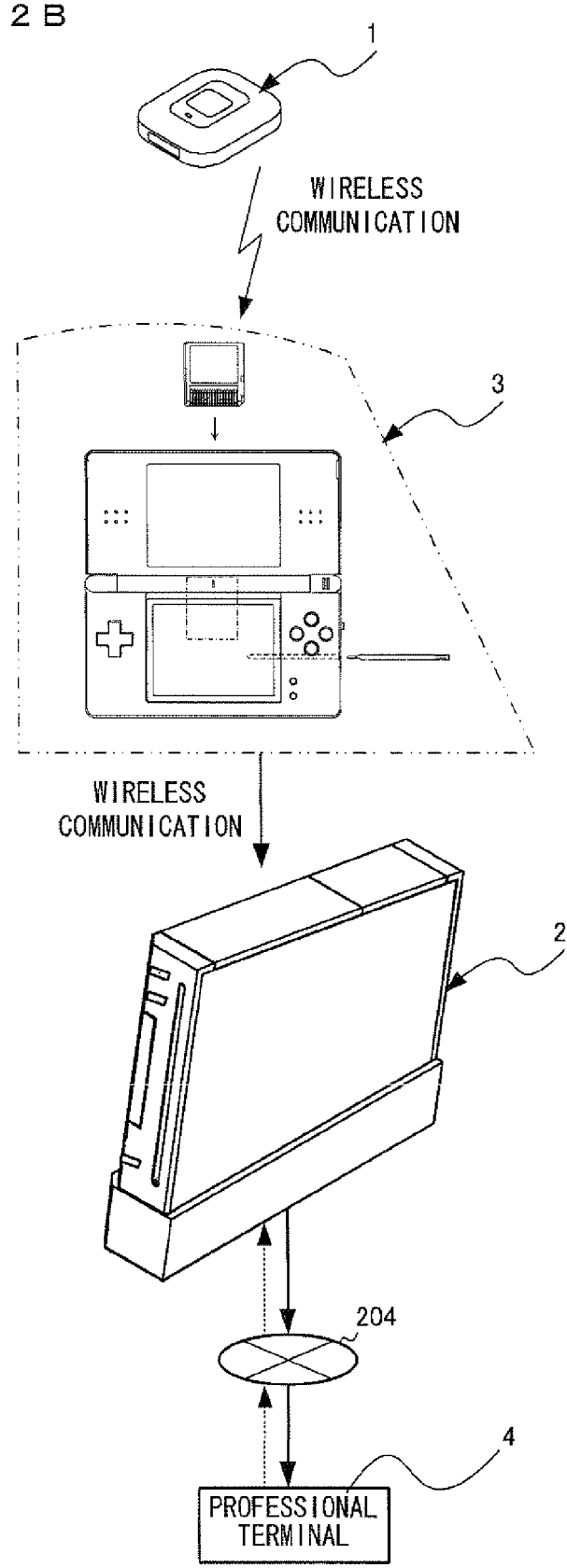
FIG. 2B briefly illustrates communication that is performed when the example of the game system shown in FIG. 2A is used.
Figure 3:
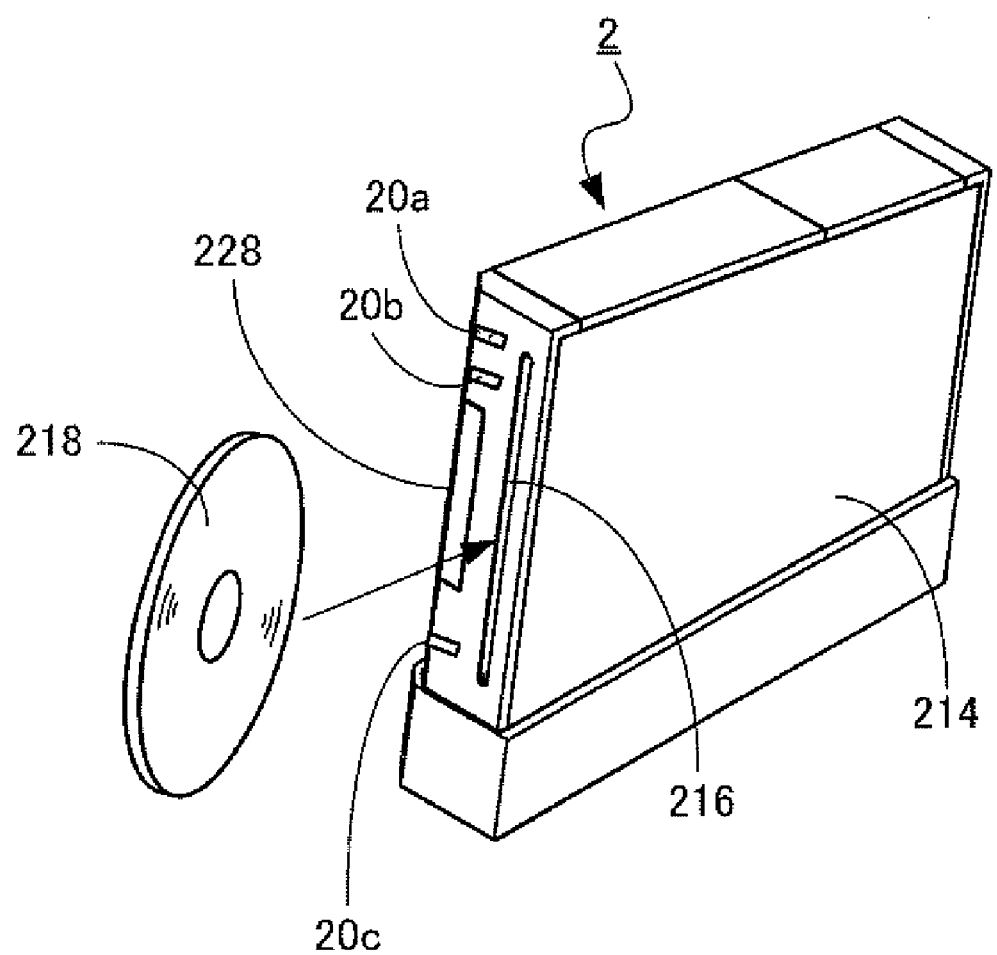
FIG. 3 shows an external view of a game apparatus included in the game system shown in FIG. 2A.
Figure 4:
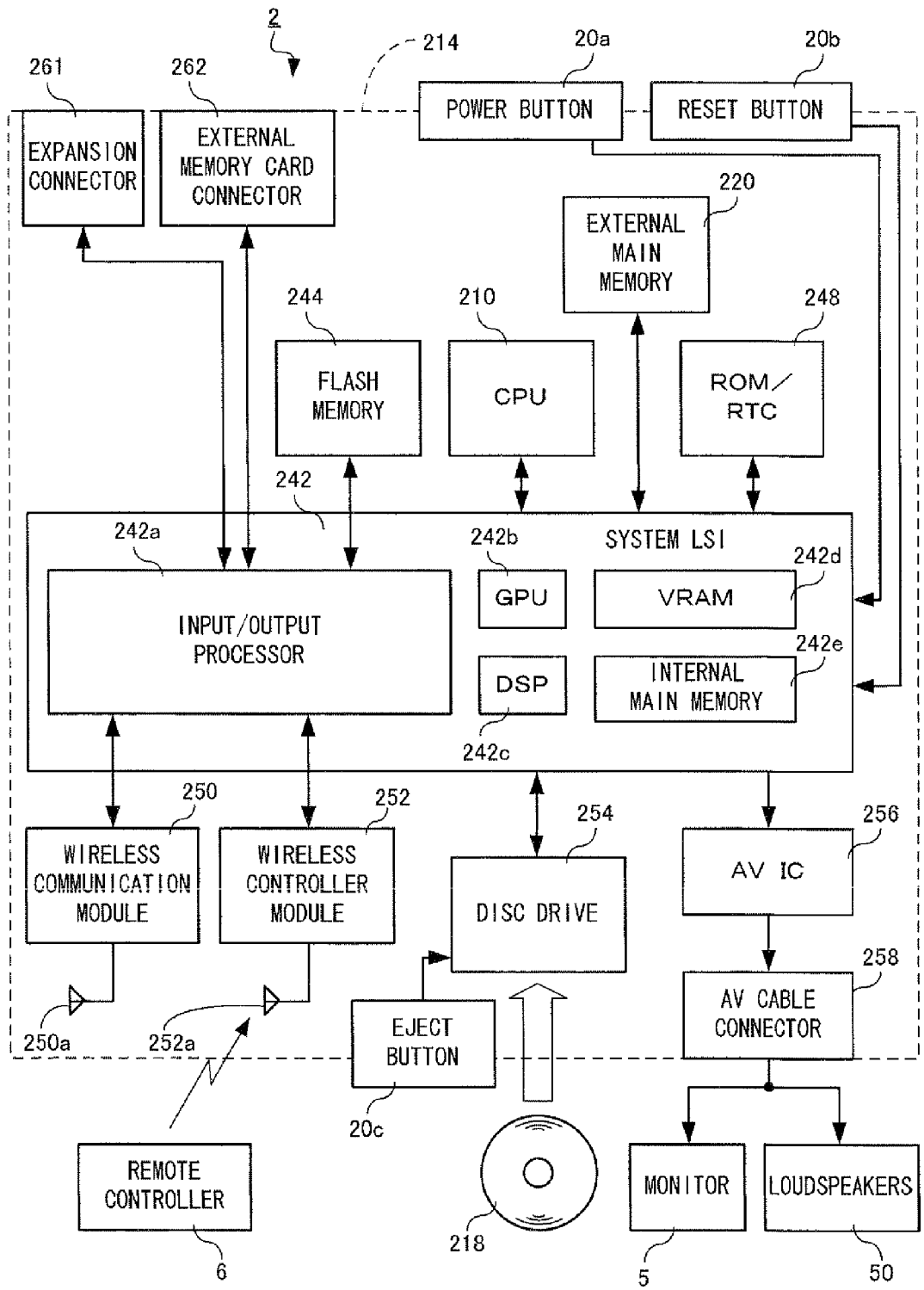
FIG. 4 is a block diagram showing an electrical configuration of the game apparatus shown in FIG. 3.
Figure 5:
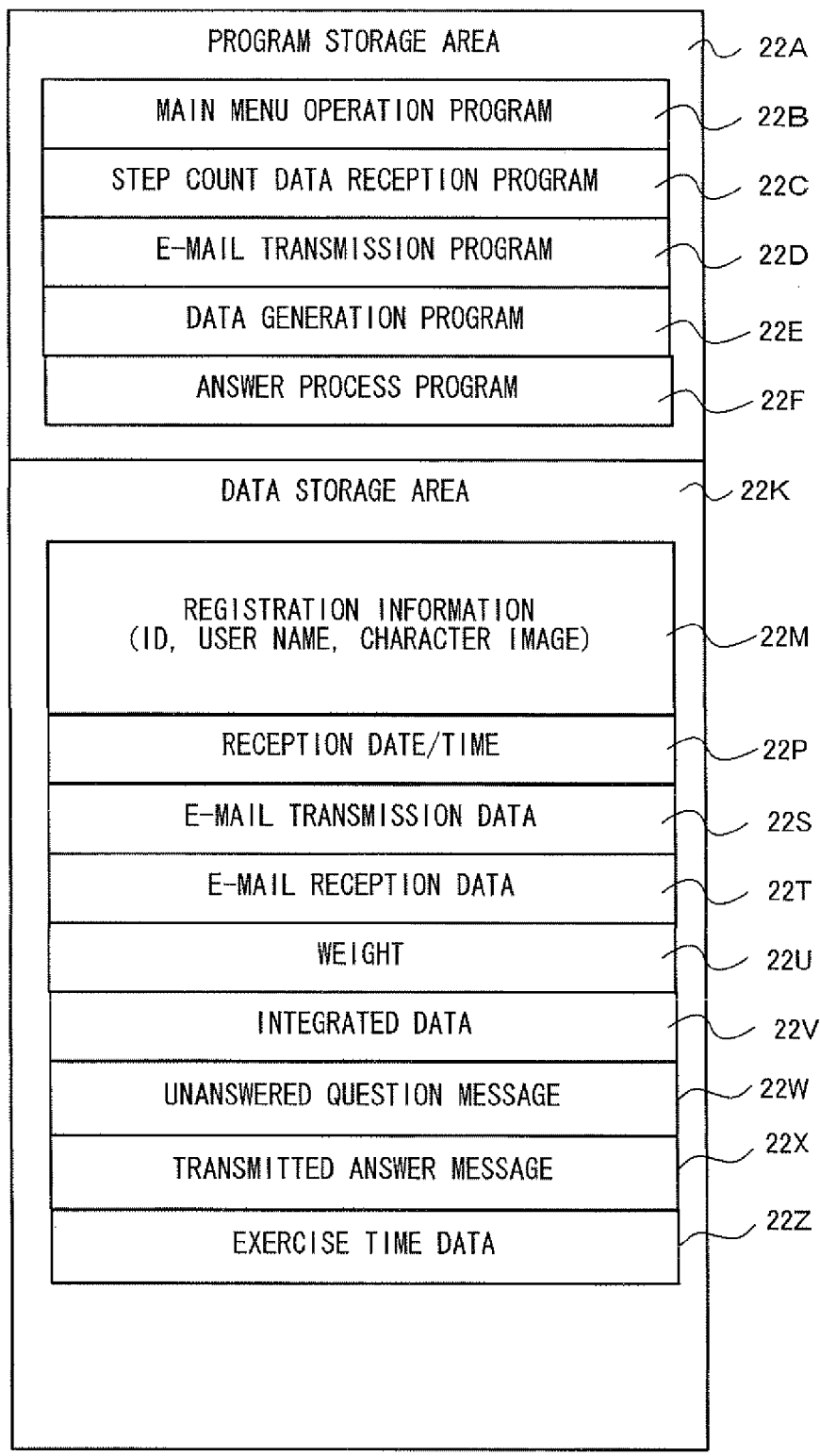
FIG. 5 shows a memory map of the game apparatus shown in FIG. 3.

FIGS. 3, 4 and 5 show an example of the configuration of the game apparatus 2 shown in FIG. 2.

FIG. 3 shows an example of an external view of the game apparatus 2.

The game apparatus 2 has, on the outside thereof, the housing 214, a disk slot 216, a power button 20$a$, a reset button 20$b$, an eject button 20$c$, and an external memory card connector cover 228.

The game apparatus 2 is covered with the housing 214 that has an approximately parallelepiped shape. The disk slot 216 is provided on a front surface of the housing 214. The optical disc 218, which is an example of an information storage medium storing a game program or the like, is inserted through the disk slot 216 and mounted on a disc drive 254 provided within the housing 214 (see FIG. 4). LEDs and a light guide plate are provided near the disk slot 216. The game apparatus 2 is able to cause these LEDs to be lit up in accordance with various processing.

The power button 20$a$ and the reset button 20$b$ are provided on an upper portion of the front surface of the housing 214 of the game apparatus 2. The eject button 20$c$ is provided on a lower portion of the front surface of the housing 214. Further, in the vicinity of the disk slot 216, the external memory card connector cover 228 is provided between the reset button 20$b$ and the eject button 20$c$. Inside the external memory card connector cover 228, an external memory card connector 262 (see FIG. 4) is provided. An external memory card that is not shown (hereinafter, referred to as "the memory card of the game apparatus 2") is inserted into the external memory card connector 262. The memory card of the game apparatus 2 is used for the purpose of, for example: loading a game program or the like from the optical disc 218 to temporarily store the game program or the like; and saving game data of a game that is played using the information processing system 990 (such as result data or progress data of the game). Such game data may be saved in, for example, an internal memory such as a flash memory 244 provided within the game apparatus 2 (see FIG. 4), instead of in the external memory card removably mounted on the game apparatus 2 (see the external memory card connector shown in FIG. 4). The external memory card of the game apparatus 2 may be used as a backup memory for the internal memory.

Note that, not only a general-purpose SD card (registered trademark), but also other general-purpose memory card such as a Memory Stick (registered trademark) or a MultiMediaCard (registered trademark) may be used as the external memory card of the game apparatus 2.

FIG. 4 is a block diagram showing an electrical configuration of the game apparatus 2 of the example shown in FIG. 3. Although not shown, each component within the housing 214 is mounted on a printed substrate.

Described below is a correspondence relationship between FIGS. 1 and 4. A CPU 210 of FIG. 4 is an example of the game apparatus CPU 21 of FIG. 1. One or more of an external main memory 220, an internal main memory 242$e$ and the flash memory 244 of FIG. 4 is an example of the game apparatus storage section 22 of FIG. 1. A GPU 242$b$, a VRAM 242$d$ and an AV IC 256 of FIG. 4 are collectively an example of the game apparatus image processing section 24 of FIG. 1. A wireless communication module 250 of FIG. 4 is an example of the first LAN transmission/reception section 25 and the first wireless transmission/reception section 26 of FIG. 1. The wireless communication module 250 has functions of both the transmission/reception sections.

As shown in FIG. 4, the game apparatus 2 is provided with the CPU 210. The CPU 210 acts as a game processor. A system LSI 242 is connected to the CPU 210. The external main memory 220, the ROM/RTC 248, the disc drive 254 and the AV IC 256 are connected to the system LSI 242.

The external main memory 220 stores programs such as game programs, and stores various data. The external main memory 220 is used as a work area and a buffer area of the CPU 210. The ROM/RTC 248 is a so-called boot ROM, in which a boot program for the game apparatus 2 is incorporated and a clock circuit for counting the time is provided. The disc drive 254 reads program data, texture data and the like from the optical disc 218, and writes, under control of the CPU 210, the read data into the internal main memory 242$e$ or into the external main memory 220, which will be described later.

On the system LSI 242, an input/output processor 242$a$, the GPU (Graphics Processor Unit) 242$b$, a DSP (Digital Signal Processor) 242$c$, the VRAM 242$d$ and the internal main memory 242$e$ are provided. Although not shown, these components are connected to each other via an internal bus.

The input/output processor (I/O processor) 242$a$ performs data transmission/reception or downloading of data.

The GPU 242$b$ constitutes apart of rendering means. The GPU 242$b$ receives a graphics command from the CPU 210, and generates game image data in accordance with the graphics command. Here, the CPU 210 provides the GPU 242$b$ with not only the graphics command but also an image generation program that is necessary for generating the game image data.

Although not shown, the VRAM 242$d$ is connected to the GPU 242$b$. The GPU 242$b$ accesses the VRAM 242$d$ to obtain necessary data for the GPU 242$b$ to perform rendering in accordance with the graphics command (image data: polygon data, texture data and the like). Note that, the CPU 210 writes, into the VRAM 242$d$ via the GPU 242$b$, the necessary data for rendering. The GPU 242$b$ accesses the VRAM 242$d$ to generate game image data for rendering.

In this example, described is a case where the GPU 242$b$ generates game image data. In the case of executing an arbitrary application that is not a game application, the GPU 242$b$ generates image data for the arbitrary application.

The DSP 242$c$ also acts as an audio processor. The DSP 242$c$ uses sound data and sound waveform (tone) data, which are stored in the internal main memory 242$e$ and the external main memory 220, to generate audio data that corresponds to sounds, voices or music to be outputted from the loudspeakers 50.

The game image data and the audio data generated as above are read by the AV IC 256, and outputted to the television 5 and the loudspeakers 50 via the AV cable connector 258. Accordingly, a game screen is displayed on the television 5, and necessary sounds (music) for a game are outputted from the loudspeakers 50.

The flash memory 244, the wireless communication module 250 and a wireless controller module 252 are connected to the input/output processor 242*a*. Also, an expansion connector 261 and the external memory card connector 262 are connected to the input/output processor 242*a*. An antenna 250*a* is connected to the wireless communication module 250, and an antenna 252*a* is connected to the wireless controller module 252.

The input/output processor 242*a* is capable of communicating, via the wireless communication module 250, with other game apparatuses or various servers connected to the network 204. Further, the input/output processor 242*a* is capable of communicating with the handheld terminal 3 via the wireless communication module 250. Here, wireless communication between the game apparatus 2 and the handheld terminal 3 is performed using a different communication scheme from that of the wireless LAN connecting the game apparatus 2 to the network 204. The protocol of the wireless communication between the game apparatus 2 and the handheld terminal 3 is, for example, a short-distance wireless communication protocol which is used for performing communication between game apparatuses and which may be a uniquely modified protocol of the IEEE802.11. Thus, the wireless communication module 250 functions as two different communication sections that use different communication schemes, respectively, to perform communication.

As another example of the wireless communication module 250, the wireless communication module 250 may directly communicate with other game apparatuses without involving a network. The input/output processor 242*a* regularly accesses the flash memory 244 to detect presence/absence of data that needs to be transmitted to the network (transmission data). If such transmission data is present, the transmission data may be transmitted to the network 204 via the wireless communication module 250 and the antenna 250*a*. Also, the input/output processor 242*a* receives, via the network, the antenna 250*a* and the wireless communication module 250, data transmitted from other game apparatuses (reception data), and stores the reception data in the flash memory 244. However, under a particular condition, the reception data is discarded directly. In addition, the input/output processor 242*a* receives, via the network, the antenna 250*a* and the wireless communication module 250, data downloaded from a download server (downloaded data), and stores the downloaded data in the flash memory 244.

Further, the input/output processor 242*a* receives, via the antenna 252*a* and the wireless controller module 252, input data transmitted from the remote controller 6, and stores (temporarily) the input data in a buffer area of the internal main memory 242*e* or of the external main memory 220. The input data is deleted from the buffer area after being used for game processing by the CPU 210.

Note that, in the present embodiment, the wireless controller module 252 communicates with the remote controller 6 in accordance with the Bluetooth Standard, as described above.

Further, the expansion connector 261 and the external memory card connector 262 are connected to the input/output processor 242*a*. The expansion connector 261 is a connector for such interface as USB, SCSI or the like. The expansion connector 261 enables connecting to such a medium as an external storage medium, or to such a peripheral device as another controller. Instead of using the wireless communication module 250, a wired LAN can be used by connecting a wired LAN adaptor to the expansion connector 261. To the external memory card connector 262, an external storage medium such as a memory card can be connected. Accordingly, the input/output processor 242*a* is able to access the external storage medium via the expansion connector 261 or via the external memory card connector 262 so as to store or read data, for example.

Although a detailed description is omitted, the power button 20*a*, the reset button 20*b* and the eject button 20*c* are provided on the game apparatus 2 (housing 214) as shown in FIG. 3. The power button 20*a* is connected to the system LSI 242. Once the power button 20*a* is turned on, power is supplied to respective components of the game apparatus 2 via the AC adaptor (not shown). Then, the system LSI 242 sets the game apparatus 2 to be in a mode where power is supplied in a normal manner (hereinafter, referred to as a "normal mode"). Whereas, when the power button 20*a* is turned off, power is supplied to only a part of the components of the game apparatus 2. Then, the system LSI 242 sets the game apparatus 2 to be in a mode where power consumption is reduced to a minimum necessary level (hereinafter, referred to as a "standby mode"). In this example, in the case where the game apparatus 2 is set to be in the standby mode, the system LSI 242 provides an instruction to cut off power supply to components other than the input/output processor 242*a*, the flash memory 244, the external main memory 220, the ROM/RTC 248, the wireless communication module 250 and the wireless controller module 252. Therefore, in the standby mode, the CPU 210 does not execute applications.

Note that, in the standby mode, although power is supplied to the system LSI 242, clock supply to the GPU 242*b*, the DSP 242*c* and the VRAM 242*d* is ceased, whereby these components are prevented from being driven. In this manner, power consumption is reduced.

Although not shown, a fan for discharging heat of ICs such as the CPU 210 and the system LSI 242 to the outside is provided within the housing 214 of the game apparatus 2. This fan is also stopped in the standby mode.

When the user does not want to use the standby mode, the game apparatus 2 is set so as not to use the standby mode. Accordingly, when the power button 20*a* is turned off, power supply to all the circuit components is completely cut off.

Switching between the normal mode and the standby mode can also be performed by remote control either by turning on/off a power switch 626*h* of the remote controller 6 (see FIG. 6). If the remote control is not performed, the game apparatus 2 may be set such that power is not supplied to the wireless controller module 252*a* during the standby mode.

The reset button 20*b* is also connected to the system LSI 242. When the reset button 20*b* is pressed, the system LSI 242 re-executes the boot program of the game apparatus 2. The eject button 20*c* is connected to the disc drive 254. When the eject button 20*c* is pressed, the optical disc 218 is ejected From the disc drive 254.

FIG. 5 shows an example of a memory map of the external main memory 220. Memory maps of the internal main memory 242*e* and the flash memory 244 may have a similar structure to this memory map. The memory map includes a program storage area 22A and a data storage area 22*k*. Programs and data are read entirely at once, or partially and sequentially, from the optical disc 218, and then stored in the external main memory 220 or in the internal main memory 242*e*. The data storage area 22*k* also stores data that is generated or obtained through processing.

The program storage area 22A stores a main menu operation program 22B, a step count data reception program 22C, an e-mail transmission program 22D, a data generation program 22E, and an answer process program 22F. When the CPU 210 executes the main menu operation program 22B, the game apparatus image processing section 24 displays, on the television 5, a main menu for accepting operations of the game apparatus 2. When the CPU 210 executes the step count data reception program 22C, the wireless communication module 250 receives step count data from the handheld terminal 3. When executing the e-mail transmission program 22D, the CPU 210 transmits an e-mail to the professional terminal 4. At this point, the CPU 210 automatically attaches, to the e-mail, the step count data and other data indicating a health condition of the user, and then transmits the e-mail to the professional terminal 4. The data generation program 22E arranges, for each user, the step count data received from the handheld terminal 3, and generates: statistical data on step count results; integrated data 22v that integrates data derived from the step count data; a BMI value; a total step count value 22Q; and data used for generating a later-described step count result screen D1. At the time of transmitting the aforementioned e-mail, the CPU 210 may transmit the e-mail together with the Integrated data 22v generated by the data generation program 22E.

When the CPU 210 executes the answer process program 22F, the game apparatus 2 displays a menu or the like on the television 5 to accept an input of an answer message that is a response to a message received from the professional terminal 4. When the user selects a particular item in the menu, the game apparatus 2 displays an unanswered question message 22w or a transmitted answer message 22x on the television 5 (see FIG. 23).

The data storage area 22k stores registration information (ID, user name, character image) 22M, a reception date/time 22P, the total step count value 22Q, e-mail transmission data 22S, e-mail reception data 22T, weight 22U, the integrated data 22v, the unanswered question message 22w, the transmitted answer message 22x, and exercise time data 22Z. The registration information (ID, user name, character image) 22M is information specific to a registered user. The reception date/time 22P indicates a date and time of receiving the step count data. The e-mail transmission data 22S contains data of an e-mail having been transmitted to the professional terminal 4 and data of an e-mail to be transmitted to the professional terminal 4. The e-mail reception data 22T is data of an e-mail having been received from the professional terminal 4. The external main memory 220 may store, as the total step count value 22Q, such data as daily data or monthly data. The total step count value 22Q is not essential for the embodiment of the present invention. The weight 22U is weight data of the user, which is used to calculate BMI. The weight may be inputted using the remote controller 6. Alternatively, a board provided with a strain sensor may be connected to the game apparatus 2, and a value of the user's weight measured by the board may be inputted via the board. The integrated data 22v is a result of accumulating the step count data such that, each time the step count data is transmitted from the handheld terminal 3 to the game apparatus 2 by using the wireless communication module 250, a difference in the received step count data from the step count data received at an immediately previous communication is accumulated. As mentioned above, the unanswered question message 22w is used in the answer process, which is described later. The unanswered question message 22w contains a message which has been sent from a professional owning the professional terminal 4 and which has not been answered by the user. The transmitted answer message 22x contains a message transmitted from the professional, which has already been answered by the user. The exercise time data 22Z indicates a time of exercise performed by the user. The game apparatus 2 is able to accept an input of this data, by performing a numeric-input-type answer process shown in FIGS. 25 and 29.

FIG. 5 only shows a part of the memory map. The external main memory 220, the flash memory 244 and the like also store other programs and data necessary for processing. For example, sound data for outputting sounds such as voices, sound effects, music and the like; image data for generating images; a sound output program; an image generating and displaying program; and the like are read from the optical disc 218 and then stored in the program storage area 22A or in the data storage area 22k. In this example, the programs and data are read from the optical disc 218. However, in other examples, programs or data, which are prestored in a nonvolatile storage medium such as the flash memory 244 included in the game apparatus 2, may be read from the nonvolatile storage medium and then stored in the external main memory 220 or in the internal main memory 242e. In this case, a program or the like, which is downloaded via a network by using, for example, the wireless communication module 250 of the game apparatus 2 or a communication module connected to the expansion connector 261, may be prestored in the storage medium.

Figure 6A:
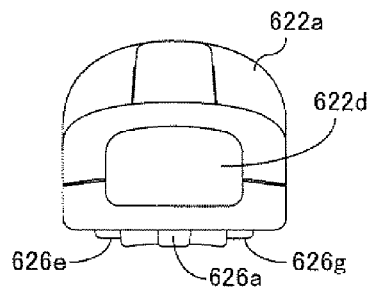
FIG. 6A shows an external view of a remote controller shown in FIG. 2A.
Figure 6E:
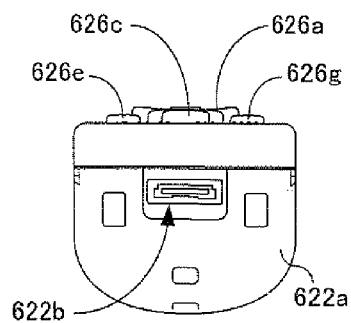
FIG. 6E shows an external view of the remote controller shown in FIG. 2A.
Figure 6B:
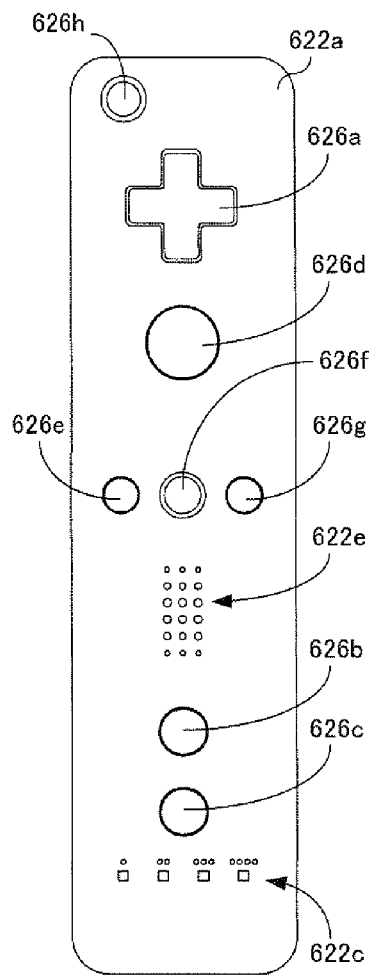
FIG. 6B shows an external view of the remote controller shown in FIG. 2A.
Figure 6C:
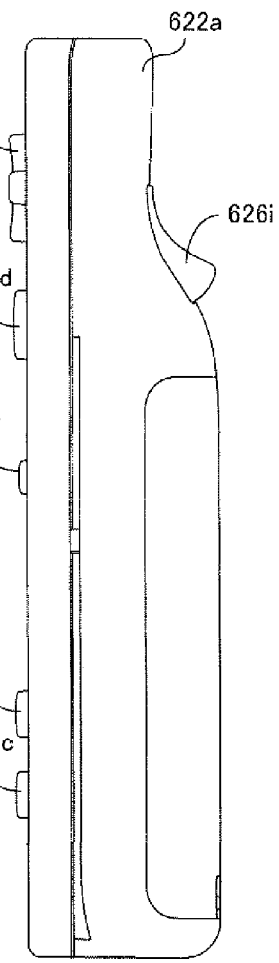
FIG. 6C shows an external view of the remote controller shown in FIG. 2A.
Figure 6D:
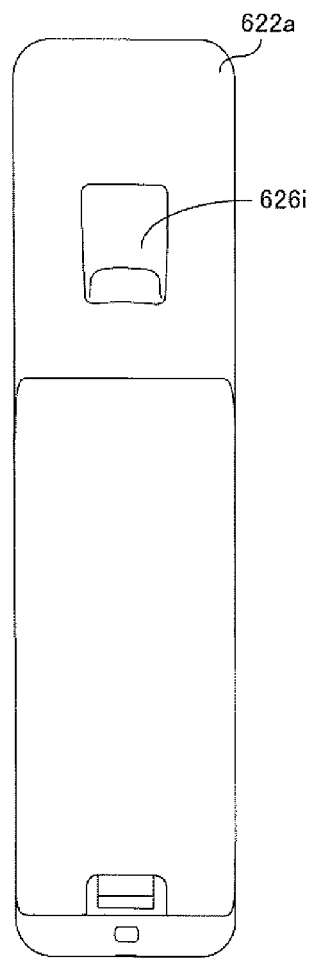
FIG. 6D shows an external view of the remote controller shown in FIG. 2A.

Hereinafter, a configuration of the remote controller 6 will be described with reference to FIGS. 6A to 6E. FIGS. 6A to 6E each show an example of an external view of the remote controller 6. FIG. 6A shows a front end surface of the remote controller 6. FIG. 6B shows a top surface of the remote controller 6. FIG. 6C shows a right side surface of the remote controller 6. FIG. 6D shows a bottom surface of the remote controller 6. FIG. 6E shows a rear edge surface of the remote controller 6.

As shown in FIGS. 6A to 6E, the remote controller 6 includes a housing 622a formed by plastic molding or the like. The housing 622a has an approximately parallelepiped shape. The size of the housing 622a is small enough to be held by one hand of a user. Input buttons 626 (a plurality of buttons or switches) are provided on the housing 622a. To be specific, as shown in FIG. 6B, a cross key 626a, a first button 626b, a second button 626c, an A button 626d, a minus button 626e, a HOME button 626f, a plus button 626g, and the power switch 626h are provided on the upper surface of the housing 622a. As shown in FIGS. 6C and 6D, a slope surface is formed on the bottom surface of the housing 622a. On the slope surface, a B trigger switch 626i is provided.

The cross key 626a is a four-direction push switch, which includes operation portions respectively corresponding to four directions indicated by arrows, i.e., front (or up), rear (or down), right and left and which is capable of providing operation instructions respectively corresponding to the four directions. By operating one of the operation portions, a player can, for example, indicate a direction in which a character or an object which the player can control (a player character or a player object) is to move, or give an instruction on a direction in which a cursor is to move.

The first button 626b and the second button 626c are push button switches. These buttons are used for game operations of, e.g., adjusting a viewpoint position or a viewing direction for a display of a three-dimensional game image, that is, adjusting a position or a viewing angle of a virtual camera. Alternatively, the first button 626b and the second button 626c may be used for performing operations that are the same as those performed using the A button 626d and the B trigger switch 626*i*, or may be used for supplementary operations for the operations performed using the A button 626*d* and the B trigger switch 626*i*.

The A button 626*d* is a push button switch which is used not to give a direction instruction but to cause a player character or a player object to perform an arbitrary action such as hitting (punching), throwing, grabbing (acquiring), riding, jumping or the like. For example, in an action game, an instruction to jump, punch, or move a weapon can be provided, for example. Also, in a role-playing game (RPG) or a simulation RPG, an instruction to acquire an item, or select or decide on a weapon or command can be provided, for example.

The minus button 626*e*, the HOME button 626*f*, the plus button 626*g* and the power switch 626*h* a real so push button switches. The minus button 626*e* is used to select a game mode. The HOME button 626*f* is used to display a game menu (a menu screen). The plus button 626*g* is used to, for example, start (resume) or pause a game. The power switch 626*h* is used to turn on/off the game apparatus 2 by remote control.

In this example, the remote controller 6 does not have a power switch for turning on/off the remote controller 6. The remote controller 6 is turned on when any one of the input buttons 626 of the remote controller 6 is operated, and the remote controller 6 is automatically turned off when the remote controller 6 is not operated for a predetermined period (e.g., 30 seconds) or longer.

The B trigger switch 626*i* is also a push button switch which is mainly used to perform such an input as to shoot a bullet by pulling the simulated trigger, or used to specify a position selected by the remote controller 6. By keep pressing the B trigger switch 626*i*, an action of the player object or a parameter can be maintained to be in a specific state. In a particular case, the B trigger switch 626*i* functions in the same manner as an ordinary B button. In such a case, the B trigger switch 626*i* is used to cancel an action having been determined by the A button 626*d*.

Further, as shown in FIG. 6E, an external extension connector 622*b* is provided on the rear end surface of the housing 622*a*. Further, as shown in FIG. 6B, an indicator 622*c* is provided on the upper surface of the housing 622*a* at the rear end surface side. The external extension connector 622*b* is used for, e.g., connecting to an extension controller that is another controller (not shown). The indicator 622*c* includes four LEDs, for example. By lighting up one of the four LEDs, identification information (controller number) about the remote controller 6 corresponding to the lit LED can be indicated. Also, a remaining battery level of the remote controller 6 can be indicated by the number of lit LEDs.

Figure 7:
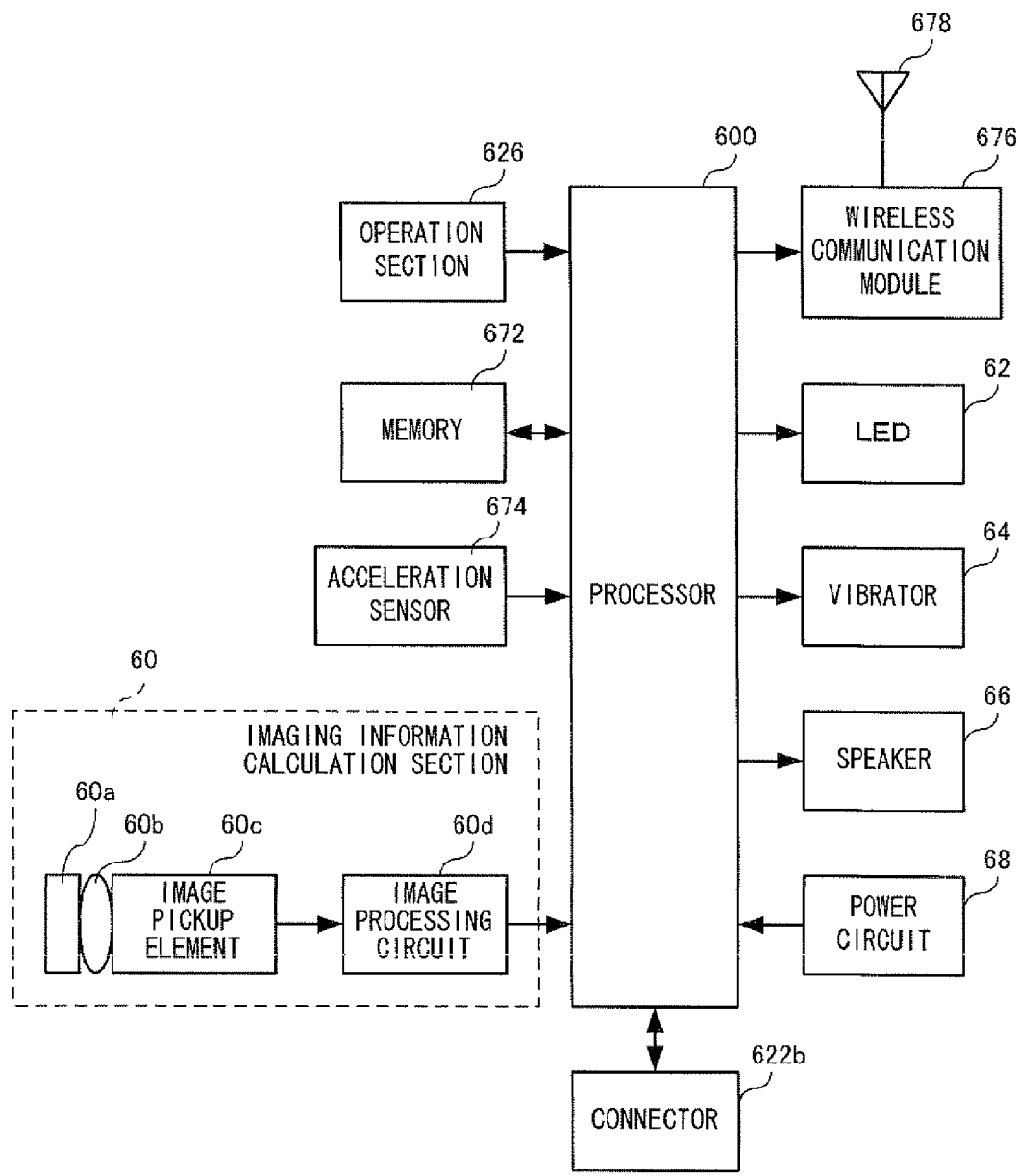
FIG. 7 is a block diagram showing an electrical configuration of the remote controller shown in FIG. 6.

The remote controller 6 further includes an imaging information calculation section 60 (see FIG. 7). As shown in FIG. 6A, a light entrance 622*d* of the imaging information calculation section 60 is provided at the front end surface of the housing 622*a*. The remote controller 6 has a speaker 66 (see FIG. 7) The speaker 66 is provided within the housing 622*a* such that a position of the speaker 66 corresponds to a position of sound holes 622*e* that are provided, as shown in FIG. 6B, at the upper surface of the housing 622*a* and between the first button 626*b* and the HOME button 626*f*.

Note that, the shape of the remote controller 6, the shapes, the number, the positions and the like of the input buttons 626, which are shown in FIGS. 6A to 6E, are merely examples. It is understood that the present invention can be realized even if these are modified as necessary. Operation means, including the remote controller 6, for operating the game apparatus 2 is not essential in the embodiment of the present invention. If it is necessary to operate the game apparatus 2, the information processing system 990 may include one or more of: operation buttons; a wired controller different from the infrared wireless controller; a pointing device; and an operation switch provided on the main body of the game apparatus 2. These variations also apply to the later-described handheld terminal 3.

FIG. 7 is a block diagram showing an electrical configuration of the remote controller 6. As shown in FIG. 7, the remote controller 6 includes a processor 600. Connected to the processor 600 via an internal bus (not shown) are the external extension connector 622*b*, the input buttons 626, a memory 672, an acceleration sensor 674, a wireless communication module 676, the imaging information calculation section 60, an LED 62, a vibrator 64, the speaker 66, and a power circuit 68. Further, an antenna 678 is connected to the wireless communication module 676.

The processor 600 manages overall control of the remote controller 6. The processor 600 uses, as input data, information (input information) that is inputted through: the input buttons 626 (626*a* to 626*i*); the acceleration sensor 674; or the imaging information calculation section 60, and transmits (inputs) the input data to the game apparatus 2 via the wireless communication module 676 and the antenna 678. At this point, the processor 600 uses the memory 672 as a work area or a buffer area.

Operation signals (operation data) provided from the above-described input buttons 626 (626*a* to 626*i*) are inputted to the processor 600, and the processor 600 temporarily stores the operation data in the memory 672.

The acceleration sensor 674 detects acceleration along with three axes of the remote controller 6, i.e., along with a vertical direction (y-axis direction), a horizontal direction (x-axis direction) and a front-rear direction (z-axis direction). Typically, the acceleration sensor 674 is of an electrostatic capacitance type. However, any other type of an acceleration sensor may be used to realize the acceleration sensor 674.

For example, the acceleration sensor 674 detects, at first predetermined intervals, acceleration (ax, ay, az) for the x-, y- and z-axes, respectively. Then, data indicating the detected acceleration (acceleration data) is inputted to the processor 600. For example, the acceleration sensor 674 detects, for each axis direction, acceleration in a range of −2.0 g to 2.0 g ("g" represents the gravitational acceleration; hereinafter, the gravitational acceleration is represented by "g") The processor 600 detects, at second predetermined intervals, the acceleration data provided from the acceleration sensor 674, and then temporarily stores the acceleration data in the memory 672. The processor 600 generates input data containing at least one of operation data, acceleration data and later-described marker coordinate data, and transmits the generated input data to the game apparatus 2 at third predetermined intervals (e.g., every 5 msec).

Although not shown in FIGS. 6A to 6E, in this example, the acceleration sensor 674 is provided, on a substrate within the housing 622*a*, near a position where the cross key 626*a* is disposed. The acceleration sensor 674 is not essential for implementing the present invention.

The wireless communication module 676 uses, for example, the Bluetooth (registered trademark) technology to modulate, using the input data, a carrier wave having a predetermined frequency, and radiates a resultant faint radio signal from the antenna 678. In other words, the input data is modulated by the wireless communication module 676 into a faint radio signal, and then transmitted from the antenna 678 (from the remote controller 6). The faint radio signal is received by the aforementioned wireless controller module 252 provided in the game apparatus 2. The received faint radio signal is subjected to demodulation and decoding. This allows the game apparatus 2 (CPU 210) to obtain the input data provided from the remote controller 6. Then, the CPU 210 performs game processing in accordance with the obtained input data and a program (game program).

As described above, the remote controller 6 is provided with the imaging information calculation section 60. The imaging information calculation section 60 includes an infrared filter 60a, a lens 60b, an image pickup element 60c and an image processing circuit 60d. The infrared filter 60a allows, among lights incident thereon through the front surface of the remote controller 6, only an infrared light to pass therethrough. As described above, the LEDs 52 and 53, which are provided in the vicinity of the display screen of the television 5, are infrared LEDs that each output an infrared light forward from the television 5. Therefore, by providing the infrared filter 60a, images of the LEDs 52 and 53 can be taken more precisely. The lens 60b condenses the infrared light having passed through the infrared filter 60a, and outputs the condensed infrared light to the image pickup element 60c. The image pickup element 60c is a solid-state image pickup element such as a CMOS sensor, CCD or the like. The image pickup element 60c takes an image of the infrared light condensed by the lens 60b. Accordingly, the image pickup element 60c takes an image of only the infrared light having passed through the infrared filter 60a, and generates image data of the image. Hereinafter, the image taken by the image pickup element 60c is referred to as a "taken image". The image data generated by the image pickup element 60c is processed by the image processing circuit 60d. The image processing circuit 60d calculates positions of imaging targets (LEDs 52 and 53) in the taken image, and coordinate values indicating the respective positions are outputted to the processor 600 as imaging data at predetermined time intervals. The game apparatus 2 displays a pointer on the television 5 in accordance with these coordinate values. The display on the television 5 is configured so as to correspond to operations of the pointer. This allows the user to perform various operations on the game apparatus 2 by moving the pointer to an icon, button or the like which the user sees on the screen.

Figure 8:
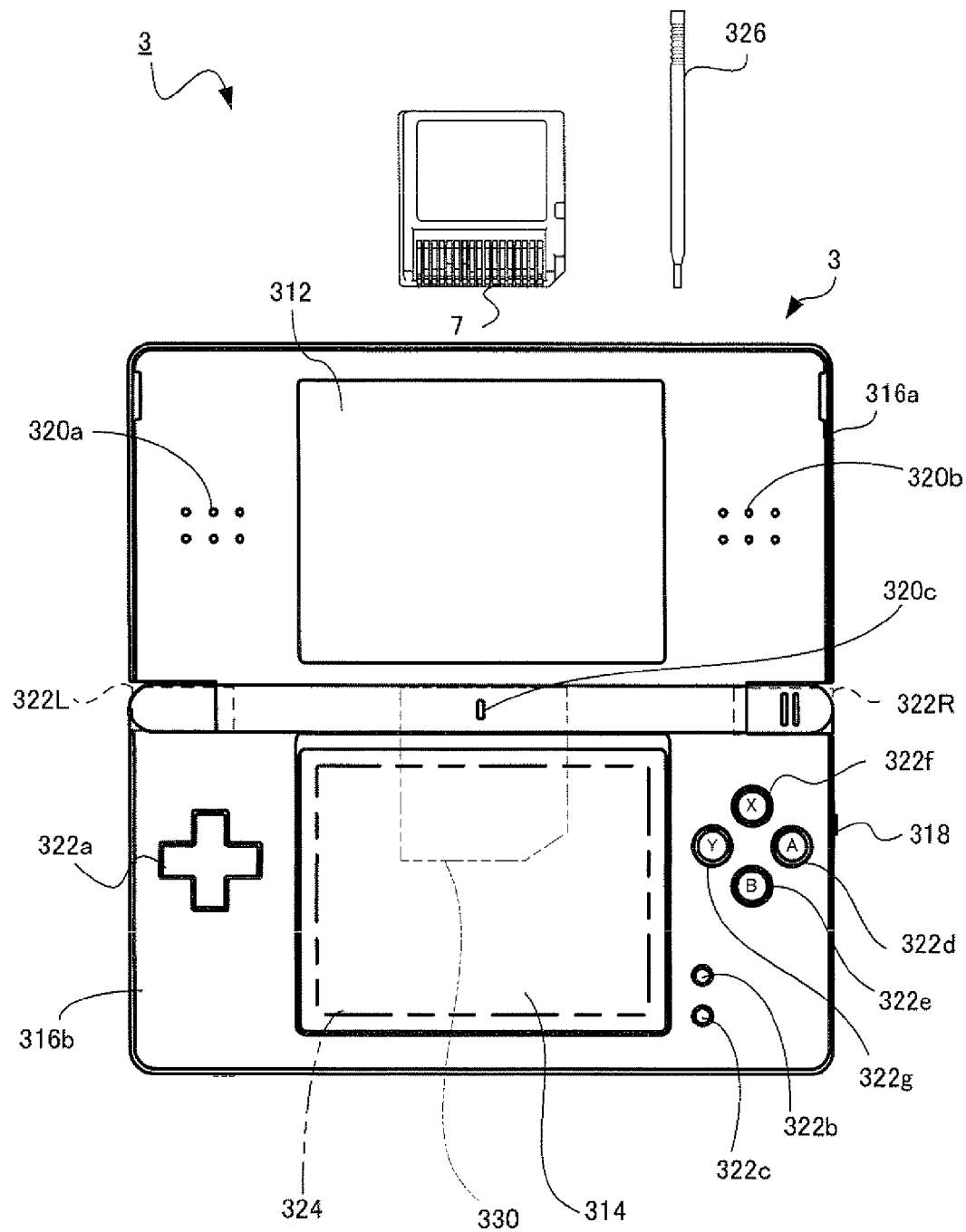
FIG. 8 shows an external view of a handheld terminal included in the game system shown in FIG. 2.

FIG. 8 shows the handheld terminal 3 included in the information processing system 990 shown in FIG. 2. The handheld terminal 3 is a processing apparatus for performing predetermined processing using a plurality of pieces of step count data measured by one or a plurality of pedometers 1. The handheld terminal 3 and each pedometer 1 transmit/receive data to/from each other by means of short-distance wireless communication such as infrared communication or IrDA.

The handheld terminal 3 shown in FIG. 8 is realized, for example, in the form of a handheld game apparatus. However, the handheld terminal 3 may be realized in an arbitrary form. For example, the handheld terminal 3 may be a mobile apparatus, a laptop computer, a PDA (Personal Digital Assistant), or a mobile phone.

The handheld terminal 3 includes a first liquid crystal display (LCD) 312 and a second LCD 314. The LCD 312 and the LCD 314 are accommodated in the housing 316 so as to be placed in predetermined positions, respectively. In this example, the housing 316 is structured with an upper housing 316a and a lower housing 316b. The LCD 312 is accommodated in the upper housing 316a, and the LCD 314 is accommodated in the lower housing 316b. As a result, the LCD 312 and the LCD 314 are vertically arranged (one above the other) in close proximity to each other.

Although in this example the LCDs are used as the displays, EL (Electronic Luminescence) displays or plasma displays may be used instead.

As is clear from FIG. 8, the upper housing 316a has a slightly larger plane shape than that of the LCD 312, and the upper housing 316a has an opening formed at one main surface thereof such that the display screen of the LCD 312 is exposed at a laterally central position on the one main surface. Also, the plane shape and the size of the lower housing 316b are set to be similar to those of the upper housing 316a, and the lower housing 316b has an opening formed at one main surface thereof such that the display screen of the LCD 314 is exposed at a laterally central position on the one main surface. A power switch 318 is provided on a right side surface of the lower housing 316b.

The upper housing 316a is provided with sound holes 320a and 320b for loudspeakers 336a and 336b (see FIG. 9), respectively. The sound holes 320a and 320b are positioned to the left and right of the LCD 312, respectively.

A lower side (a lower edge) of the upper housing 316a and an upper side (an upper edge) of the lower housing 316b are partially connected to each other in a rotatable manner. Accordingly, for example, when a user does not play a game, damages to the display screens of the LCD 312 and the LCD 314 can be prevented by rotating and folding the upper housing 316a such that the display screens of the LCD 312 and the LCD 314 face each other. However, the upper housing 316a and the lower housing 316b may not necessarily be connected to each other in such a rotatable manner. The housing 316, in which the upper housing 316a and the lower housing 316b are provided (fixedly provided) as one unit, may be structured.

A microphone hole 320c for a microphone (not shown) is formed at the center of the joint connecting the upper housing 316a and the lower housing 316b. This allows game processing to be performed in accordance with audio signals obtained from a sound, voice, breathing sound or the like picked up by the microphone.

The lower housing 316b is provided with operation switches 322 (322a, 322b, 322c, 322d, 322e, 322f, 322g, 322L and 322R).

The operation switches 322 include a direction instruction switch (cross switch) 322a, a start switch 322b, a select switch 322c, an action switch (A button) 322d, an action switch (B button) 322e, an actions witch (x button) 322f, an action switch (Y button) 322g, an action switch (L button) 322L, and an action switch (R button) 322R. The switch 322a is provided to the left side of the LCD 314 on the one main surface of the lower housing 316b. The switches 322b to 322g are provided to the right side of the LCD 314 on the one main surface of the lower housing 316b. Further, the action switches 322L and 322R are respectively provided at left and right corner edges of a top edge surface of the lower housing 316b. The action switches 322L and 322R are provided at the back of the lower housing 316b. In the front view shown in FIG. 8, the action switches 322L and 322R are indicated by dotted lines since these switches are hidden behind the joint.

The direction instruction switch 322a functions as a digital joystick, and by operating one of four pressing portions thereof, a user or player specifies, for example, a traveling direction (moving direction) of a player object (or a player character) which the user or player is able to control, or a traveling direction of a cursor. Particular functions can be assigned to the pressing portions, respectively. The user or player can designate (specify) an assigned function by operating a corresponding one of the four pressing portions.

The start switch 322b is structured as a push button. The start switch 322b is used for, for example, starting (resuming) or pausing a game. The select switch 322c is also structured as a push button, and used for selecting a game mode, for example.

The action switch 322d, i.e., the A button, is structured as a push button that is capable of not providing direction instructions but causing a player object to perform an arbitrary action, e.g., hit (punch), throw, grab (acquire), ride or jump. For example, in an action game, the A button 322d can provide an instruction to cause the player character to jump, punch, move a weapon, or the like. Also, in a roll-playing game (RPG) or a simulation RPG, the A button 322d can provide an instruction to, for example, acquire an item, or to select or decide on a command or weapon. The action switch 322e, i.e., the B button, is structured as a push button that is used for, e.g., changing a game mode selected by the select switch 322c, or canceling an action determined by the A button 322d.

The action switch 322f, i.e., the X button, and the action switch 322g, i.e., the Y button, are each structured as a push button. These switches are used for supplementary operations when only the A button 322d and the B button 322e are not enough to play the game. Note that, however, the X button 322f and the Y button 322g can be used to perform the same operations as those performed using the A button 322d and the B button 322e.

It is understood that the X button 322f and the Y button 322g are not necessarily used in a game play.

The action switch 322L (left push button) and the action switch 322R (right push button) are each structured as a push button. The left push button (L button) 322L and the right push button (R button) 322R can be used to perform the same operations as those performed using the A button 322d and the B button 322e. The left push button (L button) 322L and the right push button (R button) 322R can be used to perform supplementary operations for the operations performed using the A button 322d and the B button 322e. The L button 322L and the R button 322R can change the functions, which are assigned to the direction instruction switch 322a, the A button 322d, the B button 322e, the X button 322f and the Y button 322g, to other functions.

A touch panel 324 is mounted on the upper surface of the LCD 314. The touch panel 324 may be of any of a resistive film type, an optical (infrared) type and an electrostatic capacitance coupling type, for example. The touch panel 324 is a pointing device that allows a user to designate an arbitrary position (coordinates) on the screen of the LCD 314. When the user operates (performs a touch input on) the touch panel 324 by pressing, stroking or touching the upper surface thereof with a stick 326, a pen (stylus) or a finger (hereinafter, these are occasionally referred to as "the stick 326 or the like"), coordinates of a position at which the stick 326 or the like has been operated are detected, and coordinate data corresponding to the detected coordinates is outputted.

In this example, the resolution of the display screen of the LCD 314 may be 256 dots×192 dots (or may be a different resolution) (the LCD 312 has the same or substantially the same resolution). The detection accuracy of the touch panel 324 is also 256 dots×192 dots in correspondence with the resolution of the display screen. However, the detection accuracy of the touch panel 324 may be either lower or higher than the resolution of the display screen.

The LCDs 312 and 314 can display different game screens from each other. For example, in a racing game, one LCD can display a screen that shows a view seen from a driver's seat, and the other LCD can display a screen that shows the whole race (the whole course). Further, in an RPG, one LCD can display a map or a character such as a player object, and the other LCD can display an item owned by the player object. Still further, one LCD can display a game screen that shows a player object, a non-player object and the like, and the other LCD can display another game screen, which shows information about the player object, the non-player object and the like, or an operation screen for operating the player object. The two LCDs 312 and 314 may be collectively used as one screen. In this manner, a gigantic monster (enemy object), which the player object has to beat, can be displayed.

Accordingly, by operating the touch panel 324 with the stick 326 or the like, the player can designate (or control) an image of the player object, an enemy object, an item object, a control object or the like displayed on the screen of the LCD 314, or select or input a command. Further, by operating the touch panel 324 with the stick 326 or the like, the player can change a direction (viewing direction) of a virtual camera (viewpoint) provided in a virtual game space (three-dimensional game space), or designate a scrolling direction of the game screen (map).

Note that, depending on a game type, other input instructions can be provided using the touch panel 324. For example, characters, numbers, symbols or the like can be inputted by handwriting on the touch panel 324 of the LCD 314.

As described above, the handheld terminal 3 has the LCDs 312 and 314 that are two display screens, and the touch panel 324 is provided on the upper surface of either one of the LCDs (in this example, LCD 314). Thus, the handheld terminal 3 has two screens (312, 314) and two systems of operation sections (322, 324).

Although in this example the first LCD 312 and the second LCD 314 are arranged vertically, the arrangement of the two LCDs may be changed as necessary. In another example, the first LCD 312 and the second LCD 314 may be arranged laterally.

Further, in this example, two LCDs are provided. However, the number of LCDs used as display means may be changed as necessary. In another example, one vertically long LCD is provided, and a display area thereof may be divided into upper and lower display areas that display two game screens, respectively. Alternatively, one horizontally long LCD is provided, and a display area thereof may be divided into left and right display areas that display two game screens, respectively.

The stick 326 may be accommodated in, for example, an insertion opening (not shown) provided in the lower housing 316b. The stick 326 is removed from the insertion opening when necessary. However, when the stick 326 is not provided, the insertion opening is not necessary.

The handheld terminal 3 is structured such that the memory card (or cartridge) 7 can be removably inserted thereinto. The memory card 7 is inserted into an insertion slot 330 provided at the top edge surface of the lower housing 316b (indicated by dotted lines in FIG. 8). Although not shown in FIG. 8, at the bottom of the insertion slot 330, a connector 332 (see FIG. 9) is provided, which is to be engaged with a connector 71 that is provided at a head portion on an insertion side of the memory card 7. Accordingly, when the memory card 7 is inserted into the insertion slot 330, these connectors are engaged with each other, and the CPU core 360 (see FIG. 9) of the handheld terminal 3 is enabled to access the memory card 7.

Figure 11:
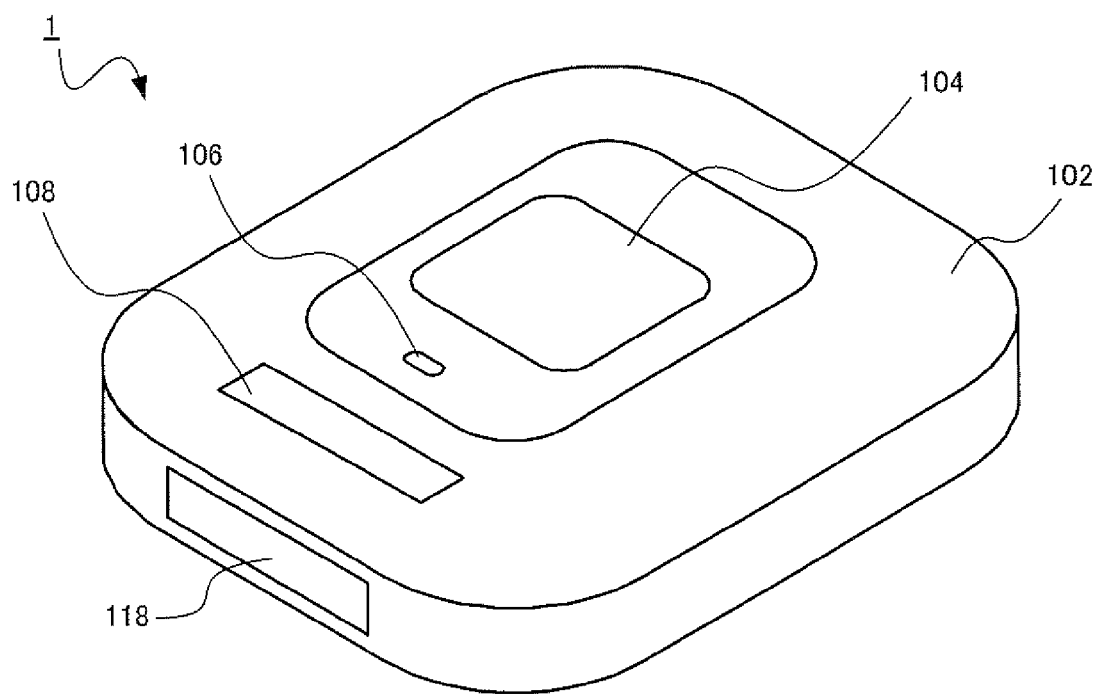
FIG. 11 is a perspective external view of a pedometer shown in FIG. 2A.

As shown in FIG. 11, the pedometer 1 may be provided with a display section 108 for displaying a total step count value or the like. Although not shown in FIG. 8, for example, the lower housing 316b has: a battery housing box provided at the back surface thereof; a volume switch, an earphone jack and the like provided at the bottom edge surface (bottom surface) thereof; and an external expansion connector and the like provided at the top edge surface (top surface) thereof.

Figure 9:
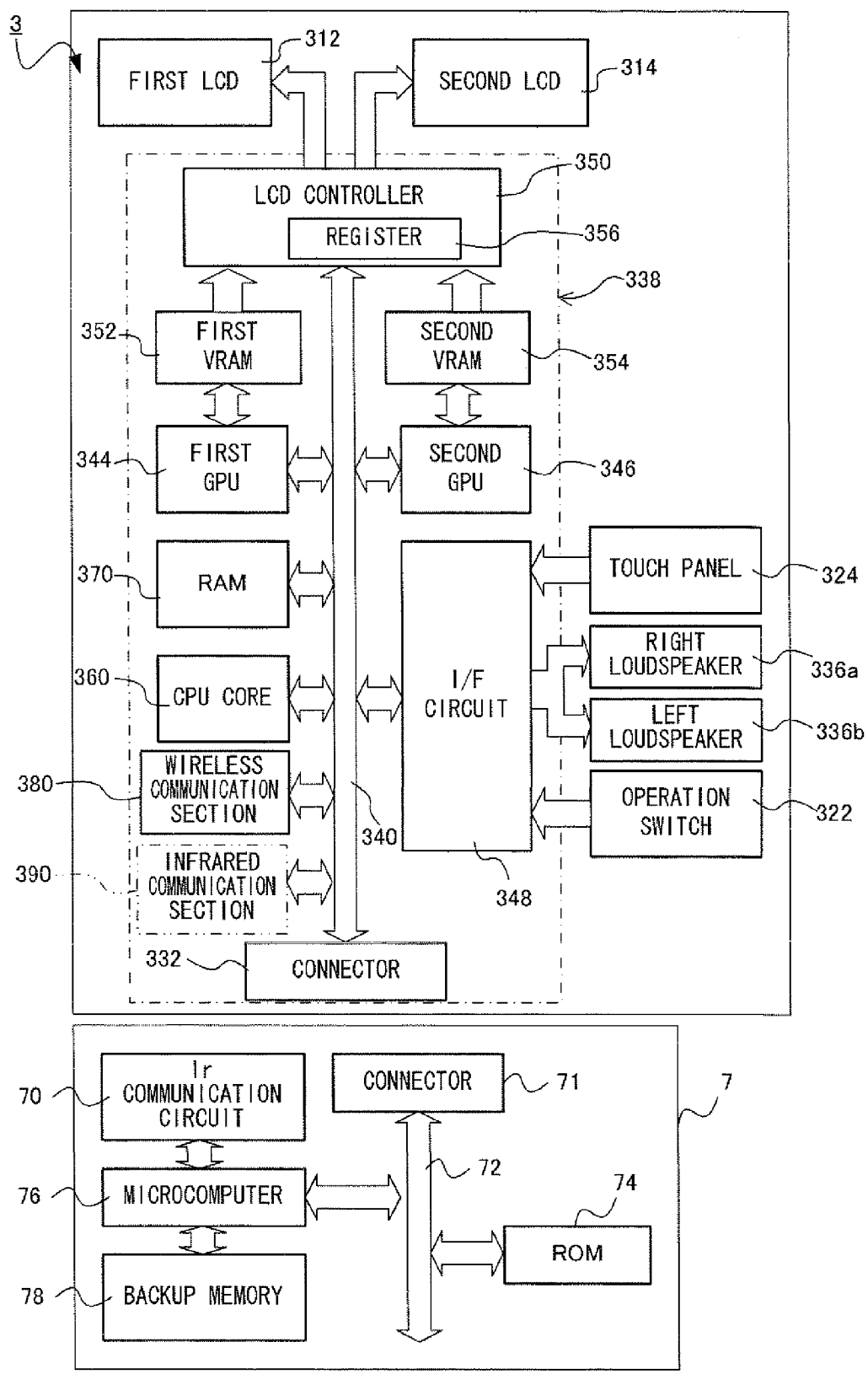
FIG. 9 is a block diagram showing an electrical configuration of the handheld terminal shown in FIG. 8.

FIG. 9 is a block diagram showing an electrical configuration of the handheld terminal 3.

First, a correspondence relationship between the game apparatus 2 of FIG. 1 and the handheld terminal 3 of FIG. 9 is described. The LCD 312 and/or the LCD 314 are examples of the display section 31. The operation switches 322 of FIG. 9 are examples of the input section 32. A combination of a first VRAM 352, a second VRAM 354, a first GPU 344, a second GPU 346 and an LCD controller 350 of FIG. 9 is an example of the handheld terminal image processing section 34. The CPU core 360 of FIG. 9 is an example of the handheld terminal CPU 36 of FIG. 1. A RAM 370 of FIG. 9 is an example of the handheld terminal storage section 37 of FIG. 1. A wireless communication section 380 of FIG. 9 is an example of the second wireless transmission/reception section 38. An Ir communication circuit 70 or an infrared communication section 390 of FIG. 9 is an example of the second infrared communication section 39.

As shown in FIG. 9, the handheld terminal 3 includes an electronic circuit substrate 338. Circuit components such as the above-described CPU core 360 and the like are mounted on the electronic circuit substrate 338. The CPU core 360 is connected to the aforementioned connector 332 via a bus 340, and also connected to the RAM 370, the first graphic processing unit (GPU) 344, the second GPU 346, an input/output interface circuit (hereinafter, referred to as an "I/F circuit") 348, the LCD controller 350 and the wireless communication section 380.

As described above, the memory card 7 is connected to the connector 332 in a removable manner. The memory card 7 includes the connector 71 to be engaged with the connector 332. A ROM 74 and a microcomputer 76 are connected to the connector 71 via a bus 72. A backup memory 78 and the Ir communication circuit 70 are connected to the microcomputer 76.

Under control of the CPU core 360, the microcomputer 76 writes/reads data into/from the backup memory 78, and controls infrared communication (Ir communication) that uses the Ir communication circuit 70. To be specific, the CPU core 360 writes/reads data into/from the backup memory 78 via the microcomputer 76. Further, the CPU core 360 transmits/receives data to/from the pedometer 1 via the microcomputer 76 and the Ir communication circuit 70. Although not shown in FIG. 8, the Ir communication circuit 70 has a communication port provided at a part that is exposed when the memory card 7 is inserted into the insertion slot 30 (e.g., at a top edge surface).

Note that, in the case where the pedometer 1 is provided with the display section 108, the display section 108 is connected to a microcomputer 110 of the pedometer 1. Although in the present embodiment the handheld terminal 3 is not provided with the infrared communication section 390, the handheld terminal 3 may include the infrared communication section 390 as a substitute for the Ir communication circuit 70, as one example. Then, infrared communication may be performed using the infrared communication section 390.

The ROM 74 prestores: a game program of a game to be executed by the handheld terminal 3; image data (images of characters and objects, background images, item images, icon (button) images, message images and the like); data (sound data) of necessary sounds (music) for the game; and the like. The backup memory 78 stores (saves) progress data, result data and the like of the game. Used as the backup memory 78 may be, for example, a nonvolatile memory such as a flash memory, or an SRAM that is supplied with power from a battery.

The RAM 370 is used as a buffer memory or a working memory. To be specific, the CPU core 360 loads, into the RAM 370, the game program, the image data, the sound data and the like stored in the ROM 74 of the memory card 7, and performs game processing in accordance with the loaded game program. The CPU core 360 performs the game processing while storing, in the RAM 370, data that is temporarily generated in accordance with a progress in the game (e.g., game data and flag data).

The first GPU 344 and the second GPU 346 each constitute a part of rendering means, and are each structured as a single-chip ASIC. The first GPU 344 and the second GPU 346 each receive a graphics command from the CPU core 360 and generate image data in accordance with the graphics command. The CPU core 360 provides each of the first GPU 344 and the second GPU 346 with the graphics command and an image generation program (included in the game program) necessary for generating the image data.

The first video RAM 352 (hereinafter, referred to as "the first VRAM 352") is connected to the first GPU 344. The second VRAM 354 is connected to the second GPU 346. The first GPU 344 and the second GPU 346 access the first VRAM 352 and the second VRAM 354, respectively, so as to obtain necessary data (image data: polygon data, texture data and the like) for the first GPU 344 and the second GPU 346 to execute the graphics command.

The CPU core 360 writes image data necessary for rendering into the first VRAM 352 and the second VRAM 354 via the first GPU 344 and the second GPU 346, respectively. The first GPU 344 accesses the first VRAM 352 to generate image data for rendering, and stores the image data in a rendering buffer of the first VRAM 352. The second GPU 346 accesses the second VRAM 354 to generate image data for rendering, and stores the image data in a rendering buffer of the second VRAM 354. A frame buffer, line buffer or the like may be employed as the rendering buffer.

The first VRAM 352 and the second VRAM 354 are connected to the LCD controller 350. The LCD controller 350 includes a register 356. The register 356 is configured as a 1-bit register that stores a value (data value) of either "0" or "1" in accordance with an instruction from the CPU core 360. When the data value of the register 356 is "0", the LCD controller 350 outputs the image data generated by the first GPU 344 to the LCD 312, and outputs the image data generated by the second GPU 346 to the LCD 314. When the data value of the register 356 is "1", the LCD controller 350 outputs the image data generated by the first GPU 344 to the LCD 314, and outputs the image data generated by the second GPU 346 to the LCD 312.

The LCD controller 350 reads the image data directly from the first VRAM 352 and the second VRAM 354, or reads the image data from the first VRAM 352 and the second VRAM 354 via the first GPU 344 and the second GPU 346, respectively.

The first VRAM 352 and the second VRAM 354 may be included in the RAM 370, or the rendering buffers and z-buffers thereof may be provided in the RAM 370.

The operation switches 322, the touch panel 324, and the loudspeakers 336a and 336b are connected to the I/F circuit 348. Here, the operation switches 322 are the above-described switches 322a, 322b, 322c, 322d, 322e, 322f, 322g, 322L and 322R. When any one of the operation switches 322 is operated, a corresponding operation signal (operation data) is inputted to the CPU core 360 via the I/F circuit 348. Also, coordinate data provided from the touch panel 324 is inputted to the CPU core 360 via the I/F circuit 348. Further, the CPU core 360 reads, from the RAM 370, data of necessary sounds for a game such as game music (BGM), sound effects, game character sounds (onomatopoeia) and the like, and outputs these sounds from the loudspeakers 336a and 336b via the I/F circuit 348.

The wireless communication section 380 is communication means for transmitting/receiving data to/from other handheld terminals 3 or the game apparatus 2 through wireless communication. Note that, strength of faint radio waves transmitted to or received from the handheld terminal 3 is set to such a level as not to be affected by the restrictions of the radio law. When the CPU core 360 provides such data as game data or a command to the wireless communication section 380, the wireless communication section 380 modulates data, which is to be transmitted to a receiving end, into a radio signal, and transmits the radio signal from an antenna. Also, the wireless communication section 380 receives a radio signal from a transmitting end through the same antenna and modulates the radio signal into data, and provides the data to the CPU core 360. Through the wireless communication section 380, the handheld terminal 3 is able to transmit/receive data to/from other handheld terminals 3 to play a network game with the other handheld terminals 3. The handheld terminal 3 is able to communicate with the game apparatus 2 via the wireless communication section 380.

Figure 10:
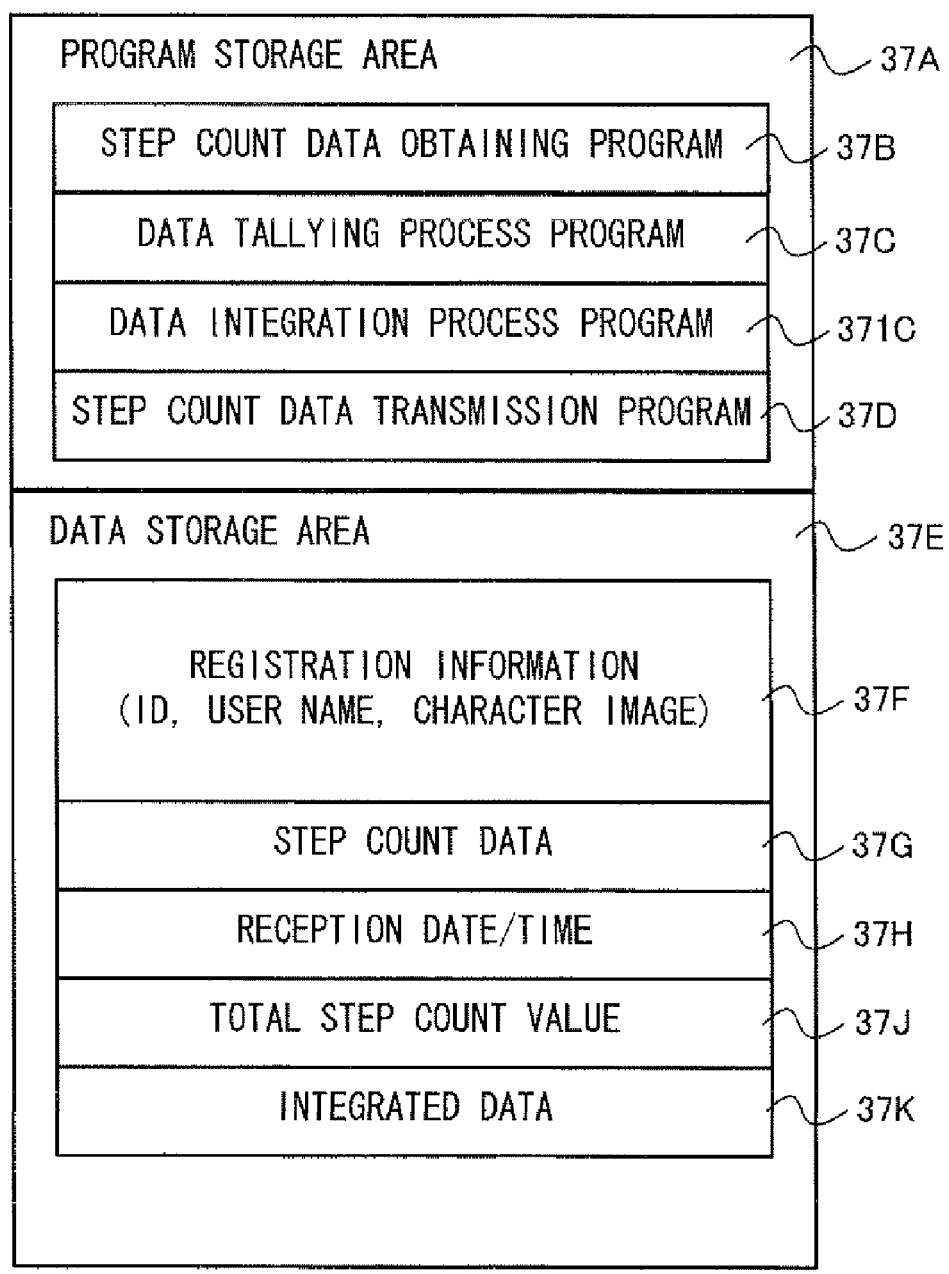
FIG. 10 shows a memory map of the handheld terminal shown in FIG. 8.

FIG. 10 shows an example of a memory map of the RAM 370 of the handheld terminal 3. The memory map includes a program storage area 37A and a data storage area 37E. Note that, FIG. 10 shows a part of the memory map. The program storage area 37A and the data storage area 37E also store other programs and data necessary for processing, such as an image generating and displaying program, an operation data obtaining program, image data, and the like.

The program storage area 37A stores a step count data obtaining program 37B, a data tallying process program 37C, a data integration process program 371C, and a step count data transmission program 37D. Note that, a group of these programs is equivalent to the data transfer program 379.

When the CPU core 360 executes the step count data obtaining program 37B, the CPU core 360 obtains step count data from the pedometer 1. When the CPU core 360 executes the data tallying process program 37C, the CPU core 360 generates daily tallied data by tallying up minutely data and/or hourly data received from the pedometer 1. The daily tallied data may be generated in such a manner that the CPU core 360 calculates, for example, a mean value of the minutely or hourly data, or a difference value between a maximum value and a minimum value of the minutely or hourly data.

When the CPU core 360 executes the data tallying process program 37C in the case where the handheld terminal 3 receives step count data from the pedometer 1 for the first time, the CPU 360 generates daily step count data (i.e., daily tallied data) for all the received step count data. In the case where the step count data is received from the pedometer 1 for the first time, the generated daily tallied data, and also received minutely data, are integrated data 37k to be stored in the data storage area 37E.

When the CPU core 360 executes the data tallying process program 37C in the case where the handheld terminal 3 receives step count data from the pedometer 1 for the second time or more, the CPU 360 detects newly received step count data, and generates daily step count data based on the newly received step count data (hereinafter referred to as "additional daily tallied data").

When the CPU core 360 executes the data integration process program 371C, the CPU core 360 stores the additional daily tallied data in a form specific to additionally stored data, which additional daily tallied data is generated based on minutely step count data and/or hourly step count data received from the pedometer 1. To be specific, the CPU core 360 combines the previously generated daily tallied data with the "additional daily tallied data", and stores the combined data. Further, the CPU core 360 combines the previously stored minutely data with newly received minutely data, and then stores the combined data. A result of combining the minutely data in the above manner and a result of combining the daily tallied data in the above manner are stored as the integrated data 37k. Note that, the integrated data 37k may be either one of a result of combining the minutely data or a result of combining the daily tallied data. The integrated data 37k is not limited to the above. The integrated data 37k may be a value that is obtained from calculating, in a different manner from the above, the received minutely data and/or the received hourly data (e.g., a mean value, a difference between a maximum value and a minimum value, or the like).

Note that, by executing the data integration process program 371C, the CPU core 360 may sort the received step count data for each user, and generate data derived from the sorted step count data, and store the generated data as the integrated data 37k in the backup memory 78. Alternatively, the CPU core 360 may receive hourly data and daily data by executing the data integration process program 371C. Further, although in the above example the CPU core 360 tallies up daily step count data, the CPU core 360 may tally up weekly step count data, instead.

For example, data volume of the integrated data 37k may be such that the integrated data 37k can contain, at the maximum minutely data for 28 days and daily data for 5 years. In this case, the CPU core 360 can discard data that has been obtained prior to these periods. Also, the CPU core 360 tallies up daily data based on received minutely data or received hourly data, and adds the tallied daily data to saved data in the memory card 7 (i.e., accumulates the data). Further, the CPU core 360 adds the received minutely data to the saved data in the memory card 7 (i.e., accumulates the data). Thus, the processing based on the data integration process program 371C is data accumulation processing. In other words, the saved data is generated based on a plurality of pieces of data received from the pedometer. Note that, the integrated data 37k may be a result of either only tallying up a plurality of pieces of data or only accumulating a plurality of pieces of data.

When the CPU core 360 executes the step count data transmission program 37D, the CPU core 360 transmits the step count data to the game apparatus 2. At this point, the handheld terminal 3 transmits, to the game apparatus 2, all the integrated data 37k contained in the saved data of the RAM 370. After receiving all the integrated data 37k of the handheld terminal 3, the game apparatus 2 extracts apart of the integrated data 37k (e.g., daily data for recent 210 days), and stores the extracted data in the external main memory 220. The other received data (minutely data, and daily data older than the daily data for the recent 210 days) is discarded.

The data storage area 37E stores data read from the ROM 74 or from the backup memory 78, or stores data generated or obtained through processing.

Registration information 379 is registration information of a user of the pedometer 1. To be specific, the CPU core 360 stores a user name, a character image (image data of a character used by the user in the game) and the like in association with an ID of the pedometer 1. In this example, four pedometers 1 can be registered at the maximum in one handheld terminal 3. The user name and the character image are inputted or specified by the user at initial setting. The registration information is stored in the backup memory 78, and loaded from the backup memory 78 to the RAM 370 as necessary.

A reception date/time 37H is data in which a reception date and time, at which a process of obtaining step count data from the pedometer 1 has been most recently performed, are associated with the ID of the pedometer 1. The reception date and time are stored in the backup memory 78. When the process of obtaining step count data from the pedometer 1 is performed, the reception date and time are read from the backup memory 78. Accordingly, step count data can be obtained from the pedometer 1 for a period from the reception date and time, which are read from the backup memory 78, to a current date and time, which are obtained from the internal clock circuit. When the step count data is obtained, the reception date and time are updated to the current date and time, and then stored in the backup memory 78.

A total step count value 37J is data which is generated by the CPU core 360 based on step count data and which indicates the number of steps having been taken by the user. Daily data and monthly data may be stored as the total step count value 37J. However, the total step count value 37J is not essential for the embodiment of the present invention.

As described above, the integrated data 37k contains daily tallied step count data and minutely step count data. In the case where the infrared communication section 390 receives step count data for the first time, the integrated data 37k to be generated are: a result of tallying, by the CPU core 360 using the data tallying process program 37C, newly received step count data for each day, and newly received minutely data. In the case where the infrared communication section 390 further receives step count data from the pedometer 1, the integrated data 37k is generated as a result of tallying, by the CPU core 360 using the data tallying process program 37C, newly received step count data for each day, and adding, by the CPU core 360 using the data integration process program 371C, the resultant new daily tallied data and newly received minutely data to the existing data.

(Configuration of the Pedometer 1)

Hereinafter, the pedometer 1 will be described with reference to FIGS. 11 to 13.

FIG. 11 is a perspective view showing an example of the pedometer 1. The pedometer 1 includes a housing 102 having an approximately parallelepiped shape. The housing 102 is small enough to be easily accommodated in, e.g., a pocket of a user. As one example, longitudinal and lateral lengths thereof are each approximately 3 to 4 cm, and a thickness thereof is approximately 1 cm. A push button 104 is provided on one main surface (upper surface) of the housing 102. If the user presses the push button 104 when the Ir communication circuit 70 of the memory card 7 is in a communication standby state, the pedometer 1 starts communicating with the memory card 7, i.e., with the handheld terminal 3. Further, an LED 106 is provided at a peripheral portion of the push button 104. The LED 106 is, for example, a two-color LED whose color or blinking pattern indicates an operation state of the pedometer 1. Also, an Ir communication circuit 118 is provided at a side surface (front end surface) of the housing 102. Here, used as a power source for operating the pedometer 1 is a coin cell lithium battery (CR 2032), for example. A battery lid is removably provided at the other main surface (bottom surface) of the housing 102.

FIG. 12 is a block diagram showing an example of an electrical configuration of the pedometer 1. The pedometer 1 includes the microcomputer 110, and a shock sensor 114 is connected to the microcomputer 110 via the amplifying circuit 112. Also, the push button 104, the LED 10C, an EEPROM 116 and the Ir communication circuit 118 are connected to the microcomputer 110.

The microcomputer 110 is a low power consumption microcomputer including a pedometer algorithm therein. The microcomputer 110 controls overall operations of the pedometer 1, for example: detecting output data from the shock sensor 114; writing and reading data into and from the EEPROM 116; causing the LED 106 to blink; and performing infrared communication using the Ir communication circuit 118.

The shock sensor 114 detects jiggling motion of the user in response to walking of the user. For example, a shock sensor (an acceleration sensor) for detecting a shock applied to a HDD may be used as the shock sensor 114. In this example, the shock sensor 114 is provided so as to detect shocks with respect to two axes. This enables the pedometer 1 to measure or detect the number of steps taken by the user while the pedometer 1 is kept in a pocket, bag or the like. Output from the shock sensor 114 is amplified by the amplifying circuit 112, and then inputted to the microcomputer 110. The microcomputer 110 includes an AD converter. The microcomputer 110 samples the output of the shock sensor 114 to obtain output data (acceleration data). The microcomputer 110 counts the number of steps based on the output data and the pedometer algorithm, and sequentially stores, in the EEPROM 116, a cumulative value of the number of steps (a step count) for each unit time. In other words, the EPPROM 116 stores, as step count data, a history of step count values for respective unit times.

However, a storage area of the EEPROM 116 for the step count data is limited. For example, in the case of storing a step count value every minute, the EEPROM 116 can store step count histories for approximately 7 days. When the storage area becomes full, the oldest step count value therein is overwritten. Although in this example the unit time for storing the step count value is set to one minute, the unit time may be changed to one hour, one day or the like, as necessary.

The microcomputer 110 controls the color, blinking pattern or the like of the LED 106 in accordance with an operation state of the pedometer 1. For example, when a step count of a day exceeds a predetermined step count, the color of the LED 106 is changed from red to yellow green. Further, when the push button 104 is pressed, the microcomputer 110 uses the Ir communication circuit 118 to start communicating with the handheld terminal 3 (memory card 7), and causes the LED 106 to blink for confirmation of the start of the communication as well as confirmation of the operation state of the pedometer 1.

When the communication starts in response to pressing of the push button 104, the microcomputer 110 reads a pedometer ID (Identification information) from an internal ROM or the EEPROM 116, and transmits data containing the ID to the handheld terminal 3 via the Ir communication circuit 18. Thereafter, upon receiving from the handheld terminal 3 a request for step count data, the microcomputer 110 reads necessary step count data from the EEPROM 116, and transmits the read step count data to the handheld terminal 3. Since the handheld terminal 3 stores information about a date and time at which step count data has previously been received from the pedometer 1 (the reception date/time 37H), and requests for step count values for a necessary time period or requests for a necessary number of step count values, the microcomputer 110 goes back in time from the most recent step count value so as to read the step count values for the necessary time period or to read the necessary number of step count values, and then transmits the read step count values to the handheld terminal 3.

FIG. 13 shows an example of a data format of the step count data stored in the EEPROM 116. As shown in FIG. 13, the EEPROM 116 stores a total step count for each minute in association with a corresponding time in minutes (e.g., stores 60 steps in association with Dec. 15, 2008, 05:05). Note that, the data format for storing the step count data is not limited to the above. The EEPROM 116 may store a total step count for each ten minutes or for each hour, for example.

(Description of Operations of the Information Processing System 990)

In view of the above descriptions with reference to FIGS. 2A to 13, functions and operations of the information processing system 990 shown in FIG. 2 are described below with reference to FIGS. 14A to 21.

(Communication Between the Pedometer 1 and the Handheld Terminal 3)

Described below with reference to FIGS. 14A to 14C and 15 is processing that is performed when step count data is transmitted between the pedometer 1 and the handheld terminal 3.

Figure 14A:
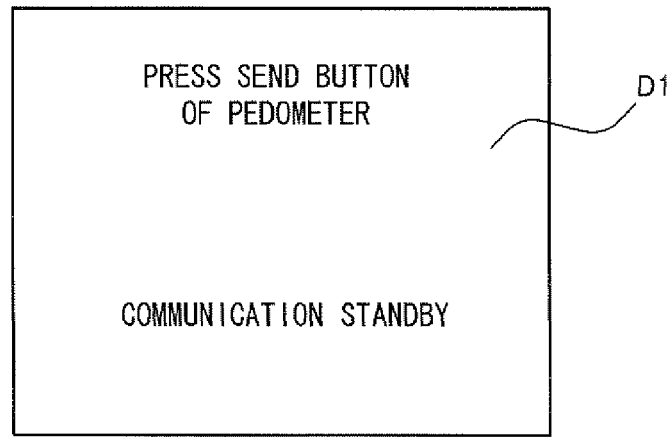
FIG. 14A shows an example of a screen that is displayed on the handheld terminal shown in FIG. 8 when the handheld terminal obtains the step count data from the pedometer.

FIG. 14A shows a screen D1 that is displayed on the first LCD 312 of the handheld terminal 3 immediately prior to the start of the step count data communication. Displayed here are, for example, messages "PRESS SEND BUTTON OF PEDOMETER" and "COMMUNICATION STANDBY". When the user starts later described health software by operating the handheld terminal 3, and selects an item "OBTAIN DATA FROM PEDOMETER" (see FIG. 19A) from a predetermined menu, the CPU core 360 displays the screen D1 on the first LCD 312. This is a standby state of the handheld terminal 3. In this state, the handheld terminal 3 detects infrared light from the pedometer 1. Note that, alternatively, the CPU core 360 may display the screen D1 on the LCD 314 (this alternative applies, in later descriptions, to all the screens displayed on the handheld terminal 3).

Figure 14B:
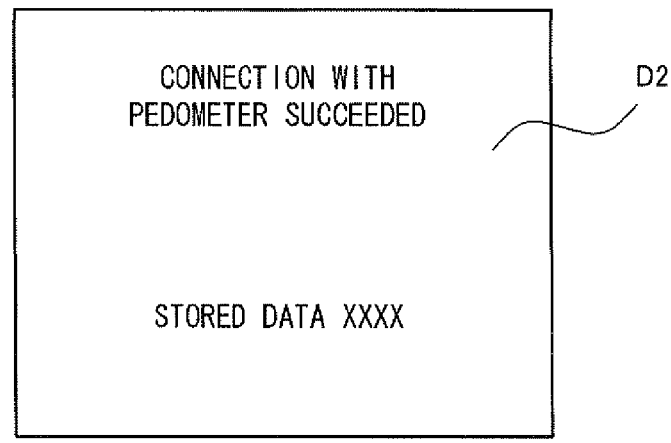
FIG. 14B shows an example of a screen that is displayed on the handheld terminal shown in FIG. 8 when the handheld terminal obtains the step count data from the pedometer.

FIG. 14B shows a screen D2 that is displayed on the LCD 312 when the handheld terminal 3 has successfully communicated with the pedometer 1. The handheld terminal 3 displays, for example, a message "COMMUNICATION WITH PEDOMETER SUCCEEDED". In this case, it is preferred that a data No. xxxx (x is a number, symbol, alphabet or the like) of data stored by the handheld terminal 3 is indicated as shown in the screen D2.

Figure 14C:
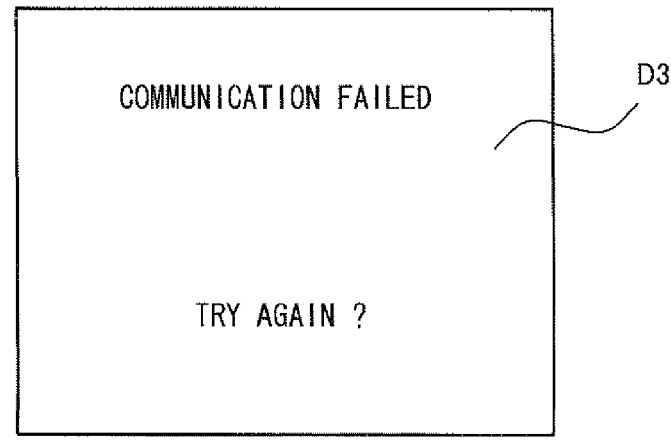
FIG. 14C shows an example of a screen that is displayed on the handheld terminal shown in FIG. 8 when the handheld terminal obtains the step count data from the pedometer.

FIG. 14C shows a screen D3 displayed on the LCD 312 when the handheld terminal 3 has failed to communicate with the pedometer 1. The handheld terminal 3 displays, for example, messages "COMMUNICATION FAILED" and "TRY AGAIN?".

Figure 15:
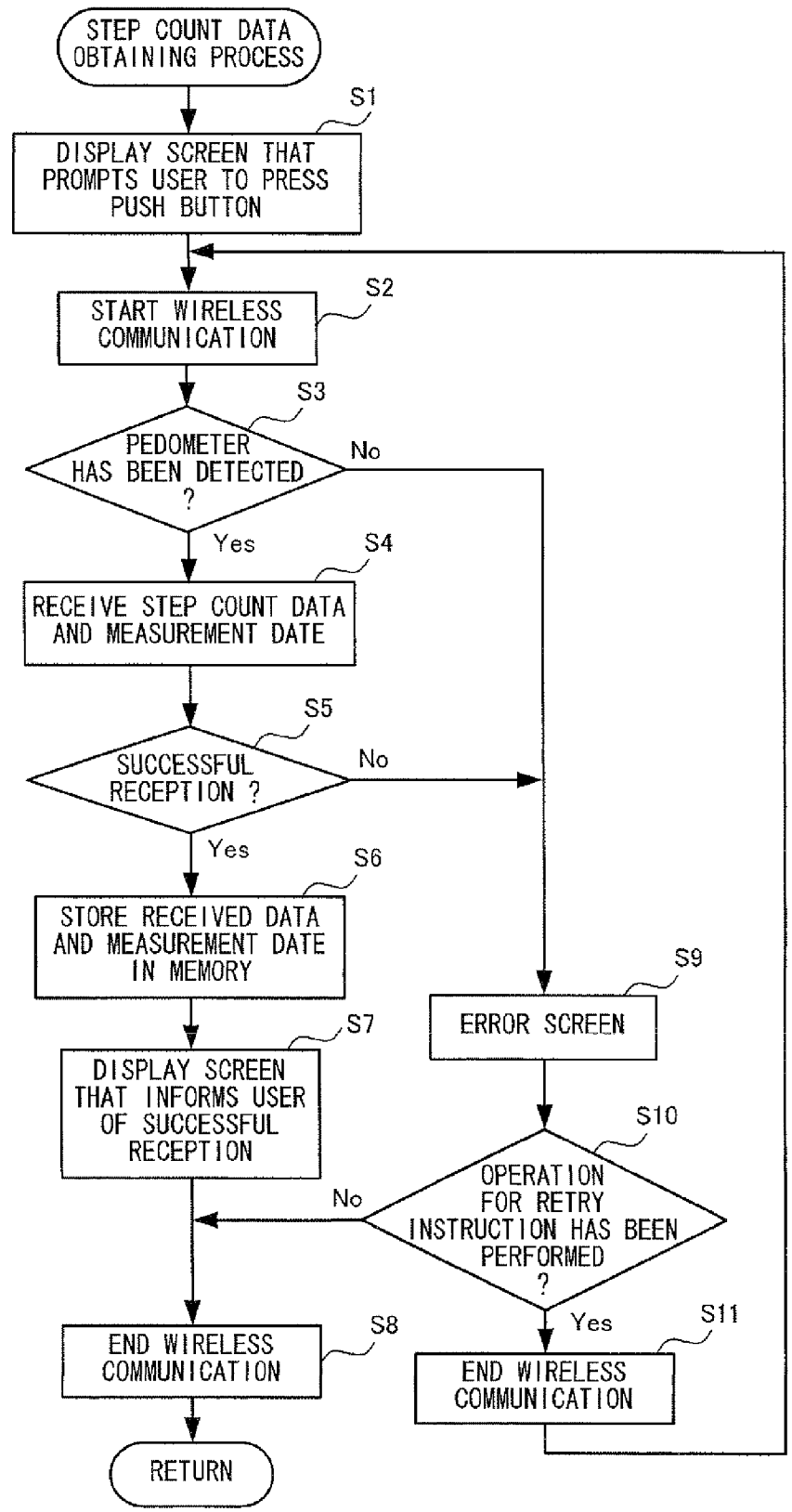
FIG. 15 shows a flow of a step count data obtaining process performed by the handheld terminal shown in FIG. 8.

FIG. 15 is a flowchart showing a step count data obtaining process performed by the handheld terminal 3. This process is performed by the handheld terminal 3 executing the step count data obtaining program 37B. Hereinafter, each step performed by the CPU core 360 is abbreviated as "S".

At S1, the CPU core 360 causes the LCD 312 to display the screen D1 that prompts the user to press the push button 104 of the pedometer 1 (a button for transmitting step count data).

At S2, the CPU core 360 starts infrared communication of the handheld terminal 3 by using the Ir communication circuit 70, and detects the pedometer 1. To be specific, the CPU core 360 waits for reception of an ACK (ACKNowledgement) signal that is transmitted from the pedometer 1 via infrared light.

At S3, the CPU core 360 determines whether or not the pedometer 1 has been detected successfully. When the pedometer 1 has been detected successfully (Yes at S3), the processing of FIG. 15 proceeds to S4. When the pedometer 1 has not been detected (No at S3), the processing of FIG. 15 proceeds to S9.

At S4, the CPU core 360 receives step count data and a measurement date from the pedometer 1. Here, the handheld terminal 3 receives from the pedometer, the step count data in the data format as shown in FIG. 13 (i.e., the step count data in the following form: measurement date/time/minute). At this point, the handheld terminal 3 may selectively receive only new data that has not been stored in the handheld terminal 3. Alternatively, after the handheld terminal 3 has received all the step count data transmitted from the pedometer 1, step count data, which is the same as that previously stored in the handheld terminal 3, may be discarded. Note that, the process at S4 may be performed at a timing when a predetermined input has been performed through the touch panel 324 or the operation switches 322.

At S5, the CPU core 360 determines whether or not the step count data has been received successfully. When the step count data has been received successfully (Yes at S5), the processing of FIG. 15 proceeds to S6. When the step count data has not been received (No at S5), the processing of FIG. 15 proceeds to S9 (error screen output).

At S6, the CPU core 360 stores, in a memory, the step count data and the measurement date received at S4. Data stored in the memory at this point is the integrated data 37k that is generated using the data tallying process program 37C and the data integration process program 371C.

At S7, the CPU core 360 causes the first LCD 312 to display the screen D2 (see FIG. 14) that informs the user of successful reception. Here, the display D2 may be displayed on the second LCD 314, instead. Further, the CPU core 360 may cause the first LCD 312 or the second LCD 314 to display contents of the received step count data.

At S8, the CPU core 360 ends the wireless communication of the handheld terminal 3.

After S8, CPU core 360 ends the processing of FIG. 15. Alternatively, the processing may return to S1 after S8.

At S9, the CPU core 360 outputs an error screen D3 (see FIG. 14C).

At S10, the CPU core 360 determines whether or not the user has given an instruction to retry the reception. When the user has not given an instruction to retry the reception (No at S10), the CPU core 360 ends the communication (S8). Thereafter, the CPU core 360 ends the processing.

When the user has given an instruction to retry the reception (Yes at S10), the wireless communication ends temporarily (S13), and then the processing returns to S2 to resume the wireless communication.

(Main Menu Operation of the Game Apparatus 2)

Described below with reference to FIGS. 16A, 16B, 16C and 17 is a main menu operation process that is performed by the game apparatus 2 executing the main menu operation program 22B. Here, the main menu is provided for the user to carry out an obesity treatment plan. To be more specific, the obesity treatment plan is intended for an obese person. This plan is for an obese person to carry out an obesity treatment program by taking advice from a professional who owns the professional terminal 4.

Figure 16A:
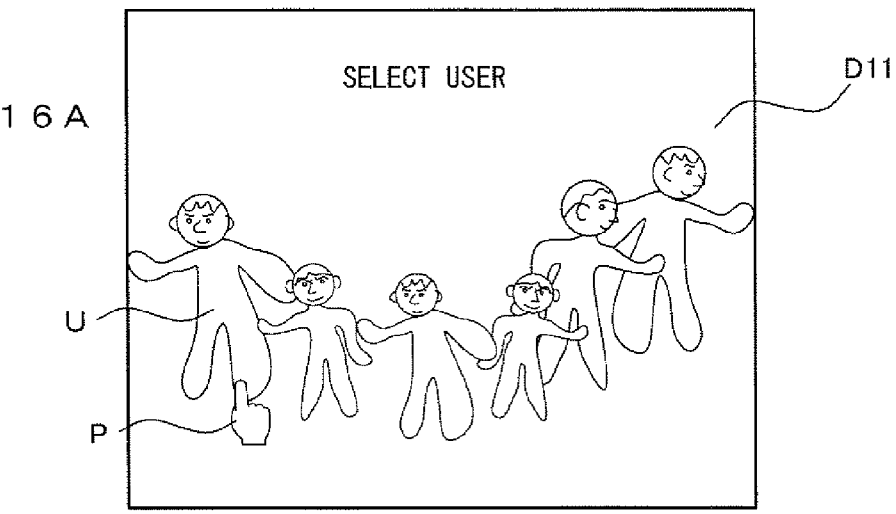
FIG. 16A shows an example of a display provided by the game apparatus shown in FIG. 3.
Figure 16B:
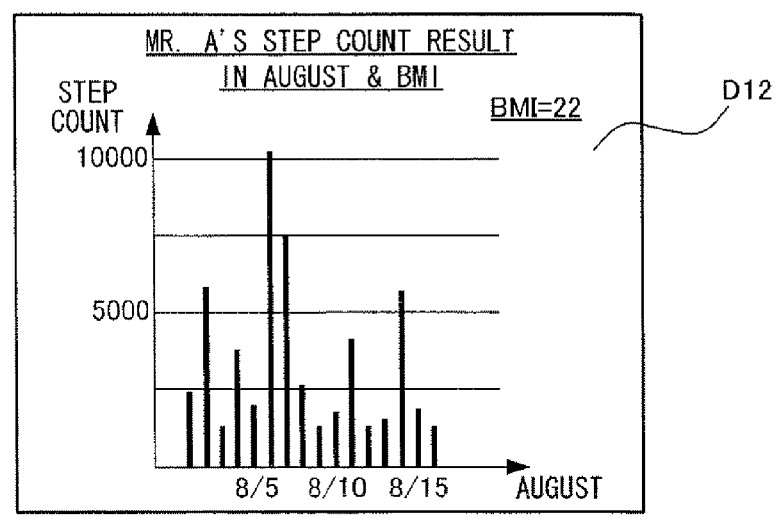
FIG. 16B shows an example of a display provided by the game apparatus shown in FIG. 3.
Figure 16C:
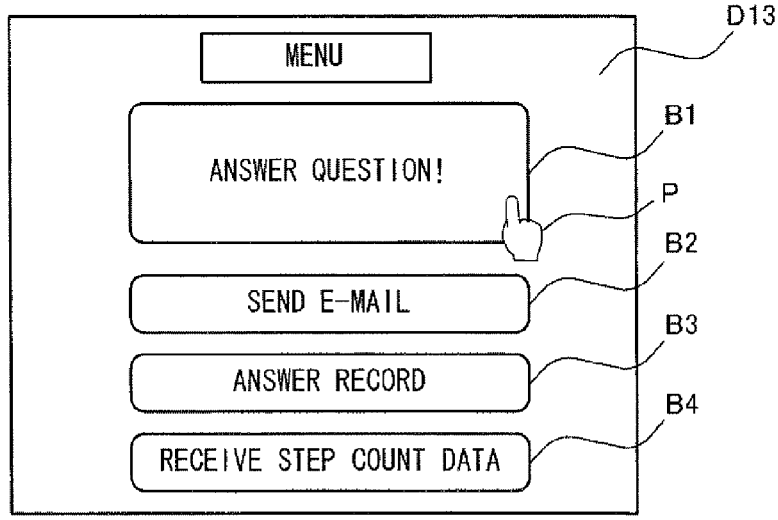
FIG. 16C shows an example of a display provided by the game apparatus shown in FIG. 3.

FIGS. 16A, 16B and 16C show examples of screens (screens D11 to D13) displayed on the television 5.

As shown in the screen D11 of FIG. 16A, at the time of performing the main menu operation process, the CPU 210 of the game apparatus 2 first causes the television 5 to display the screen D11, in order to accept a selection of a user who uses the program. The screen D11 displays icons of a plurality of users U. One of the plurality of users U is selected when a pointer P is moved thereto and, for example, the A button 626*d* is pressed.

Next, as shown in the screen D12 of FIG. 16B, the CPU 210 causes the television 5 to display the screen D12 that shows a step count result and BMI of the selected user. For example, an input of a user name is accepted in advance. When the user name is, for example, Mr. A, the CPU 210 causes the television 5 to display a title, e.g., "Mr. A's step count result in August". Here, August may be an immediately previous month to the current month, or may be a selected month. The step count result shown in the screen D12 displayed by the CPU 210 may contain, for example, a graph indicating step counts for respective dates (each date may be divided into morning and afternoon).

Thereafter, as shown in the screen D13 of FIG. 16C, the CPU 210 causes, based on a particular operation performed on the remote controller 6, the television 5 to display the screen D13. A main menu shown in the screen D13 includes the following items: "ANSWER QUESTION!" B1, "SEND E-MAIL" B2, "ANSWER RECORD" B3, AND "RECEIVE STEP COUNT DATA" B4. The CPU 210 displays the pointer P on the screen D13. If a predetermined button, e.g., the A button 626*d*, is pressed when the pointer P is positioned on one of these items, the CPU 210 performs processing that corresponds to the one of these items B1 to B4.

Figure 17:
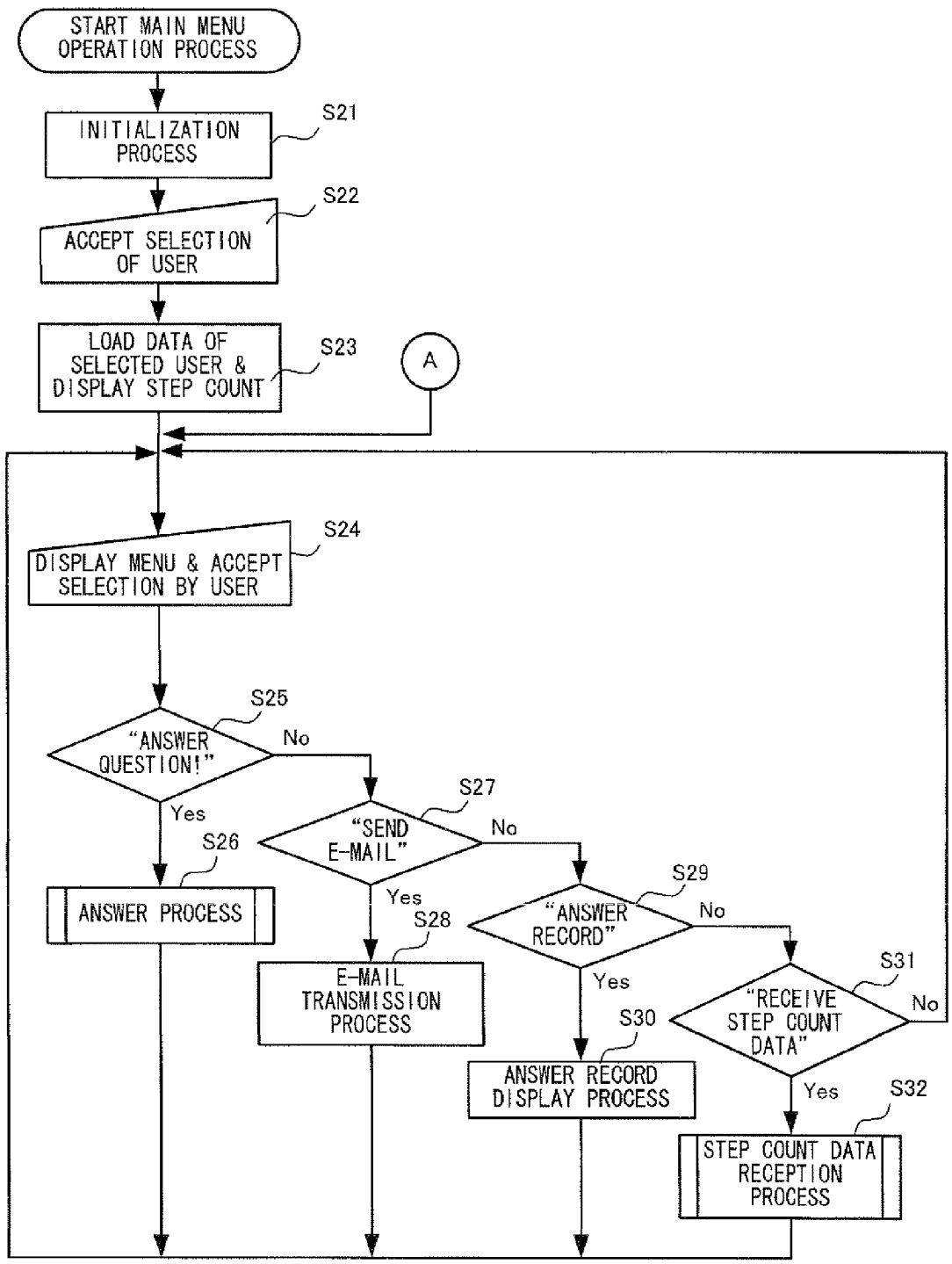
FIG. 17 shows a flow of a main menu operation process performed by the game apparatus shown in FIG. 3.

FIG. 17 is a flowchart showing the main menu operation process that is performed by the game apparatus 2 executing the main menu operation program 22B. Hereinafter, each step performed by the CPU 210 is abbreviated as "S".

At S21, the CPU 210 performs an initialization process. Here, each variable is initialized.

At S22, the CPU 210 displays a main menu screen (screen D11) on the television 5, and accepts a selection of a user.

At S23, the CPU 210 loads data of the selected user to display step counts of the user. For example, the CPU 210 displays a screen showing a step count result (screen D12) on the television 5.

At S24, the CPU 210 displays a menu screen to allow the user to select a menu.

At S25, the CPU 210 determines whether or not the selected menu is "ANSWER QUESTION!". When the selected menu is "ANSWER QUESTION!" (Yes at S25), the processing of FIG. 17 proceeds to S26. When the selected menu is not "ANSWER QUESTION!" (No at S25), the processing of FIG. 17 proceeds to S27.

At S26, the CPU 210 performs the answer process that allows the user to answer a question given by the professional owning the professional terminal 4. The answer process will be described later.

At S27, the CPU 210 determines whether or not the selected menu is "SEND E-MAIL". When the selected menu is "SEND E-MAIL" (Yes at S27), the processing of FIG. 17 proceeds to S28. When the selected menu is not "SEND E-MAIL" (No at S27), the processing of FIG. 17 proceeds to S29.

At S28, the CPU 210 performs a process of transmitting an e-mail to the professional.

At S29, the CPU 210 determines whether or not the selected menu is "ANSWER RECORD" (here, "ANSWER RECORD" is a menu for viewing a stored record of answers). When the selected menu is "ANSWER RECORD" (Yes at S29), the processing of FIG. 17 proceeds to S30. When the selected menu is not "ANSWER RECORD" (No at S29), the processing of FIG. 17 proceeds to S31.

At S30, the CPU 210 performs an answer record display process. The answer record display process is a process of displaying a record of answers that are accumulated as a result of the user having repeatedly performed the answer process (S26) by selecting "ANSWER QUESTION!".

At S31, the CPU 210 determines whether or not the selected menu is "RECEIVE STEP COUNT DATA". When the selected menu is "RECEIVE STEP COUNT DATA" (Yes at S31), the processing of FIG. 17 proceeds to S32. When the selected menu is not "RECEIVE STEP COUNT DATA" (No at S31), the processing of FIG. 17 returns to S24.

At S32, the CPU 210 performs a step count data reception process by executing the step count data reception program 22C.

Note that, a reference symbol A in FIG. 17 will be referred to in later descriptions of FIGS. 27 to 29. The determinations at S25, S27, S29 and S31 may be performed in any order as long as the user is allowed to select, from the menu (see, e.g., the screen D13 of FIG. 16C), an item to be executed by the CPU 210.

(Communication Between the Game Apparatus 2 and the Handheld Terminal 3)

Described next with reference to FIGS. 18A to 18D, 19A to 19D, 20 and 21 is processing which the game apparatus 2 and the handheld terminal 3 perform for transmitting/receiving step count data therebetween. FIGS. 18A to 18D and FIGS. 19A to 19D show examples of screens to be displayed by the game apparatus 2 and the handheld terminal 3, respectively. These screens are displayed when the game apparatus 2 and the handheld terminal 3 are communicating with each other.

Figure 18A:
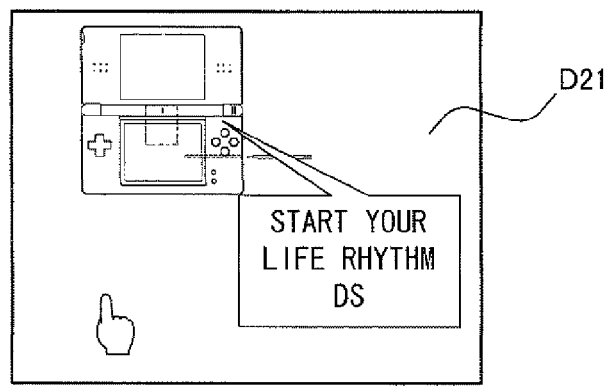
FIG. 18A shows an example of a screen that is displayed when the step count data reception process is performed by the game apparatus shown in FIG. 3.

Screens D21 to D24 shown in FIGS. 18A to 18D are displayed on the television 5. FIG. 18A shows the screen D21 which is displayed, when the game apparatus 2 is in an active state, in order to prompt the user to run, with the handheld terminal 3, software that enables the game apparatus 2 to start communicating with the handheld terminal 3. The game apparatus 2 displays, for example, "START YOUR LIFE RHYTHM DS". Here, the software may be "Your Life Rhythm DS" (product name), for example.

Figure 18B:
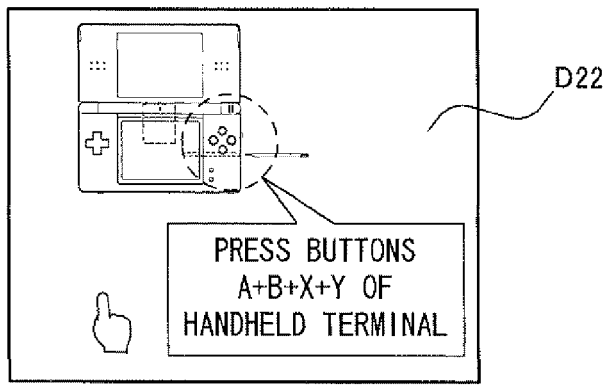
FIG. 18B shows an example of a screen that is displayed when the step count data reception process is performed by the game apparatus shown in FIG. 3.

FIG. 18B shows the screen D22 which is displayed on the television 5 when the above software is started, in order to prompt the user to perform an operation that enables the game apparatus 2 to start communicating with the handheld terminal 3. The game apparatus 2 displays, for example, a message "PRESS BUTTONS A+B+X+Y OF HANDHELD TERMINAL". It is preferred here that A+B+X+Y is provided as a hidden command. As a result, the message does not appear on the handheld terminal 3 during normal operations such as selecting an item from a menu displayed on the handheld terminal 3. Only when the user follows an instruction that is displayed on the television 5 at S41 (see FIG. 20 referred to later), the handheld terminal 3 can be enabled to perform step count data communication with the game apparatus 2. This provides an advantage in that unusable functions for a user who only uses the handheld terminal 3 are not displayed, and thus, unnecessary displaying is prevented.

Figure 18C:
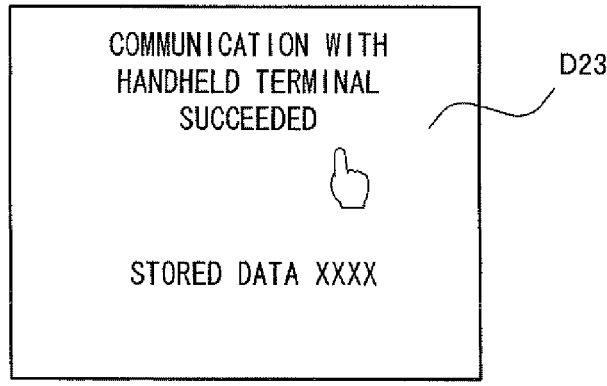
FIG. 18C shows an example of a screen that is displayed when the step count data reception process is performed by the game apparatus shown in FIG. 3.

FIG. 18C shows the screen D23 which is displayed on the television 5 when the game apparatus 2 has successfully communicated with the handheld terminal 3. The game apparatus 2 displays, for example, a message "COMMUNICATION WITH HANDHELD TERMINAL SUCCEEDED". In this case, it is preferred that a data No. xxxx (x is a number, symbol, alphabet or the like) of data stored by the game apparatus 2 is indicated as shown in the screen D23.

Figure 18D:
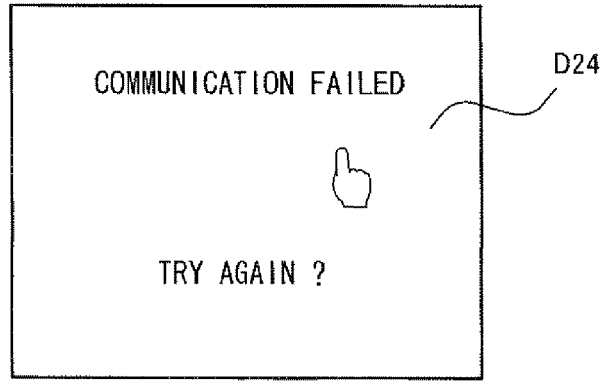
FIG. 18D shows an example of a screen that is displayed when the step count data reception process is performed by the game apparatus shown in FIG. 3.

FIG. 18D shows the screen D24 which is displayed on the television 5 when the game apparatus 2 has failed to communicate with the handheld terminal 3. The game apparatus 2 displays, for example, messages "COMMUNICATION FAILED" and "TRY AGAIN?".

Figure 19A:
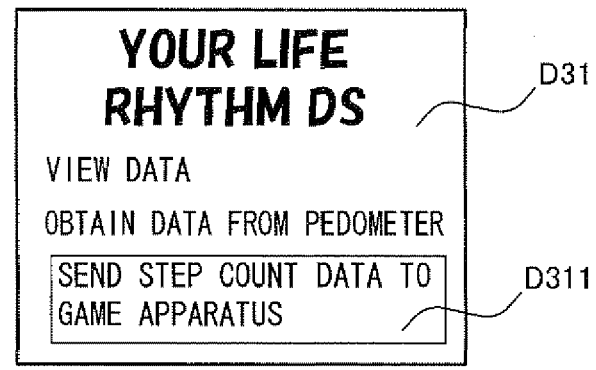
FIG. 19A shows an example of a screen that is displayed when a step count data transmission process is performed by the handheld terminal shown in FIG. 8.

FIG. 19A shows the screen D31 which is displayed on the LCD 312 when the user has started the health software "Your Life Rhythm DS" of the handheld terminal 3 in response to the instruction shown in the screen D21 of FIG. 18A and has inputted the aforementioned hidden command in response to the instruction shown in the screen D22 of FIG. 18B. When the user has inputted the hidden command, an item D311 "SEND STEP COUNT DATA TO GAME APPARATUS" is displayed for the first time (referred to as GAME APPARATUS here is the game apparatus 2). Once the hidden command is inputted, the LCD 312 displays the item D311 when the health software is started thereafter.

Figure 19B:
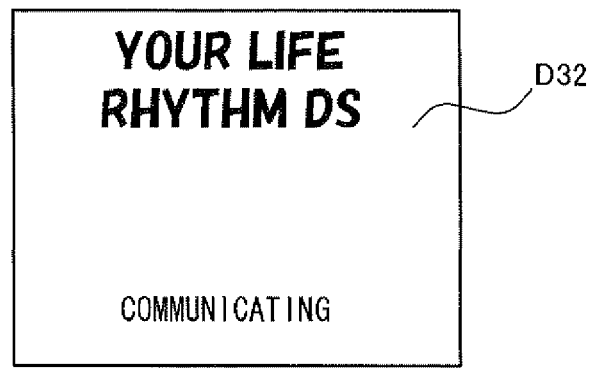
FIG. 19B shows an example of a screen that is displayed when the step count data transmission process is performed by the handheld terminal shown in FIG. 8.

FIG. 19B shows the screen D32 that is displayed at the start of the communication. When an operation of selecting the item D311 is accepted by the CPU core 360, the handheld terminal 3 starts communicating with the game apparatus 2. The screen D32 shows that the handheld terminal 3 has started the communication.

Figure 19C:
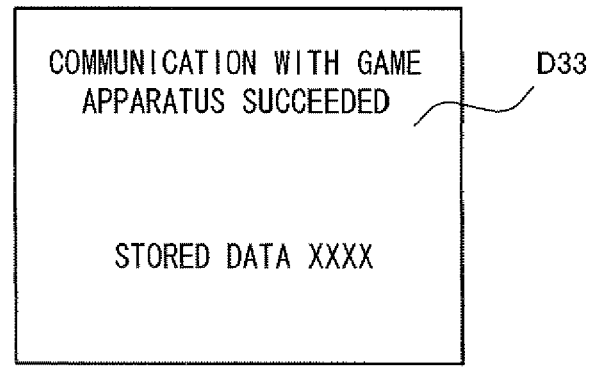
FIG. 19C shows an example of a screen that is displayed when the step count data transmission process is performed by the handheld terminal shown in FIG. 8.

FIG. 19C shows a screen D33 that is displayed on the LCD 312 when the handheld terminal 3 has successfully communicated with the game apparatus 2. Here, the handheld terminal 3 displays, for example, a message "COMMUNICATION WITH GAME APPARATUS SUCCEEDED". In this case, it is preferred that a data No. xxxx (x is a number, symbol, alphabet or the like) of data stored by the game apparatus 2 is indicated as shown in the screen D33.

Figure 19D:
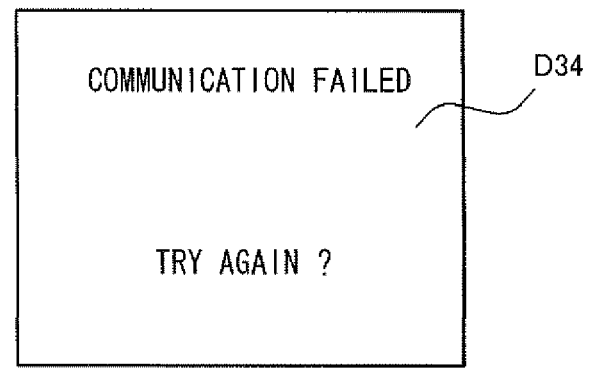
FIG. 19D shows an example of a screen that is displayed when the step count data transmission process is performed by the handheld terminal shown in FIG. 8.

FIG. 19D shows the screen D34 that is displayed on the LCD 312 when the handheld terminal 3 has failed to communicate with the game apparatus 2. The handheld terminal 3 displays, for example, messages "COMMUNICATION FAILED" and "TRY AGAIN?".

Figure 20:
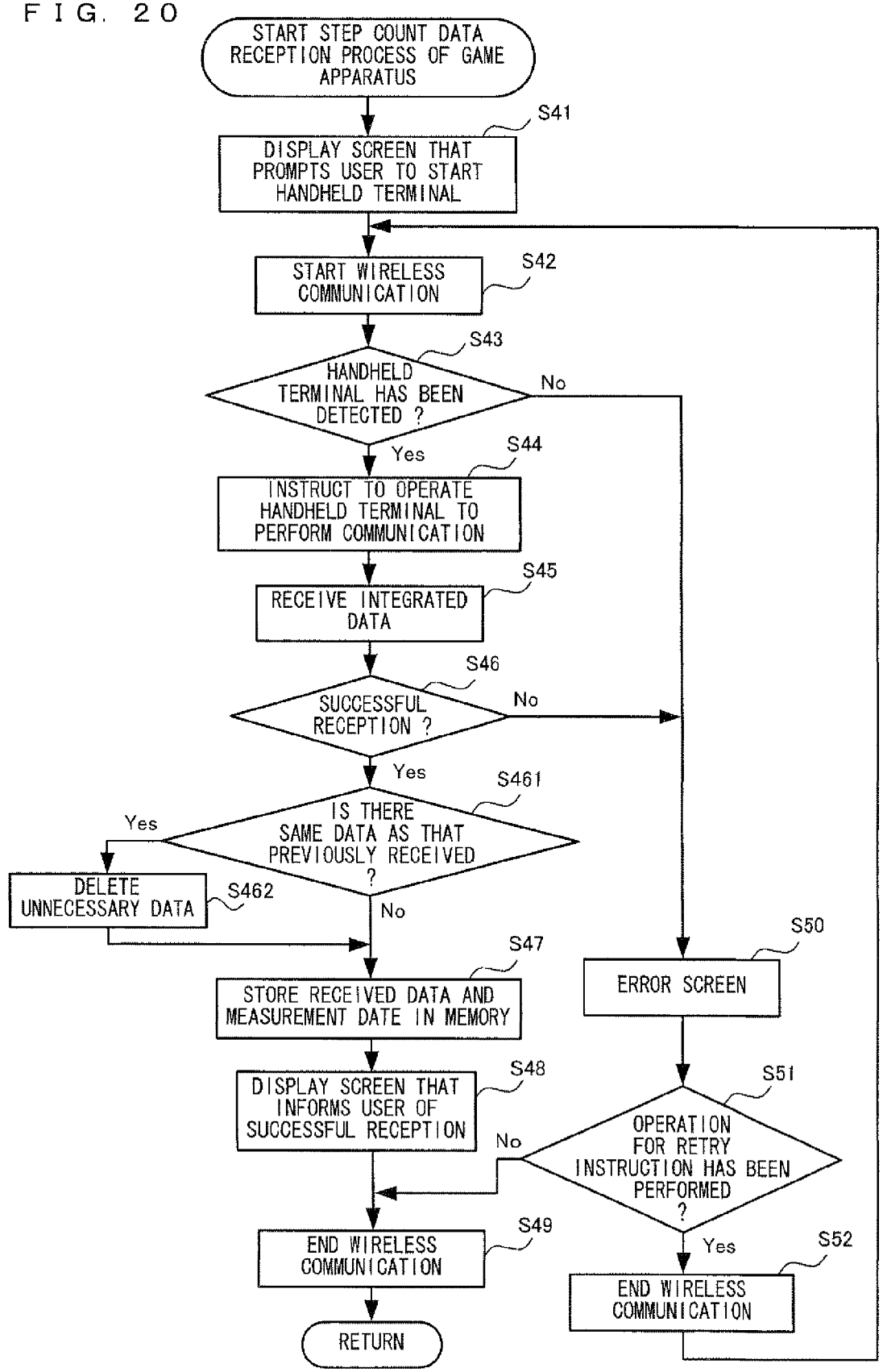
FIG. 20 shows a flow of the step count data reception process performed by the game apparatus shown in FIG. 3.

FIG. 20 shows a flow of a process that is performed by the game apparatus 2 (the step count data reception process) when step count data is transmitted between the game apparatus 2 and the handheld terminal 3. Note that, the step count data reception process is performed by the CPU 210 executing the step count data reception program 22C (see FIG. 5).

FIG. 20 shows the step count data reception process performed by the CPU 210 of the game apparatus 2.

At S41, the CPU 210 displays the screen D21 for prompting start-up of the handheld terminal 3.

At S42, the CPU 210 uses the wireless communication module 250 to start wireless communication with the handheld terminal 3.

At S43, the CPU 210 determines whether or not the handheld terminal 3 has been detected. When the handheld terminal 3 has been detected (Yes at S43), the processing of FIG. 20 proceeds to S44. When the handheld terminal 3 has not been detected (No at S43), the processing of FIG. 20 proceeds to S50 (error screen output).

At S44, the CPU 210 displays, on the television 5, the screen D21 and D22 (see FIG. 18) showing a predetermined operation to be performed on the handheld terminal 3. These screens prompt the user to operate the handheld terminal 3 to perform communication.

At S45, the CPU 210 receives integrated data 37k from the handheld terminal 3. Here, the CPU 210 receives all the integrated data 37k stored in the handheld terminal 3.

Note that, the process at S45 may be performed at a timing when a predetermined input has been performed through the remote controller 6.

At S46, the CPU 210 determines whether or not the integrated data 37k has been received successfully from the handheld terminal 3. When the integrated data 37k has been received successfully from the handheld terminal 3 (Yes at S46), the processing of FIG. 20 proceeds to S461. When the integrated data 37k has not been received from the handheld terminal 3 (No at S46), the processing of FIG. 20 proceeds to S50.

It is determined at S461 whether or not the integrated data 37k received by the game apparatus 2 contains same data as that previously stored in the game apparatus 2. When the received integrated data 37k contains same data as that previously stored (Yes at S461), from among the received integrated data (containing minutely data and daily data), all the minutely data and same daily data as that previously stored in the game apparatus 2 are deleted (S462). In the case where the integrated data 37k received by the game apparatus 2 has not previously been stored in the game apparatus 2 (No at S461), the processing of FIG. 20 proceeds to S47. Note that, instead of performing the processes at S45, S461 and S462, the CPU 210 may receive only new data from the handheld terminal 3. Further, although in the present embodiment unnecessary data is deleted prior to storing the received data in the external main memory 220, unnecessary data may be deleted after storing the received data.

At S47, the CPU 210 stores the integrated data 37k in the external main memory 220.

At S48, the CPU 210 displays, on the television 5, a screen that informs the user of successful reception of the integrated data 37k. At this point, contents of the received integrated data 37k may be displayed on the television 5.

At S49, the CPU 210 ends the wireless communication with the handheld terminal 3.

After S49, the processing of FIG. 20 ends.

At S50, the CPU 210 outputs an error screen (screen D24) to the television 5.

At S51, the CPU 210 determines whether or not an operation to instruct retrying of data reception has been performed. When an operation to instruct retrying of data reception has been performed (Yes at S51), the processing of FIG. 21 proceeds to S52. When an operation to instruct retrying of data reception has not been performed (No at S51), the wireless communication ends (S49).

At S52, the CPU 210 temporarily ends the wireless communication.

After step S52, the processing of FIG. 20 returns to S42 and then starts wireless communication again.

Figure 21:
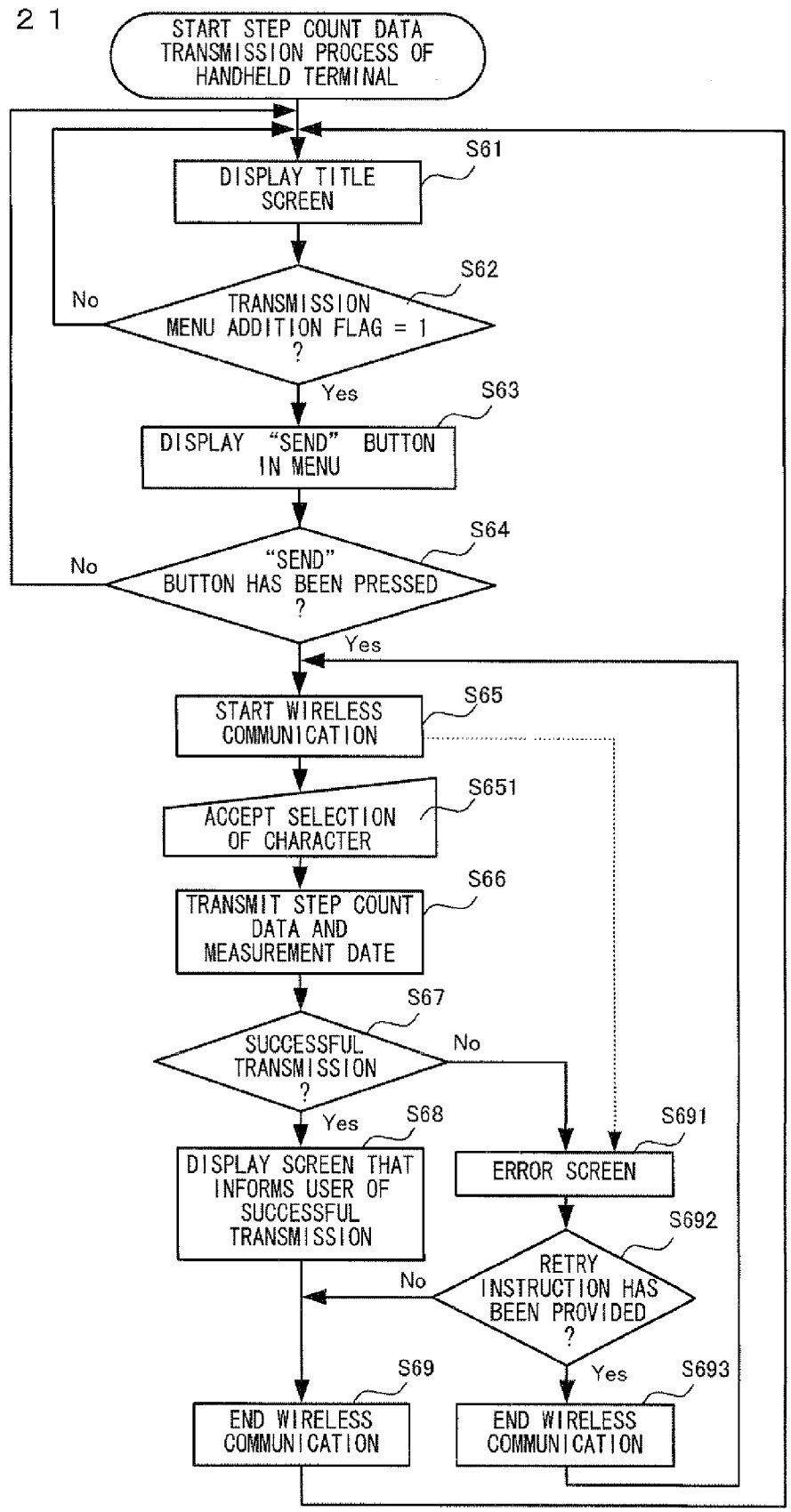
FIG. 21 shows a flow of the step count data transmission process performed by the handheld terminal shown in FIG. 8.

FIG. 21 shows a flow of a step count data transmission process that is performed by the handheld terminal 3 when step count data is transmitted between the game apparatus 2 and the handheld terminal 3. This process is performed when the user runs the aforementioned health software (for example, "Your Life Rhythm DS") by using the handheld terminal 3 in response to the screen D21 shown in FIG. 18A which prompts the user to start the step count data transmission program 37D on the handheld terminal 3.

When the user starts the health software, a menu screen is displayed. Then, when the buttons for the aforementioned hidden command are pressed, the CPU core 360 adds the item D311 "SEND STEP COUNT DATA TO GAME APPARATUS" to the menu screen (see the screen D31). When the item is added to the menu, the addition to the menu is stored in the backup memory 78 in the form of, for example, flag data that indicates presence or absence of such addition to the menu. This allows the user to, thereafter, select the item D311 from the menu displayed on the handheld terminal 3 without inputting the hidden command. Note that, the above flag data is hereinafter referred to as a transmission menu addition flag.

At S61, when the user starts the health software, the CPU core 360 displays a title screen indicating that the software is being executed. Although not shown here, when the aforementioned hidden command is inputted, the transmission menu addition flag is set to "1".

It is determined at S62 whether or not the transmission menu addition flag indicates "1". When the transmission menu addition flag indicates "1" (Yes at S62), the processing of FIG. 21 proceeds to S63. When the transmission menu addition flag indicates "0" (No at S62), the processing of FIG. 21 returns to S61.

At S63, the item D311 is newly displayed on the menu displayed by the handheld terminal 3.

At S64, the CPU core 360 determines whether or not a predetermined button of the handheld terminal 3 for giving an instruction "SEND STEP COUNT DATA TO GAME APPARATUS" has been pressed by the user. Alternatively, the determination may be provided based not on whether or not the button has been pressed, but on whether or not the item "SEND STEP COUNT DATA TO GAME APPARATUS" in the screen D31, which is shown in FIG. 19, has been selected on the touch panel.

When the user has pressed the predetermined button of the handheld terminal 3 in order to give the instruction "SEND STEP COUNT DATA TO GAME APPARATUS" (Yes at S64), the processing of FIG. 21 proceeds to S65. When the user has not pressed the predetermined button of the handheld terminal 3 in order to give the instruction "SEND STEP COUNT DATA TO GAME APPARATUS" (No at S64), the processing of FIG. 21 returns to S61.

At S65, the CPU core 360 starts wireless communication with the game apparatus 2 by using the wireless communication section 380. At this point, the CPU core 360 searches for the game apparatus 2 that can be connected to the handheld terminal 3. When the game apparatus 2 that is in a standby state for the communication with the handheld terminal 3 is found, the handheld terminal 3 automatically establishes a connection to the game apparatus 2. When the handheld terminal 3 cannot find the game apparatus 2, the processing proceeds to S691 (displaying of the error screen) as indicated by the dotted arrow in FIG. 21. At S651, the CPU core 360 shifts to a character selection mode that determines data to be transmitted, and accepts a selection of a character. Here, the character represents the user using the handheld terminal 3. In the case where a plurality of users use handheld terminals 3, respectively, characters are used to distinguish the users from each other. When the user has selected a character, the processing proceeds to S66.

As described above, when the CPU core 360 accepts the selection of a character, the handheld terminal 3 automatically selects data corresponding to the character and transmits the data to the game apparatus 2 at S66. Here, if there is only one character to be used, the process at S651 is not necessary.

At S66, the CPU core 360 transmits step count data and a measurement date to the game apparatus 2. Transmitted here by the CPU core 360 is not the entire step count data received from the pedometer 1, but the integrated data 37k additionally stored in accordance with the data integration process program 371C (daily step count data and minutely step count data). Here, the CPU core 360 may transmit the step count data to the game apparatus 2 in the data format as shown in FIG. 13 (i.e., in the form of minutely step count data). Alternatively, the CPU core 360 may transmit data that has been sorted for each day and each hour. Further alternatively, the CPU core 360 may transmit the total step count value 37J.

At S67, the CPU core 360 determines whether or not the integrated data 37k has been transmitted to the game apparatus 2 successfully. When the CPU core 360 has transmitted the integrated data 37k to the game apparatus 2 successfully (Yes at S67), the processing proceeds to S68. When the CPU core 360 fails to transmit the integrated data 37k to the game apparatus 2 (No at S67), the processing of FIG. 21 proceeds to S691.

At S68, the CPU core 360 causes the first LCD 312 to display the screen D33 that informs the user of successful transmission. Here, contents of the transmitted integrated data 37k may be displayed on the first LCD 312 or on the second LCD 314.

At S69, the CPU core 360 ends the wireless communication of the handheld terminal 3.

After S69, the processing returns to S61.

At S691, the CPU core 360 outputs the error screen (screen D34).

At S692, the CPU core 360 determines whether or not the user has provided an instruction to retry the transmission. When the user has provided an instruction to retry the transmission (Yes at S692), the CPU core 360 temporarily ends the wireless communication (S693). Thereafter, the processing of FIG. 21 returns to S65.

When the user has not provided an instruction to retry the transmission (No at S692), the CPU core 360 ends the communication (S69), and the processing returns to the displaying of the title screen.

(Answer Process)

Figure 22:
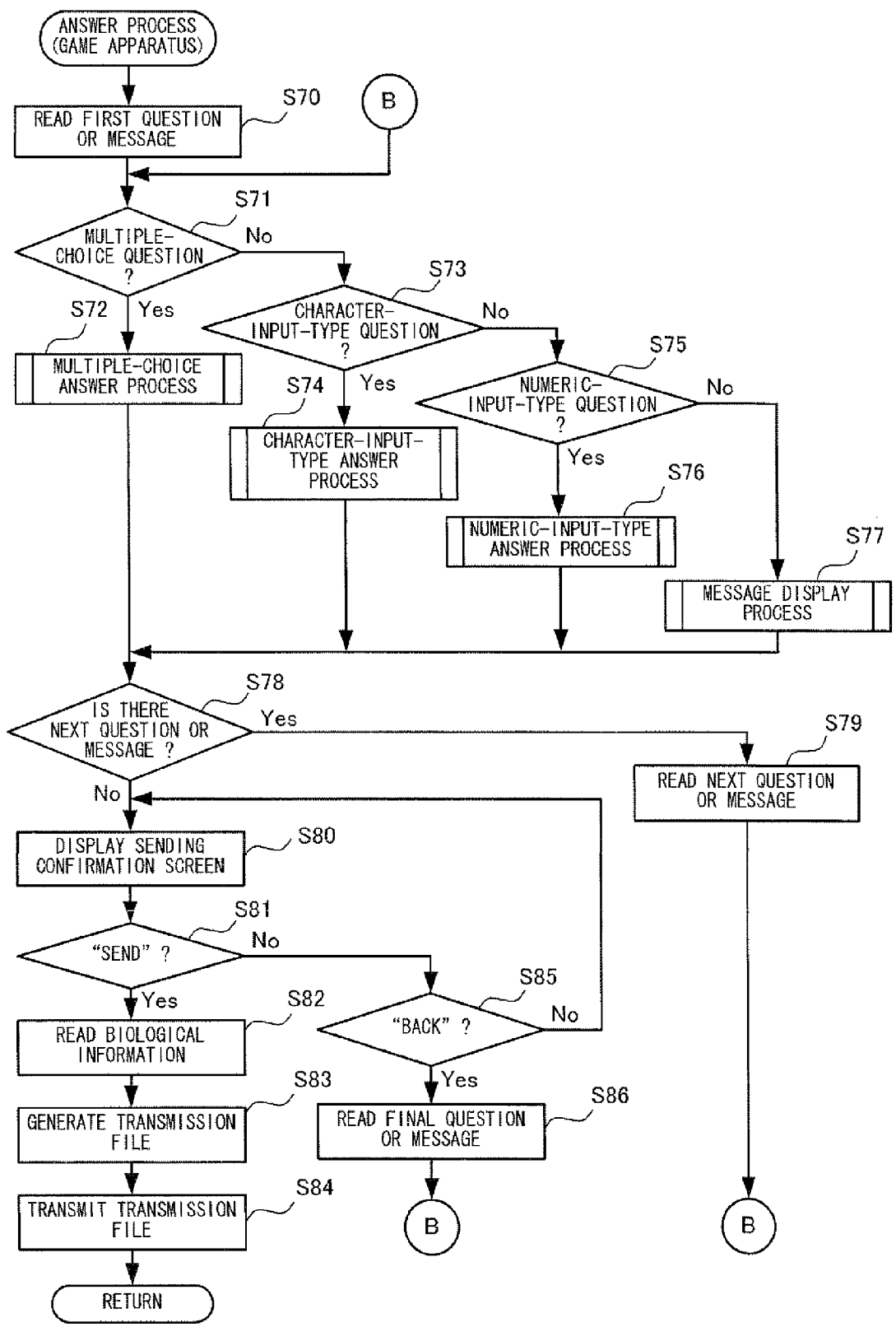
FIG. 22 shows a flow of an answer process performed by the game apparatus shown in FIG. 3.

Next, the answer process at S26 of FIG. 17 will be described in detail with reference to FIGS. 22 to 29. FIG. 22 shows a flow of the entire answer process. FIGS. 23 to 26 each show an example of a screen displayed during the answer process. FIGS. 27 to 29 illustrate a multiple-choice answer process, a numeric-input-type answer process and a character-input-type answer process, which are included in the answer process performed by the game apparatus 2.

When the answer process starts, at S70 of FIG. 22, the CPU 210 selects, as a to-be-answered question message, a question message directed to the user currently being operating the game apparatus 2. The to-be-answered question message is selected from the unanswered question message 22w stored in the flash memory 244 (the unanswered question message 22w may be stored in the external main memory 220 alternatively; this alternative applies whenever the phrase "the unanswered question message 22w stored in the flash memory 244" is used in the description below). Then, the CPU 210 reads a first question or message from among one or more questions or messages included in the to-be-answered question message stored in the flash memory 244.

At S71, the CPU 210 determines whether or not the question or message read from the flash memory 244 is a "multiple-choice question". When the read question or message is a "multiple-choice question", the processing proceeds to S72. Otherwise, the processing proceeds to S73.

At S72, the CPU 210 performs the multiple-choice answer process. In the multiple-choice answer process, the "multiple-choice question" is presented to the user and the user is caused to input an answer thereto. The multiple-choice answer process will be described in detail. When the multiple-choice answer process ends, the processing proceeds to S78.

At S73, the CPU 210 determines whether or not the question or message read from the flash memory 244 is a "character-input-type question". When the read question or message is a "character-input-type question", the processing proceeds to S74. Otherwise, the processing proceeds to S75.

At S74, the CPU 210 performs the character-input-type answer process. In the character-input-type answer process, the "character-input-type question" is presented to the user, and the user is caused to input an answer thereto. The character-input-type answer process will be described later in detail. When the character-input-type answer process ends, the processing proceeds to S78.

At S75, the CPU 210 determines whether or not the question or message read from the flash memory 244 is a "numeric-input-type question". When the read question or message is a "numeric-input-type question", the processing proceeds to S76. Otherwise, the processing proceeds to S77.

At S76, the CPU 210 performs the numeric-input-type answer process. In the numeric-input-type answer process, the "numeric-input-type Question" is presented to the user, and the user is caused to input an answer thereto. The numeric-input-type answer process will be described later in detail. When the numeric-input-type answer process ends, the processing proceeds to S78.

At S77, the CPU 210 performs a message display process. In the message display process, a "message" is displayed on the television 5.

Figure 23:
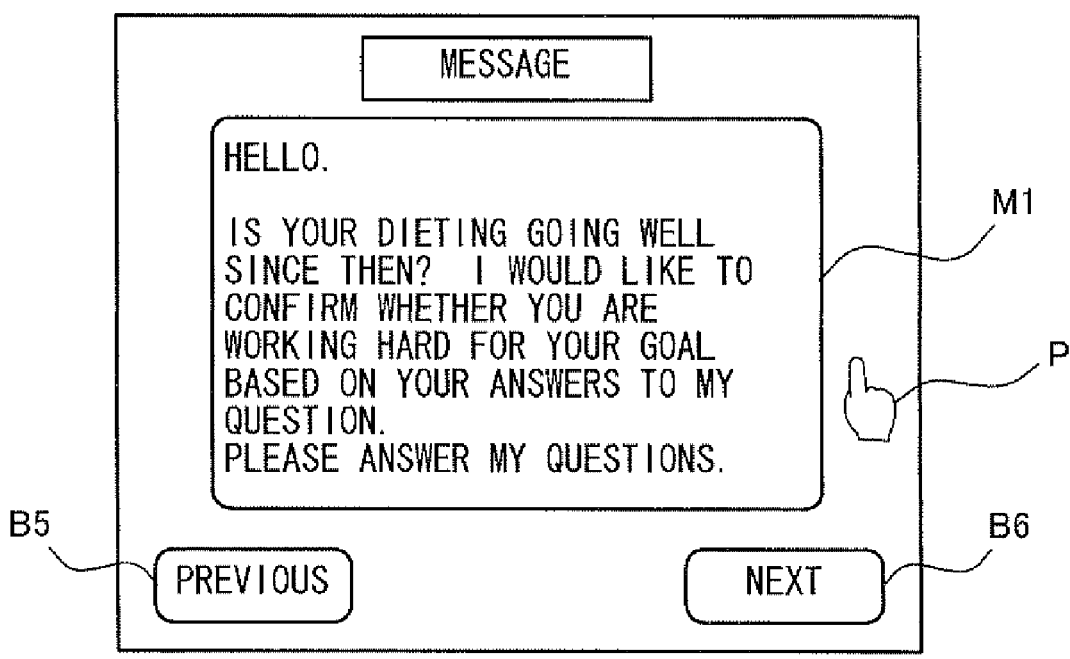
FIG. 23 shows an example of a screen that is displayed when a message display process included in the answer process is performed by the game apparatus shown in FIG. 3.

FIG. 23 shows an example of the message displayed at S77. Here, a message display screen includes a message section M1, a "PREVIOUS" button B5 and a "NEXT" button B6. When the user selects an icon of the "PREVIOUS" button B5 or the "NEXT" button B6 with the pointer P, the CPU 210 displays another message on the television 5. When the message display process ends, the processing proceeds to S78.

At S78, the CPU 210 determines whether or not the next question or message is present in the current to-be-answered question message. When the next question or message is present in the current to-be-answered question message, the processing proceeds to S79. When the next question or message is not present in the current to-be-answered question message (i.e., when answers to all the questions or messages included in the to-be-answered question message have been inputted), the processing proceeds to S80.

At S79, the CPU 210 reads, from the flash memory 244, the next question or message contained in the current to-be-answered question message. Then, the processing returns to S71.

Figure 26:
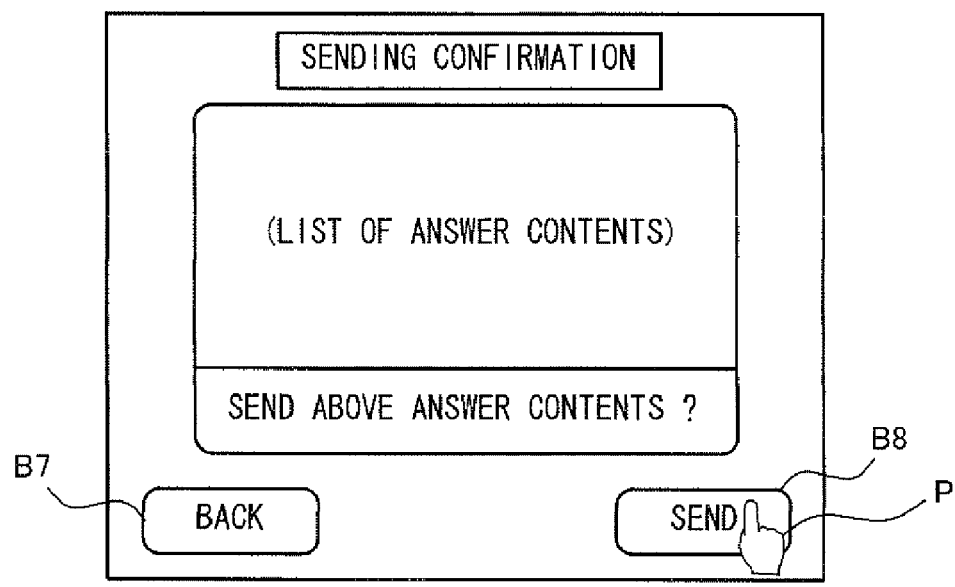
FIG. 26 shows an example of a sending confirmation screen that is displayed when the game apparatus shown in FIG. 3 performs the answer process.

At S80, the CPU 210 displays, on the television 5, a sending confirmation screen as shown in FIG. 26, for example. The user views a list of answer contents displayed in the sending confirmation screen to confirm contents of an answer message. If there is no necessity to change the contents, the user uses the pointer P to select a "SEND" button 18. If the user desires to change the contents of the answer message, the use ruses the pointer P to select a "BACK" button B7.

The CPU 210 determines at S81 whether or not the "SEND" button B8 (see FIG. 26) has been selected. If the "SEND" button B8 has been selected, the processing proceeds to S82. Otherwise, the processing proceeds to S85.

At 582, the CPU 210 reads, from the flash memory 244, biological information about the user currently operating the game apparatus 2 (i.e., the user selected at S22 of FIG. 17). For example, when the user currently operating the game apparatus 2 is a user B. The CPU 210 reads the integrated data 22*v* stored in the flash memory 244, the integrated data 22*v* relating to the weight data 22U of the user B, the exercise time data 22Z of the user B and the step count of the user B. Here, when measurement date information is added to the biological information stored in the flash memory 244, the CPU 210 may only read biological information that has been measured during a past constant period (e.g., during the past one month). Note that, although in the present embodiment the biological information is obtained from the flash memory 244, the present invention is not limited thereto. The biological information may be obtained from other internal or external storage medium of the game apparatus 2.

At S83, the CPU 210 generates a transmission file by combining, into a single file, the created answer message and the biological information read at S82 from the flash memory 244.

At 384, the CPU 210 transmits, to the professional terminal 4, the transmission file generated at S83. Then, the answer process ends. The file transmission from the game apparatus 2 to the professional terminal 4 may be performed using, for example, a general email transfer protocol. Here, the generated transmission file may be transmitted via an e-mail as an attached file. In this case, the e-mail may contain no text, or may contain a fixed phrase.

At S85, the CPU 210 determines whether or not the "BACK" button 37 has been selected. When the "BACK" button B7 has been selected, the processing proceeds to S86. Otherwise, the processing returns to S80.

At S86, the CPU 210 reads again, from the flash memory 244, a final question or message contained in the current to-be-answered question message. Then, the processing returns to S71. Note that, in the case where the "BACK" button B7 is selected in the sending confirmation screen, the display may return to the first question or message, instead of returning to the final question or message.

(Multiple-Choice Answer Process Performed by the Game Apparatus)

Next, the multiple-choice answer process at S72 of FIG. 22 will be described in detail with reference to FIGS. 24 and 27.

Figure 24A:
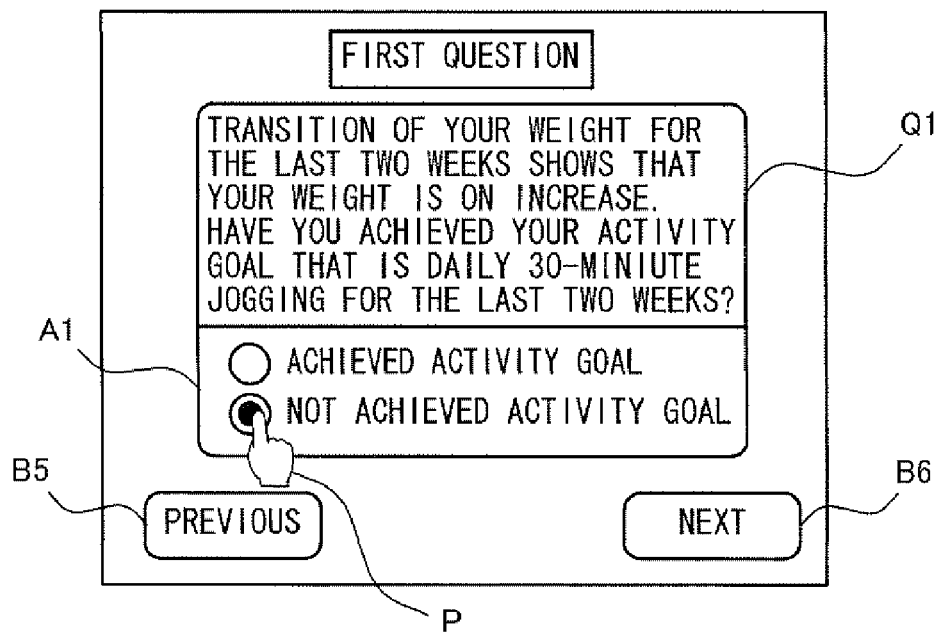
FIG. 24A shows an example of a screen that is displayed when the game apparatus shown in FIG. 3 performs a multiple-choice answer process.

When the multiple-choice answer process starts, the CPU 210 displays, at S90, a multiple-choice answer screen as shown in FIG. 24A. The multiple-choice answer screen contains a question section Q1, a multiple-choice section A1, the "PREVIOUS" button B5 and the "NEXT" button B6.

At S91, the CPU 210 determines whether or not any one of the choices displayed on the multiple-choice section A1 has been selected by the user. When any one of the choices has been selected, the processing proceeds to S92. Otherwise, the processing proceeds to S93. The user performs the choice selection by operating the remote controller 6.

At S92, the CPU 210 highlights the choice selected by the user. Then, the processing returns to S90. For example, the selected choice may be highlighted in such a manner that a check mark is provided to the head of the selected choice as shown in FIG. 24A, or that the font color or background color of the selected choice is changed.

At S93, the CPU 210 determines whether or not the "NEXT" button B6 has been selected by the user. When the "NEXT" button B6 has been selected, the multiple-choice answer process ends, and then the processing proceeds to S78 of FIG. 22. Otherwise, the processing proceeds to S94.

At S94, the CPU 210 determines whether or not the "PREVIOUS" button B5 has been selected by the user. When the "PREVIOUS" button B5 has been selected, the processing proceeds to S95. Otherwise, the processing returns to S90.

At S95, the CPU 210 determines whether or not a previous question or message is present in the current to-be-answered question message. When a previous question or message is present in the current to-be-answered question message, the processing proceeds to S96. When a previous question or message is not present in the current to-be-answered question message (i.e., when the currently displayed question or message is the first question or message in the current to-be-answered question message), the multiple-choice answer process ends, and the processing returns to S24 of FIG. 17 (i.e., the display returns to the menu display screen (D13)).

At S96, the CPU 210 reads, from the flash memory 244, the previous question or message contained in the current to-beanswered question message. Then, the multiple-choice answer process ends, and the processing returns to S71 of FIG. 22.

(The Character-Input-Type Answer Process Performed by the Game Apparatus)

Figure 24B:
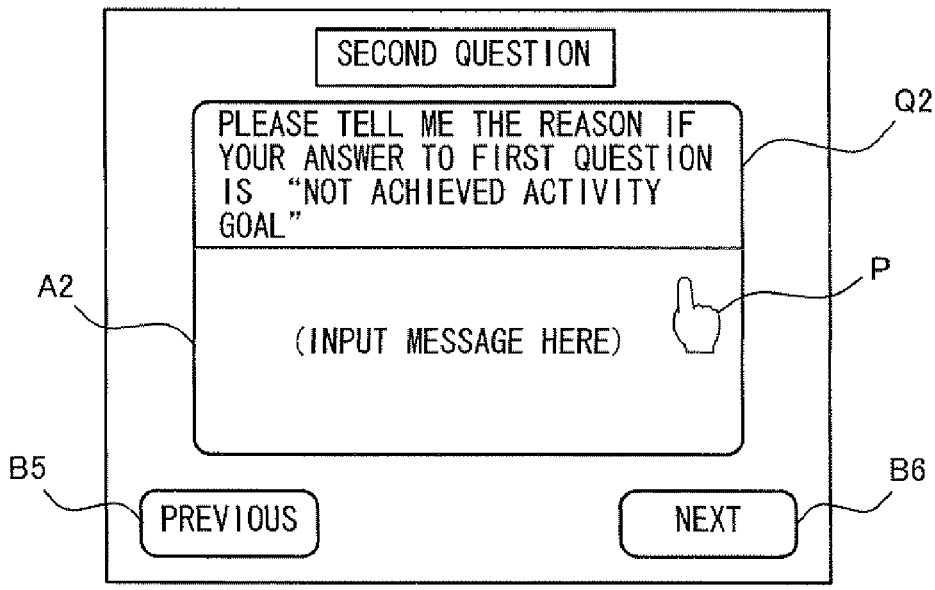
FIG. 24B shows an example of a screen that is displayed when the game apparatus shown in FIG. 3 performs a character-input-type answer process.

Next, the character-input-type answer process at S74 of FIG. 22 will be described in detail with reference to FIGS. 24B and 28.

When the character-input-type answer process starts, the CPU 210 displays, at S100, a character-input-type answer screen as shown in FIG. 24. The character-input-type answer screen contains a question section Q2, a character input section A2, the "PREVIOUS" button 55 and the "NEXT" button B6.

At S101, the CPU 210 determines whether or not the user has designated the character input section A2. When the user has designated the character input section A2, the processing proceeds to S102. Otherwise, the processing proceeds to S103. The user designates the character input section A2 by operating the remote controller 6.

At S102, the CPU 210 accepts a character input performed by the user using a software keyboard. Then, the processing returns to S100. The character input using the software keyboard is performed such that the user sequentially designate, using the pointer P, desired keys on the keyboard displayed on the screen.

At S103, the CPU 210 determines whether or not the "NEXT" button B6 has been selected by the user. When the "NEXT" button B6 has been selected, the character-input-type answer process ends, and then processing proceeds to S78 of FIG. 22. Otherwise, the processing proceeds to S104.

At S104, the CPU 210 determines whether or not the "PREVIOUS" button B5 has been selected by the user. When the "PREVIOUS" button B5 has been selected, the processing proceeds to S105. Otherwise, the processing returns to S100.

At S105, the CPU 210 determines whether or not a previous question or message is present in the current to-be-answered question message. When a previous question or message is present in the current to-be-answered question message, the processing proceeds to S106. When a previous question or message is not present in the current to-be-answered question message, the character-input-type answer process ends, and then the processing returns to S24 of FIG. 17.

At S106, the CPU 210 reads, from the flash memory 244, the previous question or message contained in the current to-be-answered question message. Then, the character-input-type answer process ends, and the processing returns to S71 of FIG. 22.

(The Numeric-Input-Type Answer Process Performed by the Game Apparatus)

Next, the numeric-input-type answer process at S76 of FIG. 22 will be described in detail with reference to a screen example shown in FIG. 25 and a flowchart shown in FIG. 29.

Figure 25:
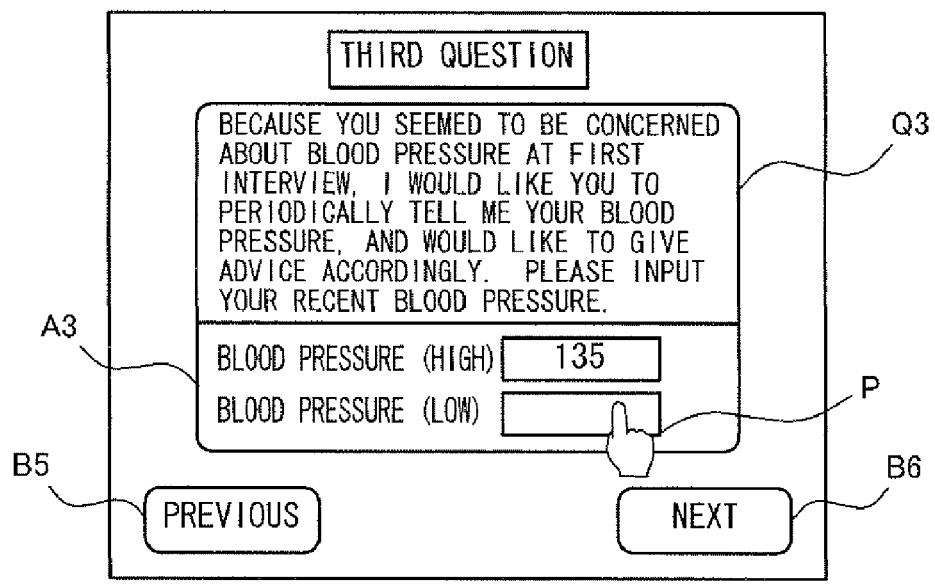
FIG. 25 shows an example of a screen that is displayed when the game apparatus shown in FIG. 3 performs a numeric-input-type answer process.
Figure 29:
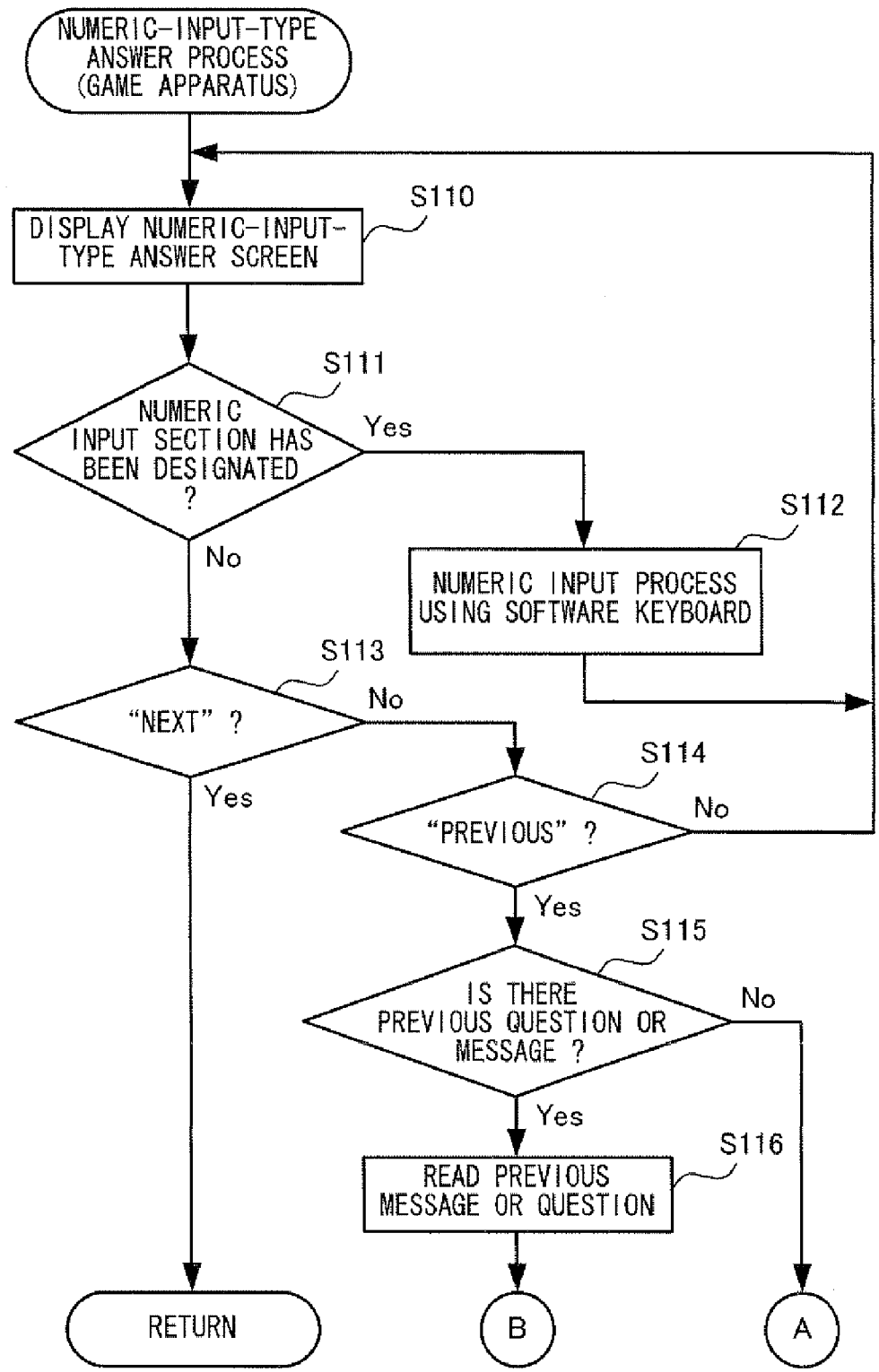
FIG. 29 shows a flow of the numeric-input-type answer process performed by the game apparatus shown in FIG. 3.

When the numeric-input-type answer process starts, the CPU 210 displays, at S110 of FIG. 29, a numeric-input-type answer screen as shown in FIG. 25. The numeric-input-type answer screen includes a question section Q3, a numeric input section A3, the "PREVIOUS" button B5 and the "NEXT" button B6.

At S111, the CPU 210 determines whether or not the numeric input section A3 has been designated by the user. When the numeric input section A3 has been designated, the processing proceeds to S112. Otherwise, the processing proceeds to S113. The user designates the numeric input section A3 by operating the remote controller 6.

At S112, the CPU 210 accepts a numeric input performed by the user using the software keyboard (only a numeric keypad). Then, the processing returns to S110. The numeric input using the software keyboard is performed such that the user sequentially designate, using the pointer P, desired keys on the numeric keypad displayed on the screen.

At S113, the CPU 210 determines whether or not the "NEXT" button B6 has been selected by the user. When the "NEXT" button B6 has been selected, the numeric-input-type answer process ends, and then the processing proceeds to S78 of FIG. 22. Otherwise, the processing proceeds to S114.

At S114, the CPU 210 determines whether or not the "PREVIOUS" button B5 has been selected by the user. When the "PREVIOUS" button B5 has been selected, the processing proceeds to S115. Otherwise, the processing returns to S110.

At S115, the CPU 210 determines whether or not a previous question or message is present in the current to-be-answered question message. When the previous question or message is present in the current to-be-answered question message, the processing proceeds to S116. When the previous question or message is not present in the current to-be-answered question message, the numeric-input-type answer process ends, and then the processing returns to S24 of FIG. 17.

At S116, the CPU 210 reads, from the flash memory 244, the previous question or message contained in the current to-be-answered question message. Then, the numeric-input-type answer process ends, and the processing returns to S71 of FIG. 22.

Figure 27:
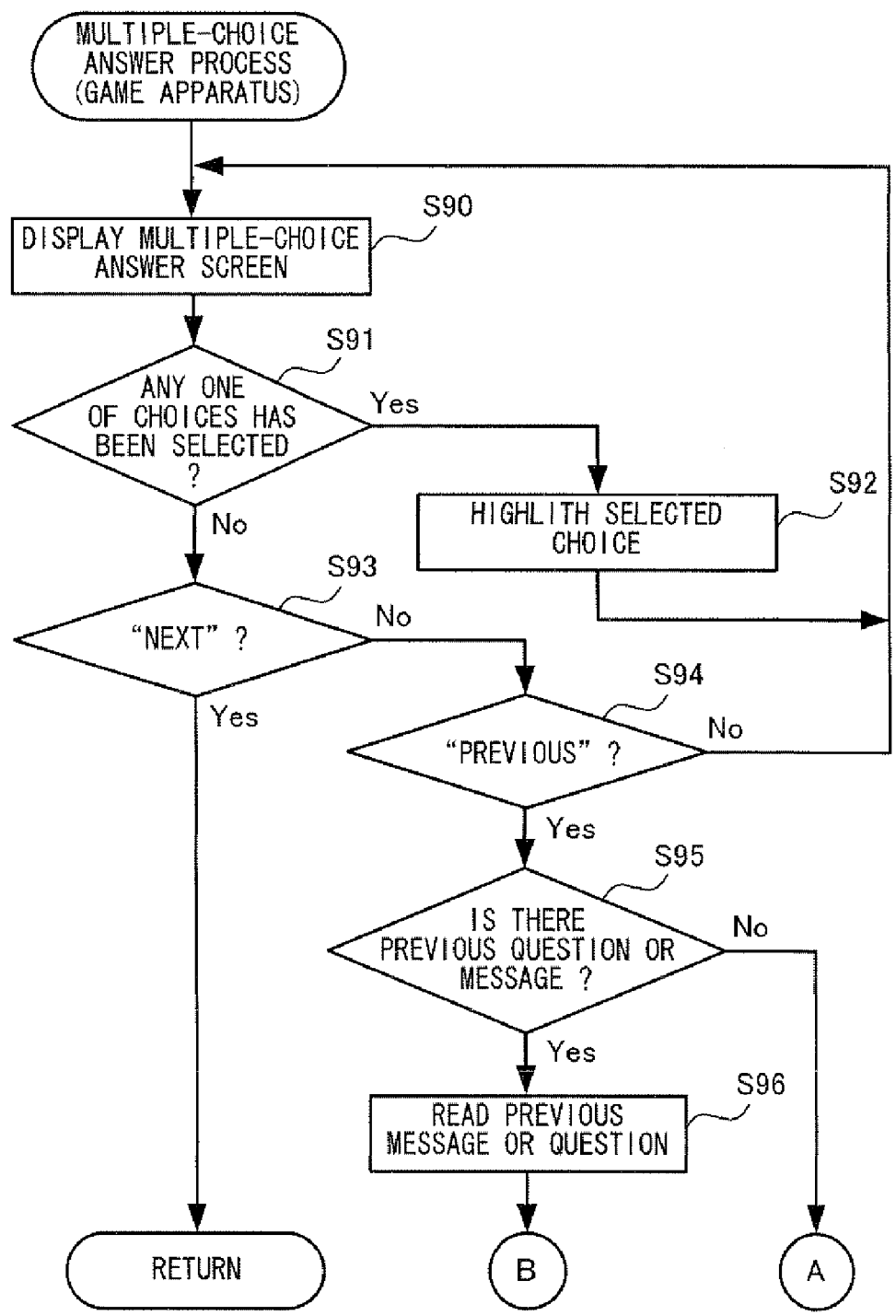
FIG. 27 shows a flow of the multiple-choice answer process performed by the game apparatus shown in FIG. 3.
Figure 28:
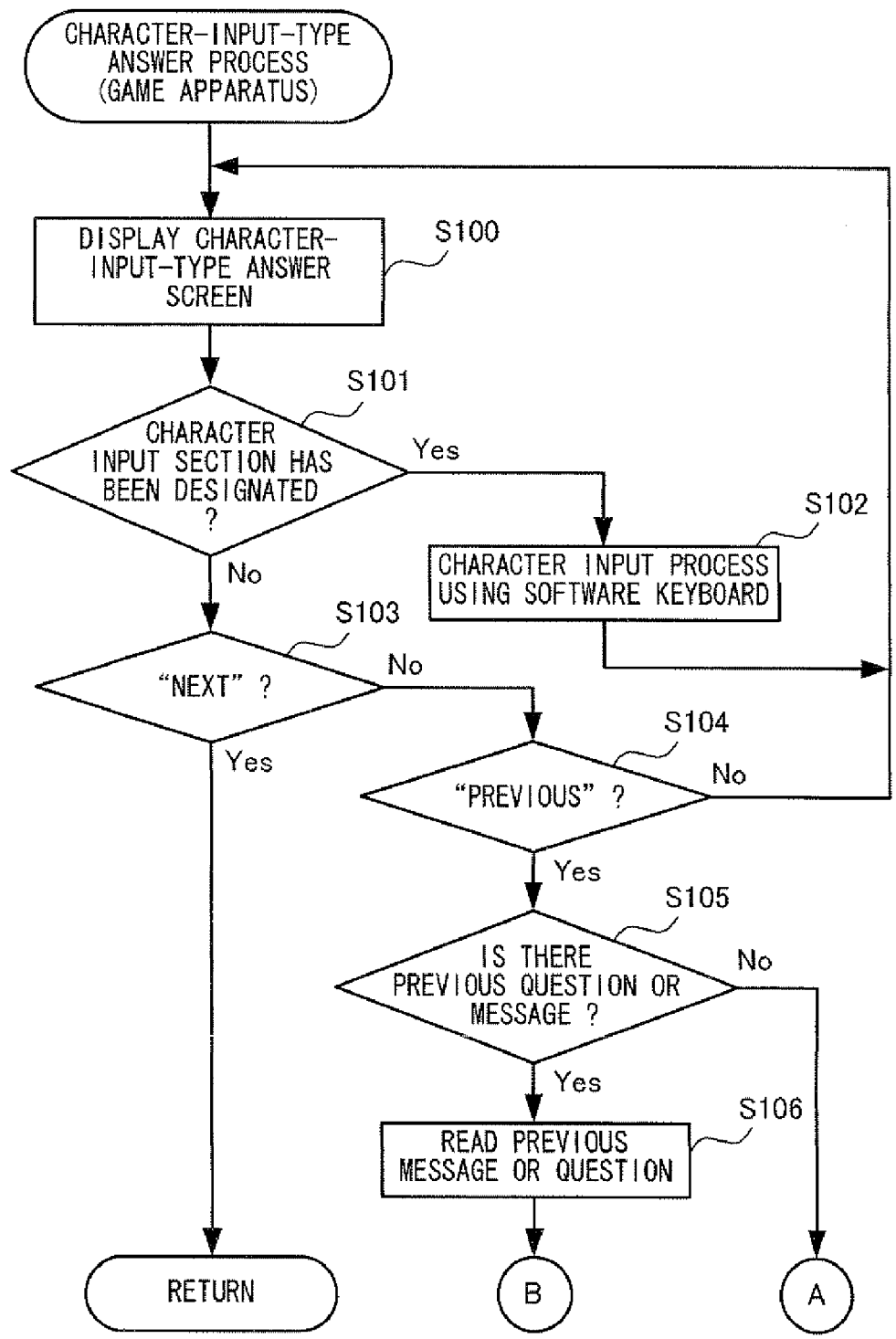
FIG. 28 shows a flow of the character-input-type answer process performed by the game apparatus shown in FIG. 3.

Note that, according to the flowchart of FIGS. 27 to 29, the user is allowed to proceed to the next question or message by selecting the "NEXT" button B6 even though the choice selection, character input, or numeric input has not been performed. Alternatively, however, the user may not be allowed to proceed to the next question or message unless the choice selection, character input, or numeric input has been performed (for example, the "NEXT" button B6 may be grayed out until the choice selection, character input, or numeric input has been performed).

(Answer Reception Process Performed by the Professional Terminal)

Figure 30:
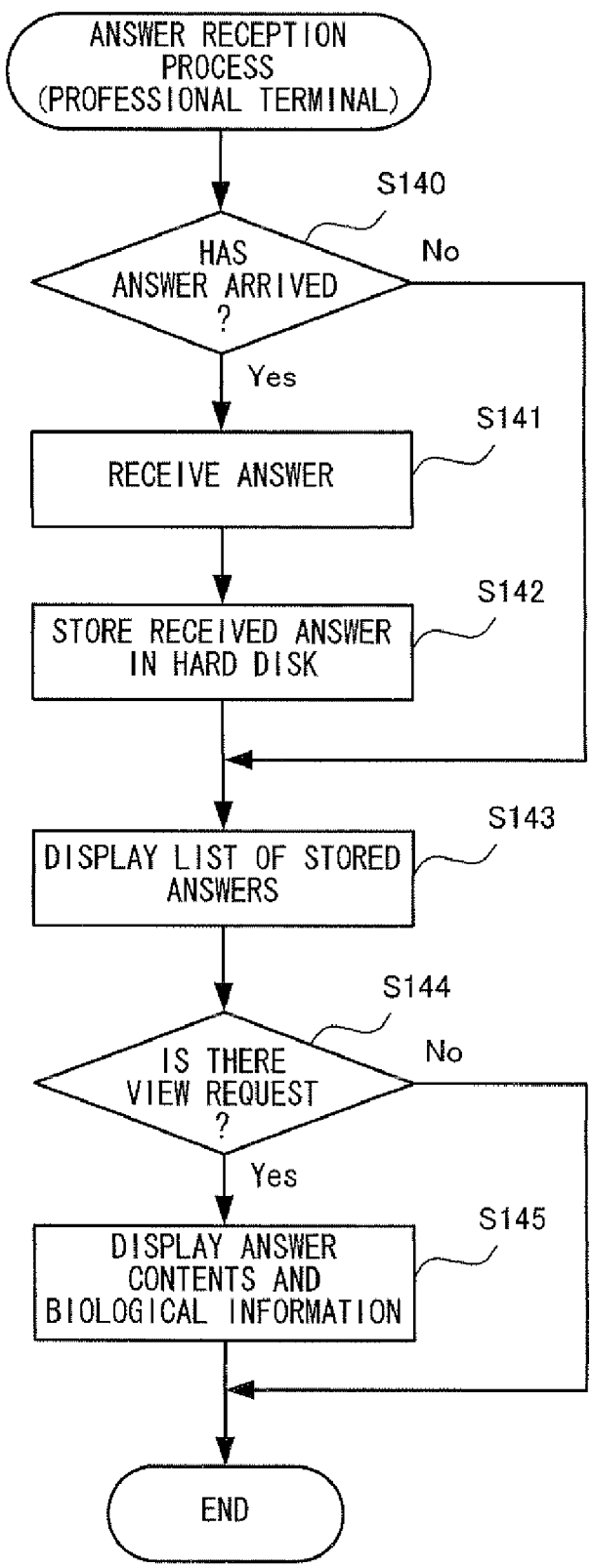
FIG. 30 shows a flow of an answer reception process performed by a professional terminal shown in FIG. 2B.

Described next with reference to FIG. 30 are operations of the professional terminal 4, which are performed when the professional terminal 4 executes an answer message reception application. The answer message reception application is typically supplied to the professional terminal 4 via a computer-readable storage medium such as an optical disc, or via the Internet, and then installed in a hard disk of the professional terminal 4. Functions of a question message creation application and the answer message reception application may be realized by a single application. FIG. 30 is a flowchart showing an answer reception process that is performed by the CPU of the professional terminal 4 in accordance with the answer message reception application.

When the answer reception process starts, the CPU of the professional terminal 4 accesses a mail server at S140, and determines whether or not the mail server has received an answer message from a healthcare recipient (i.e., from the game apparatus 2). When the mail server has received an answer message from the healthcare recipient, the processing proceeds S141. Otherwise, the processing proceeds to S143.

At S141, the CPU of the professional terminal 4 receives the answer message which the mail server has received from the healthcare recipient (to be more precise, the CPU receives such a file as described above which includes the answer message and biological information).

At S142, the CPU of the professional terminal 4 stores, in a hard disk of the professional terminal 4, the answer message received at S141.

At S143, the CPU of the professional terminal 4 displays, on a monitor of the professional terminal 4, a list of answer messages stored in the hard disk.

At S144, the CPU of the professional terminal 4 determines whether or not an operator thereof (the healthcare professional) has provided a view request for anyone of the answer messages that are listed and displayed on the monitor. When the operator has provided a view request for any one of the answer messages, the processing proceeds to S145. Otherwise, the answer reception process ends.

At S145, the CPU of the professional terminal 4 displays, on the monitor thereof, the answer message for which the operator has provided the view request. Here, the answer message is displayed on the monitor, together with the corresponding biological information.

As described above, according to the present embodiment, when an answer message is transmitted from the game apparatus 2 to the professional terminal 4 in response to a question message provided from the healthcare professional, the biological information about the healthcare recipient is automatically read from the flash memory 244 and then transmitted to the professional terminal 4 together with the answer message. Accordingly, when the healthcare recipient transmits the answer message, an input of the biological information can be omitted. Thus, the biological information is assuredly transmitted. Moreover, since the healthcare professional can fully confirm the biological information necessary for health guidance, the healthcare professional can provide health guidance properly and efficiently.

Described below are supplementary descriptions for the above embodiment.

Other than the above examples, the embodiment of the present invention may have a number of variations. In the above examples, components not shown in FIG. 1 are not essential for the implementation of the present invention.

As described above, in the embodiment of the present invention, the pedometer 1 (one example of a "first apparatus" of the present invention) may be substituted by a handheld game apparatus, stationary game apparatus, personal computer, PDA, or any other information processing apparatus. Note that, in the case where the pedometer 1 is substituted by any other apparatus, said any other apparatus may perform data transmission/reception to/from the handheld terminal (one example of a "third apparatus" of the present invention) in response to an input provided through input means included in said any other apparatus. Contents of transmitted/received data may be displayed on display means included in said any other apparatus.

The game apparatus 2 (one example of a "second apparatus" of the present invention) is not limited to a stationary game apparatus. The game apparatus 2 may be a handheld game apparatus, personal computer, PDA, or any other information processing apparatus.

In the above embodiment, the handheld terminal 3 (one example of the "third apparatus" of the present invention) may be substituted by a stationary game apparatus, personal computer, PDA, or any other information processing apparatus.

The communication scheme (one example of a "first short-distance wireless communication scheme" of the present invention) used by the Ir communication circuit 118 of the pedometer 1 is not limited to the aforementioned IrDA Standard. The communication scheme used by the Ir communication circuit 118 may be other short-distance wireless communication than infrared communication, such as a laser communication, WPAN (Wireless Personal Area Network), Bluetooth (registered trademark), ZigBee (registered trademark), Wibree (registered trademark), radio communication, in-home wireless LAN, or the like. In the above embodiment, the communication scheme (one example of a "second short-distance wireless communication scheme" of the present invention) used between the game apparatus 2 and the handheld terminal 3 is a unique wireless communication scheme. However, the present invention is not limited thereto. Other wireless communication scheme, for example, the same communication scheme as that used by the Ir communication circuit 118 may be used.

In the above description, the handheld terminal 3 (one example of the "third apparatus" of the present invention) performs data processing such as analyzing and tallying in accordance with the data integration process program 371C, thereby generating the integrated data 37k. However, the handheld terminal 3 may directly transfer the data, which is received from the pedometer 1, to the game apparatus 2 or the like.

The above descriptions with reference to FIGS. 1, 4, 7, 9 and 12 are described using functionally separated blocks. However, in an actual implementation, some of these functional blocks may be integrated, or one of these functional blocks may be further separated into multiple blocks. Those components described as blocks in the above description may each have a different function from that described in the above examples. For example, separate CPUs may be provided for the above-described programs, respectively. Alternatively, one or a plurality of CPUs may execute each program at the same time or sequentially. Further alternatively, a plurality of CPUs may share the execution of each program.

In addition to the programs shown in FIG. 10, the RAM 370 of the handheld terminal 3 may store a calculation program and a game program, and the CPU core 360 may execute these programs. When the CPU core 360 executes the calculation program, the CPU core 360 performs a predetermined calculation using a plurality of pieces of step count data. For example, the RAM 370 stores a total amount of calories which the user has expended by walking. When the CPU core 360 executes the game program, the game program reflects a result of the calculation in a game. For example, it is preferred that the CPU core 360 executes a game that allows the user to enjoy walking. For instance, the game may be a space journey game that divides a distance to the moon by the number of steps, and shows how many more steps the user has to take to reach the moon. In the game, a total amount of consumed calories may be compared between users.

The present invention may be applicable to, for example, a game apparatus or a communication system. Particularly, the present invention may be applicable to an in-home network.

While the invention has been described in detail, the foregoing description is in all aspects illustrative and not restrictive. It is understood that numerous other modifications and variations can be devised without departing from the scope of the invention.

What is claimed is:

1. An information processing system comprising a first apparatus, a second apparatus and a third apparatus, the first apparatus including first communication circuitry for performing at least one of data transmission and data reception by using a first short-distance wireless communication scheme, the second apparatus including second communication circuitry for performing at least one of data transmission and data reception by using a second short-distance wireless communication scheme that is different from the first short-distance wireless communication scheme, and the third apparatus including:
third communication circuitry for performing at least one of data transmission and data reception by using the first short-distance wireless communication scheme;
fourth communication circuitry for performing at least one of data transmission and data reception by using the second short-distance wireless communication scheme;
control circuitry for transmitting data, which is received from the first apparatus by using the third communication circuitry, to the second apparatus by using the fourth communication circuitry, and/or for transmitting data, which is received from the second apparatus by using the fourth communication circuitry, to the first apparatus by using the third communication circuitry; and
a display section for displaying data transmitted and/or received by the third communication circuitry or by the fourth communication circuitry.

2. The information processing system according to claim 1, wherein a speed of data communication performed using the second short-distance wireless communication scheme is faster than a speed of data communication performed using the first short-distance wireless communication scheme.

3. The information processing system according to claim 1, wherein
the first apparatus includes a first operation unit,
the first communication circuitry performs at least one of data transmission to and data reception from the third apparatus in accordance with an operation using the first operation unit,
the second apparatus includes a second operation unit,
the second communication circuitry performs at least one of data transmission to and data reception from the third apparatus in accordance with an operation using the second operation unit,
the third apparatus includes third operation unit, and
the control circuitry performs at least one of data transmission to and data reception from the first apparatus or the second apparatus in accordance with an operation using the third operation unit.

4. The information processing system according to claim 1, wherein
the first apparatus further includes shock measuring circuitry for measuring a jiggling motion, and
the first apparatus transmits measurement of the jiggling motion to the third apparatus by using the first communication circuitry.

5. The information processing system according to claim 1, wherein
the control circuitry receives a plurality of pieces of first data from the first apparatus by using the third communication circuitry,
the third apparatus further includes second-data generation circuitry for generating second data based on the plurality of pieces of first data, and
the control circuitry transmits the second data, which is generated by the second-data generation circuitry, to the second apparatus by using the fourth communication circuitry.

6. The information processing system according to claim 5, wherein the second-data generation circuitry generates the second data by integrating the plurality of pieces of first data.

7. The information processing system according to claim 5, wherein the second-data generation circuitry generates the second data by performing calculation using values obtained from the plurality of pieces of first data.

8. The information processing system according to claim 1, wherein
the first apparatus includes a display section for displaying data transmitted and/or received by the first communication circuitry, and
the second apparatus includes a display section for displaying data transmitted and/or received by the second communication circuitry.

9. An information processing system comprising a first apparatus, a second apparatus, a third apparatus, and a fourth apparatus,
the first apparatus including first communication circuitry for performing at least one of data transmission and data reception by using a first short-distance wireless communication scheme,
the second apparatus including second communication circuitry for performing at least one of data transmission and data reception by using second short-distance wireless communication scheme that is different from the first short-distance wireless communication scheme, and
the third apparatus including:
third communication circuitry for performing at least one of data transmission and data reception by using the first short-distance wireless communication scheme;
fourth communication circuitry for performing at least one of data transmission and data using the second short-distance wireless communication scheme; and
control circuitry for transmitting data, which is received from the first apparatus by using the third communication circuitry, to the second apparatus by using the fourth communication circuitry, and/or for transmitting data, which is received from the second apparatus by using the fourth communication circuitry, to the first apparatus by using the third communication circuitry;
wherein
the second apparatus further includes fifth communication circuitry for performing at least one of data transmission and data reception by using a third communication scheme that is different from the first and second short-distance wireless communication schemes,
the fourth apparatus includes sixth communication circuitry for performing at least one of data transmission and data reception by using the third communication scheme,
the second apparatus transmits data, which is received from the third apparatus by using the second communication circuitry, to the fourth apparatus by using the fifth communication circuitry, and/or transmits data, which is received from the fourth apparatus by using the fifth communication circuitry, to the third apparatus by using the second communication circuitry, and
the fourth apparatus performs at least one of data transmission to and data reception from the second apparatus by using the sixth communication circuitry.

10. The information processing system according to claim 9, wherein
the second apparatus further includes third-data generation circuitry for generating third data in accordance with an operation using the second operation unit, the second apparatus receives second data from the third apparatus by using the second communication circuitry, and the second apparatus uses the fifth communication circuitry to transmit, to the fourth apparatus, the second data received from the third apparatus and the third data generated by the third-data generation circuitry.

11. An information processing apparatus communicating with a first apparatus and a second apparatus, the first apparatus including first communication circuitry for performing at least one of data transmission and data reception by using a first short-distance wireless communication scheme, and the second apparatus including second communication circuitry for performing at least one of data transmission and data reception by using a second short-distance wireless communication scheme that is different from the first short-distance wireless communication scheme, the information processing apparatus comprising:

third communication circuitry for performing at least one of data transmission and data reception by using the first short-distance wireless communication scheme;
fourth communication circuitry for performing at least one of data transmission and data reception by using the second short-distance wireless communication scheme;
control circuitry for transmitting data, which is received from the first apparatus by using the third communication circuitry, to the second apparatus by using the fourth communication circuitry, and/or for transmitting data, which is received from the second apparatus by using the fourth communication circuitry, to the first apparatus by using the third communication circuitry; and
a displays section for displaying data transmitted and/or received by the third communication circuitry or by the fourth communication circuitry.

12. A non-transitory computer-readable storage medium storing an information processing program to be executed by a computer of an information processing apparatus that communicates with a first apparatus and a second apparatus, the first apparatus including first communication circuitry for performing at least one of data transmission and data reception by using a first short-distance wireless communication scheme, and the second apparatus including second communication circuitry for performing at least one of data transmission and data reception by using a second short-distance wireless communication scheme that is different from the first short-distance wireless communication scheme, the information processing program causing the computer of the information processing apparatus to execute:

performing at least one of data transmission and data reception via third communication circuitry by using the first short-distance wireless communication scheme;
performing at least one of data transmission and data reception via fourth communication circuitry by using the second short-distance wireless communication scheme; and
transmitting data, which is received from the first apparatus by using the third communication circuitry, to the second apparatus by using the fourth communication circuitry, and/or for transmitting data, which is received from the second apparatus by using the fourth communication circuitry, to the first apparatus by using the third communication circuitry;
displaying, on a display section of the information processing apparatus, data transmitted and/or received by the third communication circuitry or by the fourth communication circuitry.

13. A method for facilitating communication between a first apparatus having a first communication section using a first short-distance wireless communication scheme and a second apparatus having a second communication section using a second short-distance wireless communication scheme that is different from the first short-distance wireless communication scheme, the method comprising:

performing at least one of data transmission and data reception via third communication section by using the first short-distance wireless communication scheme;
performing at least one of data transmission and data reception via fourth communication section by using the second short-distance wireless communication scheme; and
transmitting data, which is received from the first apparatus by using the third communication circuitry, to the second apparatus by using the fourth communication section, and/or for transmitting data, which is received from the second apparatus by using the fourth communication section, to the first apparatus by using the third communication section; and
displaying data, on a display section of a device having the third communication section and the fourth communication section, transmitted and/or received by the third communication section or by the fourth communication section.

14. An information processing system comprising a first apparatus, a second apparatus and a third apparatus, the first apparatus including a first communication section configured to communicate via a first short-distance wireless communication scheme;
the second apparatus including a second communication section configured to communicate via a second short-distance wireless communication scheme that is different from the first short-distance wireless communication scheme; and
the third apparatus including:
a third communication section configured to communicate via the first short-distance wireless communication scheme, and
a fourth communication section configured to communicate via the second short-distance wireless communication scheme, wherein
data which is received from the first apparatus by using the third communication section is transmitted to the second apparatus by using the fourth communication section, and data which is received from the second apparatus by using the fourth communication section is transmitted to the first apparatus by using the third communication section; and
data transmitted and/or received by the third communication section or by the fourth communication section is displayed on a display section of the third apparatus.

15. An information processing system comprising a first apparatus, a second apparatus and a third apparatus, the first apparatus including first communication circuitry for performing data transmission and/or data reception by using a first short-distance wireless communication scheme,
the second apparatus including second communication circuitry for performing data transmission and/or data reception by using a second short-distance wireless communication scheme that is different from the first short-distance wireless communication scheme, and
the third apparatus including:

third communication circuitry for performing data transmission and/or data reception by using the first short-distance wireless communication scheme;

fourth communication circuitry for performing data transmission and/or data reception by using the second short-distance wireless communication scheme; and control circuitry for transmitting data, which is received from the first apparatus by using the third communication circuitry, to the second apparatus by using the fourth communication circuitry, and/or for transmitting data, which is received from the second apparatus by using the fourth communication circuitry, to the first apparatus by using the third communication circuitry;

wherein the first apparatus further includes shock measuring circuitry for measuring a jiggling motion, and the first apparatus transmits measurement of the jiggling motion to the third apparatus by using the first communication circuitry.

16. An information processing apparatus communicating with a first apparatus and a second apparatus, the first apparatus including first communication section for performing data transmission and/or data reception by using a first short-distance wireless communication scheme, and the second apparatus including second communication section for performing data transmission and/or data reception by using a second short-distance wireless communication scheme that is different from the first short-distance wireless communication scheme, the information processing apparatus comprising:

third communication section for performing data transmission and/or data reception by using the first short-distance wireless communication scheme;

fourth communication section for performing data transmission and/or data reception by using the second short-distance wireless communication scheme; and a controller for transmitting data, which is received from the first apparatus by using the third communication section, to the second apparatus by using the fourth communication section, and/or for transmitting data, which is received from the second apparatus by using the fourth communication section, to the first apparatus by using the third communication section;

wherein the third communication section of the information processing apparatus receives, from the first communication section of the first apparatus, data corresponding to a jiggling motion measured by a shock measuring device of the first apparatus.

17. A non-transitory computer-readable storage medium storing an information processing program to be executed by a computer of an information processing apparatus that communicates with a first apparatus and a second apparatus, the first apparatus including first communication circuitry for performing data transmission and/or data reception by using a first short-distance wireless communication scheme, and the second apparatus including second communication circuitry for performing data transmission and/or data reception by using a second short-distance wireless communication scheme that is different from the first short-distance wireless communication scheme, the information processing program causing the computer of the information processing apparatus to provide operation comprising:

performing data transmission and/or data reception via third communication circuitry by using the first short-distance wireless communication scheme;

performing data transmission and/or data reception via fourth communication circuitry by using the second short-distance wireless communication scheme; and transmitting data, which is received from the first apparatus by using the third communication circuitry, to the second apparatus by using the fourth communication circuitry, and/or for transmitting data, which is received from the second apparatus by using the fourth communication circuitry, to the first apparatus by using the third communication circuitry;

wherein said performing said data transmission and/or data reception via the third communication circuitry includes performing data reception of data, received from the first communication circuitry of the first apparatus, corresponding to a jiggling motion measured by a shock measuring device of the first apparatus.

18. An handheld terminal configured to wirelessly communicate with a pedometer and a data processing apparatus, the pedometer including a communication section for performing wireless communication using a short-distance wireless communication scheme, and the data processing apparatus including a communication section for performing wireless communication using a short-distance wireless communication scheme that is different from the short-distance wireless communication scheme used by the communication section of the pedometer, the handheld terminal comprising:

a first communication circuit configured to perform wireless communication using the short-distance wireless communication scheme used by the communication section of the pedometer;

a second communication circuit configured to perform wireless communication using the short-distance wireless communication scheme used by the communication section of the data processing apparatus; and a control unit configured to communicate data, which is received from the pedometer using the first communication circuit, to the data processing apparatus by using the second communication circuit, and/or to communicate data, which is received from the data processing apparatus by using the second communication circuit, to the pedometer by using the first communication circuit;

wherein the first communication circuit of the handheld terminal receives data corresponding to a motion measured by the pedometer.

19. The handheld terminal as in claim 18, further comprising a display configured to generate a display corresponding to data transmitted and/or received by the first communication circuit or by the second communication circuit.

* * * * *